United States Patent [19]
Deaton et al.

[11] Patent Number: 5,388,165
[45] Date of Patent: Feb. 7, 1995

[54] METHOD AND SYSTEM FOR BUILDING A DATABASE AND PERFORMING MARKETING BASED UPON PRIOR SHOPPING HISTORY

[75] Inventors: David W. Deaton; Rodney G. Gabriel, both of Abilene, Tex.

[73] Assignee: Credit Verification Corporation, Abilene, Tex.

[21] Appl. No.: 177,690

[22] Filed: Jan. 4, 1994

Related U.S. Application Data

[63] Continuation of Ser. No. 16,991, Feb. 10, 1993, abandoned, which is a continuation of Ser. No. 886,385, May 19, 1992, Pat. No. 5,201,010, which is a continuation-in-part of Ser. No. 826,255, Jan. 24, 1992, abandoned, which is a continuation of Ser. No. 345,475, May 1, 1989, abandoned.

[51] Int. Cl.[6] .............................................. G06K 9/00
[52] U.S. Cl. ............................................ 382/7; 382/1
[58] Field of Search ............... 382/1, 7, 12, 9, 48; 235/379, 380, 383, 385; 364/400, 401; 340/825.33, 825.34; 379/91; 902/4, 5, 6; G06K 9/00, 9/18, 9/20; G06F 15/20, 15/22, 15/30, 15/00, 15/24, 7/04, 13/00; G07D 7/00; H04M 11/00; H04N 7/18

[56] References Cited

U.S. PATENT DOCUMENTS

| | | | |
|---|---|---|---|
| Re. 30,579 | 4/1981 | Goldman et al. | 235/375 |
| Re. 30,580 | 4/1981 | Goldman et al. | 235/375 |
| 2,995,727 | 8/1961 | Quade | 235/375 |
| 3,316,536 | 4/1967 | Andrews | 382/12 |
| 3,465,289 | 9/1969 | Klein | 235/375 |
| 3,528,058 | 9/1970 | Bond | 382/12 |
| 3,535,682 | 10/1970 | Dykaar et al. | 382/12 |
| 3,576,539 | 4/1971 | Huber | 340/152 |
| 3,605,092 | 9/1971 | Richard | 382/7 |
| 3,629,829 | 12/1971 | Ordower | 382/12 |
| 3,786,421 | 1/1974 | Wostl | 235/375 |
| 3,833,885 | 9/1974 | Gentile et al. | 235/380 |
| 3,876,981 | 4/1975 | Welch | 382/12 |
| 3,914,789 | 10/1975 | Coker | 382/12 |
| 3,941,977 | 3/1976 | Voss et al. | 235/375 |
| 3,987,411 | 10/1976 | Kruklitis et al. | 382/12 |
| 4,015,701 | 4/1977 | Templeton | 197/127 |
| 4,027,142 | 5/1977 | Paup et al. | 235/379 |
| 4,053,735 | 10/1977 | Fondos | 235/375 |
| 4,053,737 | 10/1977 | Lafevers et al. | 382/12 |
| 4,063,070 | 12/1977 | Delarue et al. | 235/474 |
| 4,087,789 | 5/1978 | Beery | 235/449 |
| 4,088,879 | 5/1978 | Banka et al. | 235/449 |
| 4,107,653 | 8/1978 | Kruklitis | 235/449 |
| 4,109,238 | 8/1978 | Creekmore | 235/379 |
| 4,127,770 | 11/1978 | Baader | 235/474 |
| 4,143,355 | 3/1979 | MacIntyre | 235/449 |
| 4,143,356 | 3/1979 | Nally | 235/449 |
| 4,148,010 | 4/1979 | Shiau | 235/466 |
| 4,176,783 | 12/1979 | Eppich | 235/474 |
| 4,208,575 | 6/1980 | Haltof | 235/380 |
| 4,245,211 | 1/1981 | Kao | 382/12 |
| 4,260,880 | 4/1981 | Thomas | 235/454 |
| 4,277,689 | 7/1981 | Thomas et al. | 235/454 |
| 4,356,472 | 10/1982 | Ku et al. | 382/12 |
| 4,380,734 | 4/1983 | Allerton | 235/449 |
| 4,381,494 | 4/1983 | Wisner | 382/64 |

(List continued on next page.)

OTHER PUBLICATIONS

"Front End Electronic Marketing Frequent Shopper & Other Programs" Food Marketing Institute, 1991, Carlene A. Thissen.

"Perspective on Electronic Marketing with Emphasis on Promotion Inside Supermarkets", Food Marketing Institute, 1990, Carlene A. Thissen.

*Primary Examiner*—Jose L. Couso
*Attorney, Agent, or Firm*—Baker & Botts

[57] ABSTRACT

The present invention includes automatic check reading techniques which enables the detection of a customer's checking account number on a check, regardless of the bank, bank branch or type of account. The customer identification code is automatically used to provide check verification as well as to provide various targeted marketing techniques based upon the customer's prior transactional history with the store.

16 Claims, 35 Drawing Sheets

U.S. PATENT DOCUMENTS

| | | | |
|---|---|---|---|
| 4,396,902 | 8/1983 | Warthan et al. | 382/62 |
| 4,399,553 | 4/1983 | Toyama | 382/7 |
| 4,404,649 | 9/1983 | Nunley et al. | 364/900 |
| 4,439,670 | 3/1984 | Basset et al. | 235/382 |
| 4,441,204 | 4/1984 | Hanna | 382/7 |
| 4,453,074 | 6/1984 | Weinstein | 235/380 |
| 4,510,615 | 4/1985 | Rohrer | 382/7 |
| 4,523,330 | 6/1985 | Cain | 382/7 |
| 4,547,780 | 10/1985 | Cummins | 346/9 |
| 4,547,899 | 10/1985 | Nally et al. | 382/7 |
| 4,554,446 | 11/1985 | Murphy et al. | 235/487 |
| 4,617,457 | 10/1986 | Granzow | 235/379 |
| 4,628,194 | 12/1986 | Dobbins et al. | 235/379 |
| 4,670,853 | 6/1987 | Stepien | 364/709 |
| 4,672,572 | 6/1987 | Alsberg | 364/900 |
| 4,674,041 | 6/1987 | Lemon et al. | 364/401 |
| 4,678,895 | 7/1987 | Tateisi et al. | 235/379 |
| 4,703,423 | 10/1987 | Bado et al. | 364/400 |
| 4,722,054 | 1/1988 | Yorozu et al. | 364/401 |
| 4,723,212 | 2/1988 | Mindrum | 364/401 |
| 4,727,243 | 2/1988 | Savar | 235/379 |
| 4,748,668 | 5/1988 | Shamir et al. | 382/30 |
| 4,748,673 | 5/1988 | Barre et al. | 382/7 |
| 4,750,119 | 6/1988 | Cohen et al. | 364/401 |
| 4,776,021 | 10/1988 | Ho | 382/7 |
| 4,791,281 | 12/1988 | Johnsen et al. | 235/383 |
| 4,797,938 | 1/1989 | Will | 382/7 |
| 4,809,351 | 2/1989 | Abramovitz et al. | 382/59 |
| 4,810,866 | 3/1989 | Lord, Jr. | 235/379 |
| 4,825,045 | 4/1989 | Humble | 235/383 |
| 4,833,308 | 5/1989 | Humble | 235/383 |
| 4,882,675 | 11/1989 | Nichtberger et al. | 364/401 |
| 4,885,685 | 12/1989 | Wolfberg et al. | 364/401 |
| 4,887,207 | 12/1989 | Natarajan | 364/401 |
| 4,897,880 | 1/1990 | Wilber et al. | 382/13 |
| 4,908,761 | 3/1990 | Tai | 364/401 |
| 4,910,672 | 3/1990 | Off et al. | 364/405 |
| 4,941,090 | 7/1990 | McCarthy | 364/405 |
| 4,949,256 | 8/1990 | Humble | 364/401 |
| 4,975,841 | 12/1990 | Kehnemyi et al. | 364/401 |
| 5,008,518 | 4/1991 | Taussig et al. | 235/383 |
| 5,010,485 | 4/1991 | Bigari | 364/408 |
| 5,014,324 | 5/1991 | Mazumder | 382/7 |
| 5,025,372 | 6/1991 | Burton et al. | |
| 5,053,607 | 10/1991 | Carlson et al. | 235/379 |
| 5,053,955 | 10/1991 | Peach et al. | 364/401 |
| 5,054,092 | 10/1991 | LaCaze | 382/11 |
| 5,056,019 | 10/1991 | Schultz et al. | 364/405 |
| 5,070,452 | 12/1991 | Doyle et al. | 364/401 |
| 5,091,634 | 2/1992 | Finch | 235/375 |
| 5,095,195 | 3/1992 | Harman et al. | 235/381 |
| 5,117,355 | 5/1992 | McCarthy | 364/406 |
| 5,128,520 | 7/1992 | Rando et al. | 235/375 |
| 5,173,851 | 12/1992 | Off et al. | 364/401 |
| 5,185,695 | 2/1993 | Pruchnicki | 364/401 |
| 5,201,010 | 4/1993 | Deaton et al. | 382/7 |
| 5,202,826 | 4/1993 | McCarthy | 364/406 |
| 5,237,496 | 8/1993 | Kagami | 364/401 |
| 5,237,620 | 8/1993 | Deaton et al. | 382/7 |
| 5,245,164 | 9/1993 | Oyama | 235/379 |
| 5,245,533 | 9/1993 | Marshall | 364/401 |
| 5,249,044 | 9/1993 | Von Kohorn | 358/86 |
| 5,251,152 | 10/1993 | Notess | 235/379 |
| 5,253,345 | 10/1993 | Fernandes et al. | 395/275 |

TO FIG. 4A-2

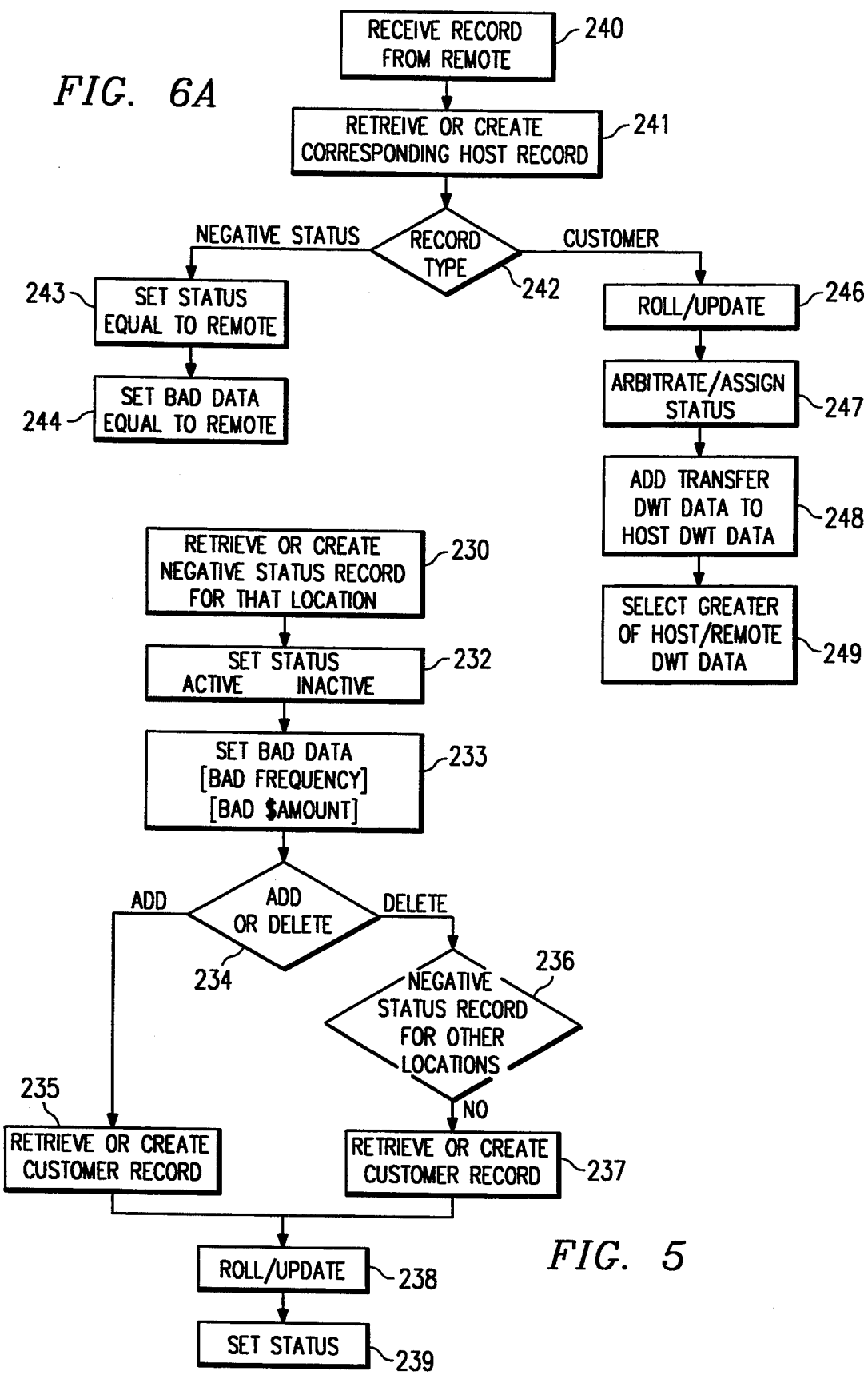

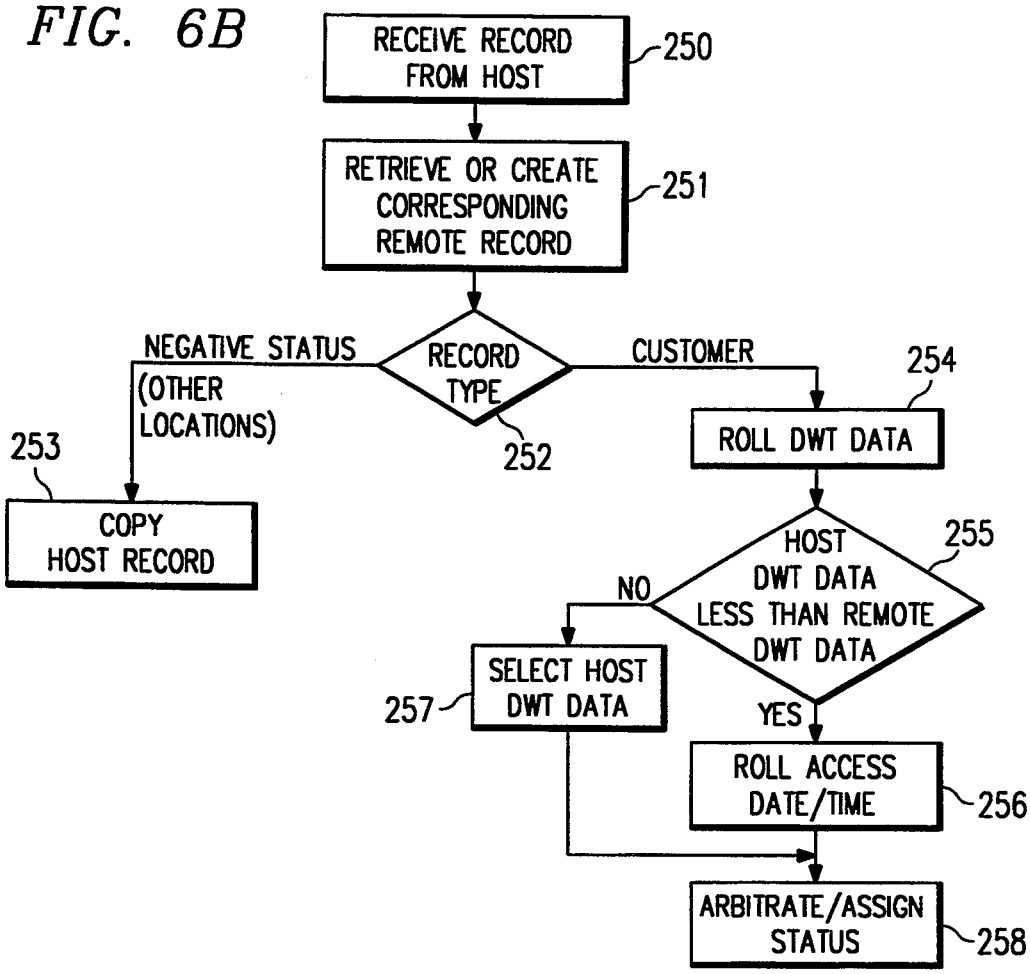
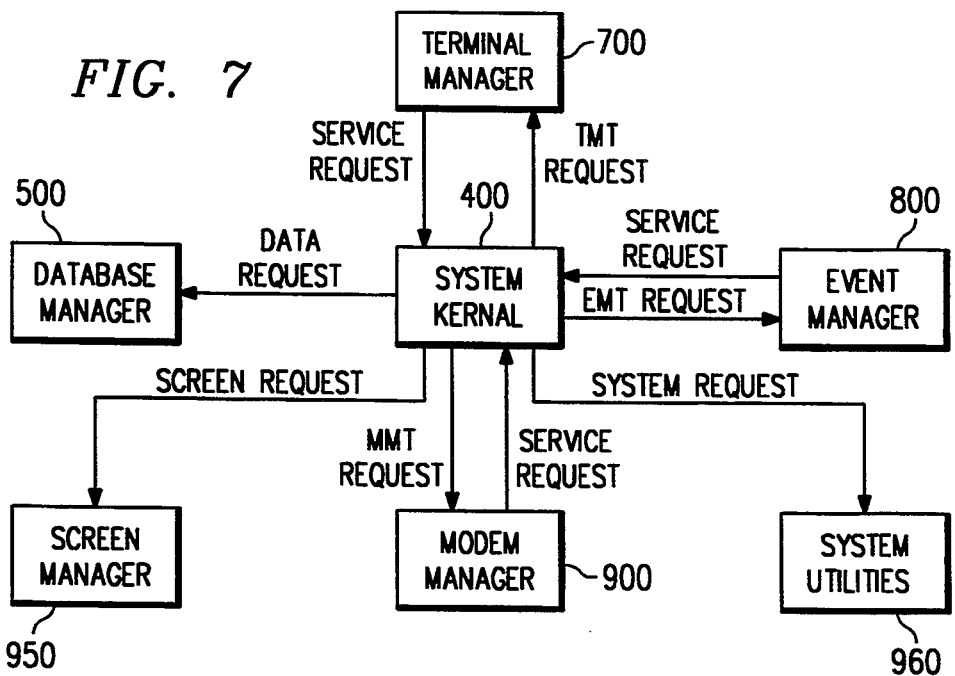

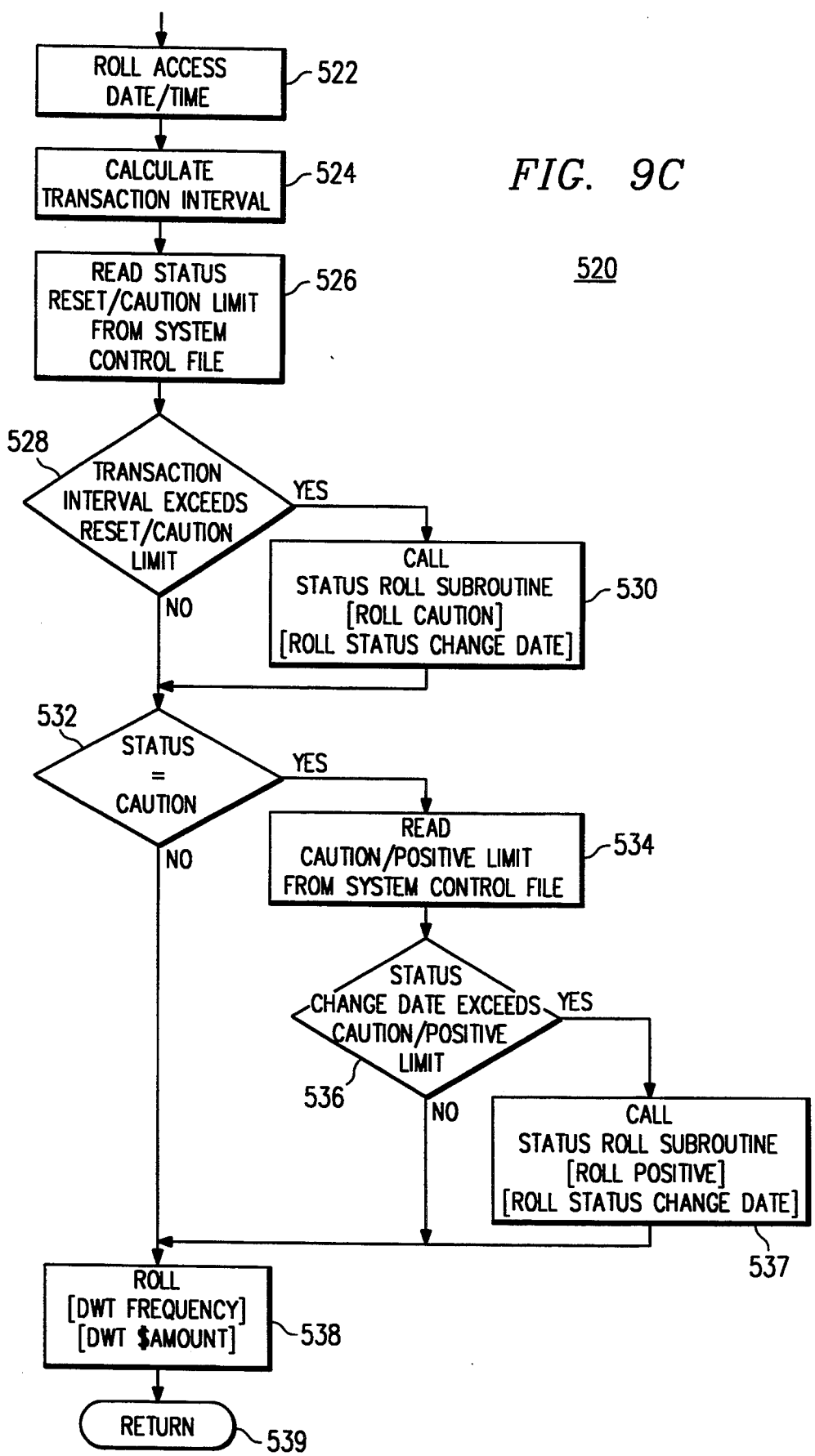

630

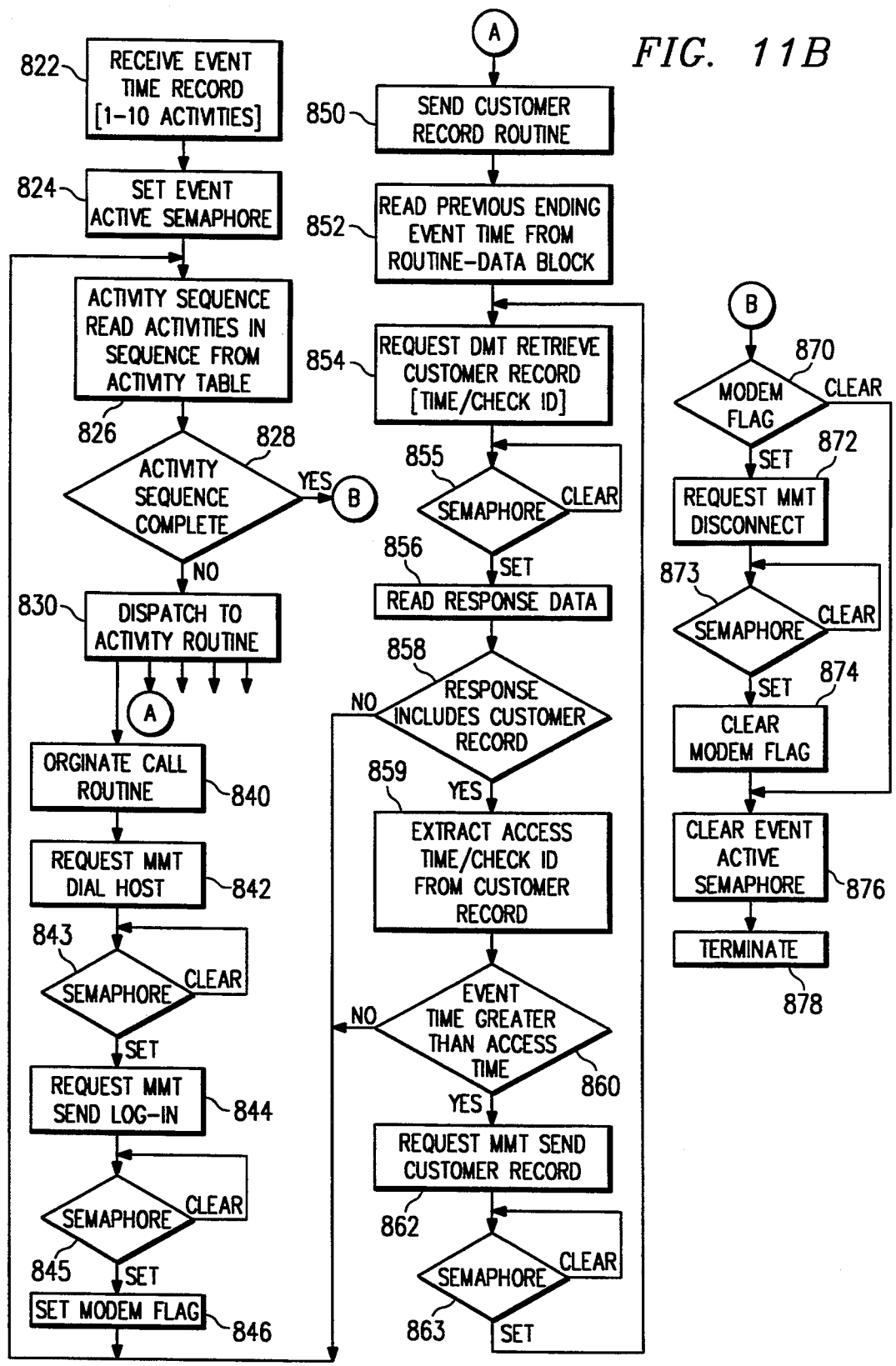

METHOD AND SYSTEM FOR BUILDING A DATABASE AND PERFORMING MARKETING BASED UPON PRIOR SHOPPING HISTORY

RELATED APPLICATIONS

This application is a continuation application of U.S. patent application Ser. No. 08/016,991, filed Feb. 10, 1993, now abandoned, which is a continuation of U.S. patent application Ser. No. 07/886,385, filed May 19, 1992, now U.S. Pat. No. 5,201,010, issued Apr. 6, 1993, which is a continuation-in-part of U.S. application Ser. No. 07/826,255, filed Jan. 24, 1992, now abandoned, which is a continuation of U.S. application Ser. No. 07/345,475, filed May 1, 1989, now abandoned.

This application also relates to U.S. patent application Ser. No. 08/221,622, filed Mar. 30, 1994, pending; U.S. patent application Ser. No. 07/886,382, filed May 19, 1992, now U.S. Pat. No. 5,305,196, issued Apr. 19, 1994; U.S. patent application Ser. No. 08/178,056, filed Feb. 28, 1994, pending; U.S. application Ser. No. 08/063,413, filed May 17, 1993, pending; U.S. application Ser. No. 07/886,383, filed May 19, 1992, allowed, but now abandoned; U.S. patent application Ser. No. 07/885,649, filed May 19, 1992, now U.S. Pat. No. 5,237,620, issued Aug. 17, 1993; and U.S. patent application Ser. No. 08/117,951, filed Aug. 30, 1993, pending, by Credit Verification Corporation, the assignee hereunder.

TECHNICAL FIELD OF THE INVENTION

This invention relates to transaction processing and analysis systems, including check verification systems, and more particularly, to a method and system for processing and developing a local customer database of customer information, such as check verification status and transaction frequency and dollar volume over specified intervals, that can be used for check verification, marketing and other customer relations purposes.

BACKGROUND OF THE INVENTION

Retail and other business establishments that serve a large number of customers generally have a problem obtaining transactional information about their customers, such as for identifying new customers and determining transactional patterns for repeat customers (such as transactional frequency and dollar volume).

For those stores that experience a high volume of check transactions, an immediate customer information problem is determining whether to authorize a check transaction in the typical situation where the sales clerk does not personally know the purchaser. Beyond this immediate problem of check verification, these stores have a broader need for gathering transactional information that could be used in developing customer profiles useful in targeting and implementing advertising, marketing and promotions.

For example, a typical grocery store does a high transactional volume with checks comprising a significant percentage of the total transactions (typically as much as 85%). These businesses strive for maximum efficiency in completing transactions at the checkout counter, which results in a minimum of contact between the customer and the sales clerk. In this sales environment, neither clerks nor store managers typically develop any significant personal relationship with an individual customer.

Since check transactions account for such a significant percentage of a grocery store's business, these stores naturally make an effort to minimize the number of bad checks that will be returned. Typically, the store will require an additional piece of identification, such as a driver's license and/or a major credit card. However, this requirement for additional identification reduces the efficiency of the checkout process, and inconveniences the significant majority of check transaction customers who do not write bad checks—typically, a grocery store's bad check experience will be approximately 2% of its check transactions.

Thus, check verification presents a store with problems in customer relations and risk management. A store naturally seeks to improve customer relations with the great majority of customers who do not present check transaction problems by efficiently and quickly authorizing check transactions. However, the store must guard against the financial risks from customers who do write bad checks, either as part of a concerted bad check scheme or as a result of less larcenous conduct that may range from simple bookkeeping mistakes to overly aggressive check floating. In the former case, bad check risk is greatly dependent upon abnormal check transaction activity over a given interval. In the latter cases, the bad check risk is greatly dependent upon check transaction history (total check transaction frequency and dollar volume at a store).

The check transaction risk management problem has two principal aspects—the risk that a person will write a bad check and the risk that a bad check cannot be recovered. Again, both of these risk factors are greatly dependent upon a customer's historical check transaction activity. As the total number of check transactions by a customer at a particular store increases, both the risk that the customer will write a bad check decreases, and more significantly, the risk that store will not be able to recover on a bad check decreases.

For example, a customer with fewer than 200–300 check transactions at a store presents a relatively high risk in terms of recovery on a bad check, while a customer with more than 600–700 check transactions presents a minimal risk. Thus, a store practicing risk management should put substantially more restrictions in terms of check transaction frequency and total dollar volume over given intervals in the former case than in the latter.

These risk management problems are multiplied in the case of multiple store businesses, particularly in the case of concerted bad check cashing schemes. In that case, the typical pattern is to move from store to store within a relatively short period of time.

Beyond these check verification and risk management problems, grocery stores have a broader problem in accumulating customer information because of the emphasis on minimizing the amount of time required for a sales transaction, and the attendant impersonality of the customer relationship. Thus, it is extremely difficult to develop any meaningful customer profiles, or to identify customer groups such as regular customers and new customers who might become regular customers. If a store could accumulate more detailed customer information, customer profiles could be developed and used for targeted advertising, marketing and promotional programs.

Accordingly, a need exists for a transaction processing system for individual stores (in both single and multiple store environments) that facilitates check transactions by improving the efficiency of the check verification process, and that maintains a local customer database containing transactional information about the store's customers useful for check verification risk management, and for other customer relations purposes such as identifying new customers and profiling regular customers.

Prior credit verification systems require connecting a point-of-sale terminal through telephone lines to a remote transaction processing system, thereby increasing not only the cost of operating the systems, but also increasing the time for providing check verification. Also, existing systems typically do not focus on maintaining a local customer database useful not only for check transaction processing, but also for identifying new customers and developing customer profiles for regular customers.

In prior systems, information regarding checks returned to a store by its bank is entered into a computer (PC). This PC stores information on that check (name, address, dollar amount of the check, reason for the return of the check, etc.) and this PC can be programmed to transfer that data to other processors controlling point-of-sale keypad terminals, both in the same and in other store-based operations. Responses displayed by one of these point-of-sale terminals may be altered pursuant to these transfers of data. Alternatively, data on returned checks may be entered into a multiple tasking computer environment in which the same processor simultaneously manages the operations of returned check entry and point-of-sale keypad operation. This multiple tasking processor can be programmed to transfer data to other similar store-based operations by telephone communications.

Copending patent application Ser. No. 07/826,255 discloses a system and technique wherein a customer's checking account number may be used as a unique customer identification number to provide credit verification and also to perform marketing functions. In such a prior system, such customer checking account numbers have been manually entered by the retail store clerk, thus causing delay and possible inaccuracies. A need has thus arisen for an automated system for providing quick and efficient check verification and marketing follow-up. Previous automatic readers have, however, not been satisfactory for such purposes, because of their inability to uniformly detect desired account information on all checks in a consistent manner.

Marketing by retail stores has previously been confined to advertising to large segments of the population, and often to existing customers. Competition among stores has made it more important to target advertising, and a need has arisen for marketing techniques to target non-customers or infrequent customers. It would be particularly advantageous if such targeted marketing could be accomplished in conjunction with a check verification system.

SUMMARY OF THE INVENTION

Important aspects of the present invention are to facilitate check transactions by reducing the requirements for customer identification, to enable a store to adopt a risk management approach to check verification based on a customer's transactional history (frequency and dollar volume over specified intervals), and to improve a store's marketing and other customer relations programs by collecting transactional data for that store, both current and historical, that can be used to identify new or infrequent customers, develop customer profiles and to perform targeted marketing.

More specifically, this invention is a check transaction processing system that uses a customer's checking account number as a unique customer identification number. Thus, the system does not require time-consuming checking of additional customer identification, but only requires the speedy entry of the customer's checking account number by use of an improved automatic check reader in accordance with the present invention. The system operates at an individual store, and maintains at that store a local customer database of customer records, each identified by the corresponding customer check identification number. The customer records also include customer information, such as check verification data (such as verification status) as well as other selected transactional data (such as transaction frequency and dollar volume), the verification and transaction data being regularly updated with new data (such as during check transaction verification).

The system includes one or more transaction terminals, coupled to a transaction processor that stores the customer database. A transaction terminal is used to transmit a customer information request (such as for check transaction verification), which includes an automatically read customer's check identification number, from the point of sale (POS) to the transaction processor.

The transaction processor processes the customer information request, using the check identification number to search the customer database and retrieve the corresponding customer record, if any. Based on the customer information in the customer record, or the lack of a customer record, the transaction processor returns an appropriate response (such as check verification status) and marketing response information to the transaction terminal.

Thus, the method of this invention for check transaction processing involves various aspects of: (a) identifying a customer by automatically reading the customer's unique check ID; (b) developing and maintaining for a store a local customer database of customer records, each identified by the corresponding customer check identification number, and each including customer information (such as verification status and transactional data); (c) generating a customer information request; (d) processing the request using the customer check identification number to access the corresponding customer record, if any; (e) returning an appropriate customer information response based on the customer information in the customer record; (f) updating the customer database regularly to reflect new customer information; and (g) utilizing the database to perform targeted marketing functions.

More specific aspects of the preferred embodiment of the invention are the following:

The transaction terminals and the transaction processor form a token ring data communication network. Each transaction terminal includes (a) an automatic check reader constructed in accordance with the present invention for automatically entering check identification numbers, along with a keypad for entering function codes and appropriate transaction data, which form customer information requests, and (b) a display for displaying the requests and the returned responses.

The customer records in the customer database include an assigned check verification status, such as POSITIVE (transaction authorized), NEGATIVE (transaction not authorized) or CAUTION (transaction should be scrutinized or subject to certain conditions). The first time a customer attempts a check transaction at a store (i.e., a search of the customer database pursuant to a check verification request indicates no existing customer record), a new customer record with a CAUTION status is created, and a CAUTION response is returned to the transaction terminal. The customer remains in the CAUTION status for a period of time sufficient for this initial check to clear or be returned. If this CAUTION/POSITIVE interval passes, the system automatically updates status to POSITIVE; if the check is returned, customer status is updated by inputting a NEGATIVE status.

In addition to check verification status data, the local customer database includes transactional data such as transaction frequency and dollar volume over specified intervals. This transactional data can be used to place conditions risk management on check transaction verification over and above verification status. For example, in the case of a customer with either CAUTION or POSITIVE status, if a check transaction exceeds certain specified transaction limits frequency and/or dollar amount over a specified interval (such as day, week or total), a CALL MANAGER response is returned in response to a check verification request, regardless of customer status.

Moreover, because the check transactional data is generated and maintained locally, it provides significant information about the store's customers over and above the information necessary for check verification risk management. New customers are readily identified, and frequency and dollar volume information may be used to establish customer profiles and to target advertising, marketing and promotional programs, and for other customer relations purposes.

In the case of a multiple store business, each store has a local check transaction processing system, with one of the systems being designated a host site and the rest being designated remote sites. At selected intervals, each remote system transmits to the host selected customer information from its local customer database (such as customer records for those customers with CAUTION and NEGATIVE status including transactional data), which is used to update the host customer database to include this global customer information. The host, in turn, transmits that global customer information to the other remote systems.

Check transaction processing is implemented by a multi-tasking program executing in the transaction processor. The program includes: (a) a terminal manager task that implements network data communication for the transaction terminals, communicating customer information requests and responses; (b) a Data Manager Task that controls the database operations necessary to respond to customer information requests and to update the customer information in the database; and (c) an Event Manager Task that implements system activities such as backup and database purge, and in the case of multiple-store systems, implements host/remote communications activities to transfer selected customer information among the stores for updating each store's local customer database with the selected global customer information.

Important features and advantages of this invention are the following. The check transaction processing system uses the automatic reading of the customer's check identification number, which is used as a unique customer identification number, thus avoiding the requirement for additional identification and the attendant delay in completing the check transaction.

The system develops and maintains a local customer database, allowing the store to accumulate customer information relevant to the store's customers over and above that information necessary for check verification. The system provides for the selection of procedures and criteria for database management and check verification, allowing the store owner/manager considerable flexibility in developing and using the customer information in the store's customer database.

For check verification, the system uses three primary status levels—POSITIVE, NEGATIVE and CAUTION—allowing the store to identify those customers with a bad check outstanding, and to identify new customers and establish selected interim risk management procedures for granting those customers check transaction privileges. In addition to check verification status, the system collects and accumulates selected additional transactional data, including frequency and dollar amounts over specified intervals (such as Day/Week/Month/Quarter/Total) and other historical information such as departments shopped, products purchased and the like, thus allowing the store to adopt risk management approach to check verification tailored to the store's particular customer and financial situation by conditioning check authorization on meeting certain selected transactional limits regardless of customer status (the CALL MANAGER response), and allowing the store to develop customer profiles and to target advertising, marketing and promotions, and otherwise improve customer relations.

For multiple-store businesses, the system can use automatic host/remote transfer of selected customer information to upgrade the local customer database at each store with global customer information (such as those customers with CAUTION and NEGATIVE check verification status), thereby maximizing protection against bad checks while maintaining the local character of the store's customer database.

The check transaction processing system is implemented by a multi-tasking program, and uses local area network data communication among the transaction terminals and the transaction processor, allowing efficient operation of the system at each individual store.

Other objects, features and advantages of this invention will be apparent from the drawings and the following detailed description of the preferred embodiment, and the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A-1 through 4A-3 illustrate the MICR parsing function;

FIG. 5 diagrams the local status update function for both Add and Delete NEGATIVE status;

FIGS. 6A and 6B diagram the global update function for, respectively, the host and a remote system;

FIG. 7 shows the program tasks that form the check transaction processing program;

FIGS. 9B-9H are program flow diagrams of selected function execution routines in the Data Manager Task, respectively, verify roll, add NEGATIVE, delete NEGATIVE, host global update (negative status records), host global update (customer records), and remote global update (customer records);

FIGS. 11A and 11B are program flow diagrams of, respectively, the Event Manager Task, and the event subtask;

DESCRIPTION OF THE PREFERRED EMBODIMENT

Figure 1:
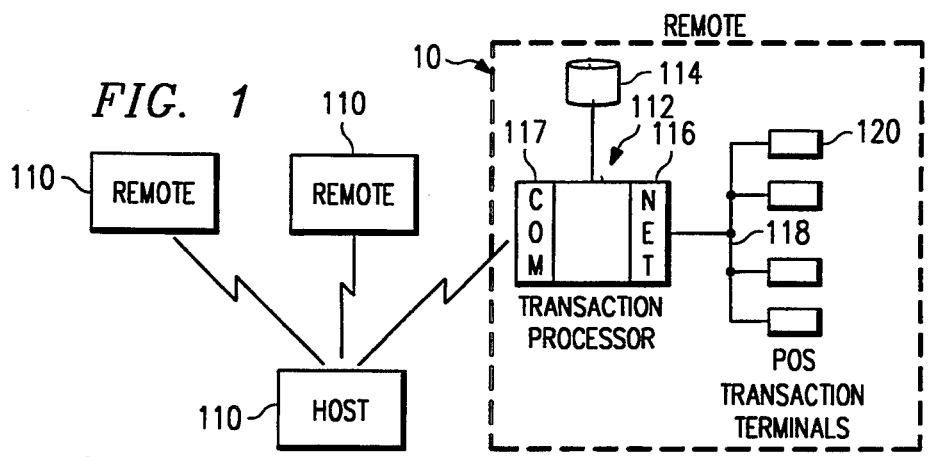
FIG. 1 shows the check transaction processing system of this invention, including a multiple store remote/host configuration.

The preferred embodiment of the present invention and its advantages are best understood by referring to FIGS. 1 through 18A-C of the drawings, like numerals being used for like and corresponding parts of the various drawings.

The check transaction processing system of the present invention enables a store with a significant volume of check transactions to accumulate and process transactional customer information for check verification and customer profiles for target marketing. The system operates at the store using a local database of customer information useful in that store's business.

A customer's bank checking account number provides a unique identification for that customer—using this check ID, a customer record is created and included in the local customer database. The customer record includes an assigned customer verification status, as well as selected transactional data. Customer status designations include POSITIVE, NEGATIVE and CAUTION, while transactional data includes transaction frequency and dollar volume over given intervals (such as Day/Week/Total or DWT). Selected transactional (CALL MANAGER) limits are assigned to both CAUTION and POSITIVE status. This customer information (customer status and transactional data) in the customer database is continuously updated (a) on a local basis through either processing check verification requests, or inputting customer status, and (b) in the case of a multiple store business, on a global basis through inter-store transfers of selected customer information (such as CAUTION and NEGATIVE status information).

The description of the preferred embodiment of the check transaction processing system is organized as follows:

1.0 Hardware Description
    1.1. System Overview
    1.2. Data Communications Network
    1.3. POS Terminal
    1.4. Multiple-Store Configuration
    1.5. Exemplary Components
2.0 Functional Description
    2.1. Database Structure
    2.2. Function Codes
    2.3. Verify/Query
    2.4. Local Status Update
    2.5. Global Update
    2.6. Purge
    2.7. Event/Activities
    2.8. Communications
    2.9. System
    2.10. Risk Management
    2.11. Customer Information Reporting
3.0 Program Description
    3.1. General
    3.2. System Kernal
    3.3. Data Manager Task
    3.4. Terminal Manager Task
    3.5. Event Manager Task
    3.6. Modem Manager Task
4.0 Alternative Embodiments
5.0 Targeted Marketing Features
    5.1. Automatic Building Of A Database For A Retail Store Marketing Program
    5.2. Targeted Marketing Program
    5.3. Infrequent Shopper Database And Marketing Techniques
    5.4. Marketing Based On Range Of Last Shopping Dates
    5.5. Dissemination Of Point-Of-Sale Coupons And Direct Mail Coupons Based Upon Shopping History
    5.6. Dissemination Of Point-Of-Sale Coupons And Direct Mail Coupons Based Upon Scanned Data

1.0 CHECK TRANSACTION PROCESSING SYSTEM

The check transaction processing system is located at a store, and maintains a local customer database for that store. For a multiple store business, a local system is located at each store and global customer information transfers are used to supplement the essentially local customer database.

1.1. System Overview

As shown in FIG. 1, a check transaction processing system 110 located at a store includes a transaction processor 112 coupled to a disk system 114 that stores the customer database used in check transaction processing. Transaction processor 112 handles all file I/O for accessing, managing and updating the customer database.

Transaction processor 112 is coupled through a network data communications interface 116 (including network communications ports and associated drivers) and a network bus 118 to a plurality of transaction terminals 120. Transaction processor 112 is able to communicate with other check transaction processing systems through a telecommunications interface 117 (including a modem).

Transaction terminals 120 are each located at a point of sale (such as a grocery store checkout stand). Transaction terminals 120 are used to communicate information to transaction processor 112 for check transaction processing and customer database management. A transaction terminal transmits a request (including a function code identifying the requested function together with other request data) to the transaction processor, which processes the request and returns an appropriate response.

For example, in the case of check verification, a transaction terminal is used to transmit a verification request—the customer's check ID, the verification function code, and the dollar amount. The transaction processor processes the request, updates the customer database to reflect that transaction, and returns a customer verification status response.

1.2. Data Communications Network

Data communications between transaction processor 112 and transaction terminals 120 is implemented using a multi-drop token ring network. Network bus 118 connects the transaction terminals to the transaction processor in a star configuration so that all data signals transmitted over the network are received at each node. Each transaction terminal 120 is assigned a unique terminal address to identify its data communications.

Transaction processor 112 implements a token-passing protocol by broadcasting polling sequences (or cycles) in which tokens are sequentially addressed to the transaction terminals. For each poll, the transaction processor sends to a terminal one of two tokens (which both include the terminal address):

POLL Token—An invitation for the terminal to transmit data

RXDATA Token—Includes data requested by the terminal

In response to a POLL token, the transaction terminal transmits back one of two answers:

TXDATA Answer—Includes data entered into the terminal

NODATA Answer—Indicates no data

During any given polling sequence, each transaction terminal is in one of three polling states that control the polling operation:

Poll—Send a POLL token

Wait—Do not send a token until requested data is available

Data—Send an RXDATA token that includes the requested data in the terminal's buffer For example, in response to a POLL token, a transaction terminal may transmit a TXDATA Answer containing a check verification request. Once the request is transmitted, the terminal is placed in the Wait state until the verification response from the transaction processor is available. The response is placed in the terminal's buffer, and the terminal is placed in the Data state. The response is included in an RXDATA token sent to the terminal during the next polling sequence, and the terminal is placed in the Poll state ready to receive a POLL token in the next polling sequence.

For the preferred embodiment, network communications interface 116 provides 32 ports for up to 32 transaction terminals. The data communications network uses the RS485 line protocol, which specifies differential signal lines SIG+ and SIG−, as well as +12 V and ground lines. The network communications interface and the corresponding interfaces for each transaction terminal use a differential line driver for signal communication over network bus 118, which provides the necessary 4-wire signal path.

1.3. POS Terminal

Figure 2A:
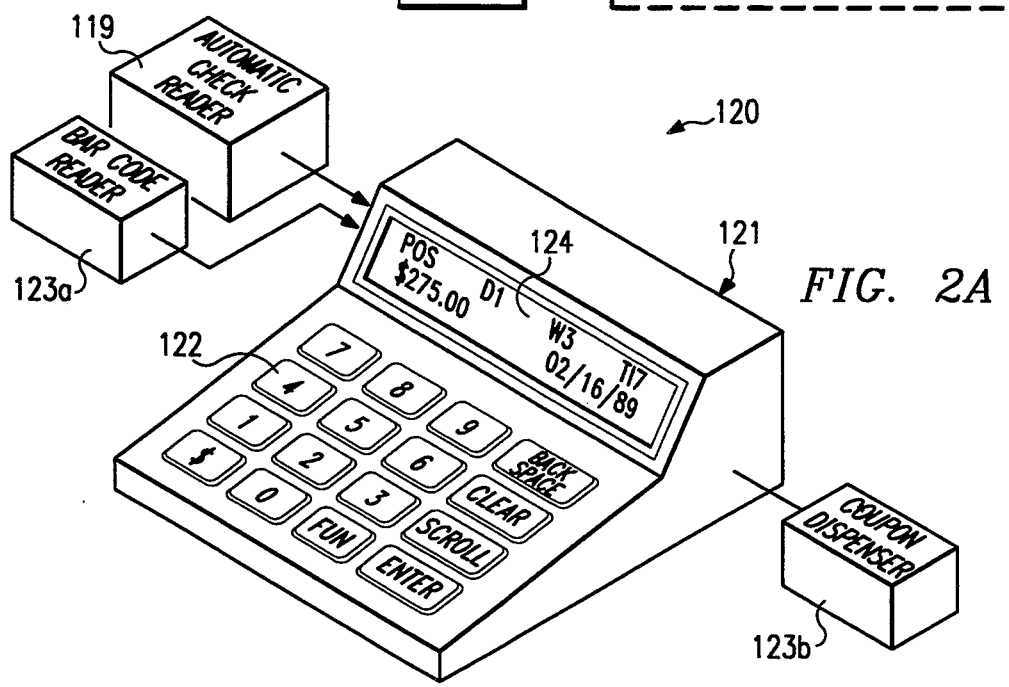
FIG. 2A shows a POS terminal, including the check reader, display and the keypad.

As shown in FIG. 2A, each POS terminal 120 includes an automatic check reader 119 and a transaction terminal 121 which includes a keypad 122 and a display 124. A bar code reader 123a is also connected to terminal 121 and is used to read bar code numbers on products purchased at the point of sale. Further, a coupon dispenser 123b is connected to terminal 121 to dispense coupons at the point of sale. Keypad 122 is a 4×4 key matrix that includes specific keys for Function, Enter, Scroll, Clear and Back Space, as well as 0-9 and $. Display 124 is a liquid crystal display capable of displaying two lines of up to twenty characters each.

For example, to initiate a check verification request, check reader 121 automatically scans the magnetic ink character recognition (MICR) data printed along the bottom edge of the customer's check and then the store clerk operates the keypad 122 to enter the amount of the check, along with the function code designating check verification. This request is displayed on display 124, and sent, along with data from the check reader 121, to transaction processor 112. The check verification response, including the customer's verification status (such as POSITIVE, NEGATIVE or CAUTION), and marketing information (such as the type of coupon to be dispensed) returned by the transaction processor is then displayed on display 124.

Figure 2C:
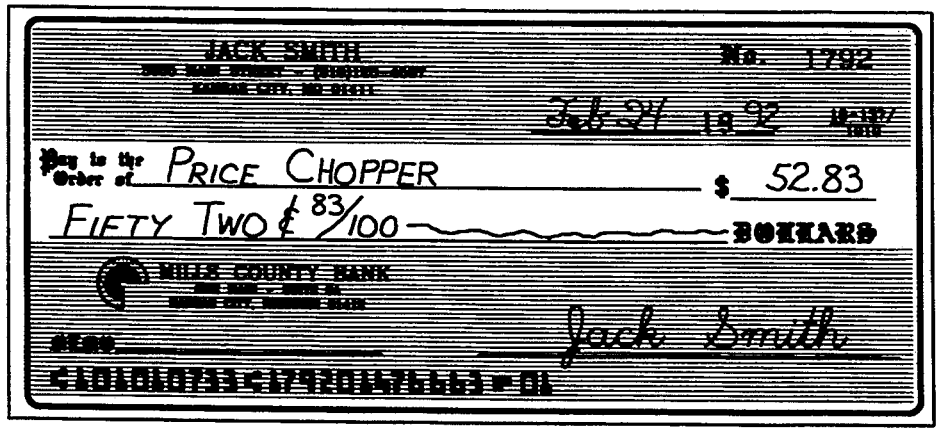
FIG. 2C illustrates a typical check with MICR symbols for reading by the check reader.
Figure 2B:
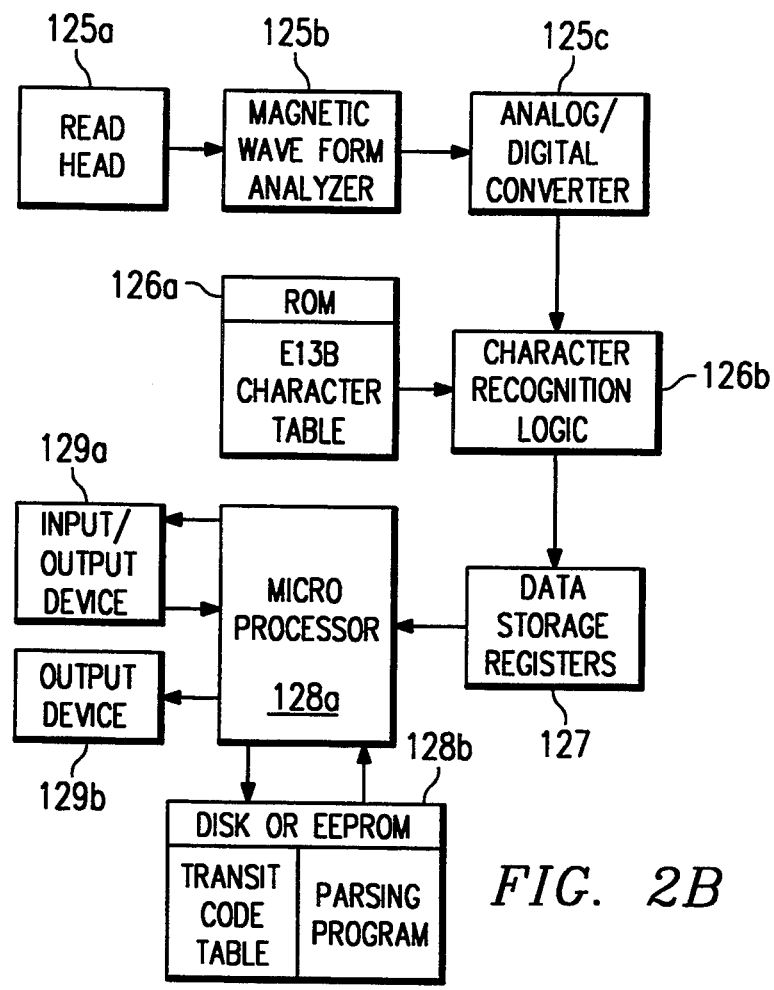
FIG. 2B shows a block diagram of the automatic check reader.

FIG. 2B illustrates a block diagram of an automatic check reader 119 in accordance with the present invention. Automatic check readers have been heretofore known, and the descriptions of such previously developed automatic check readers are found in U.S. Pat. Nos. 4,277,689; 4,143,355; 4,396,902 and 5,054,092, the subject matter of which is incorporated by reference herein. The present automatic check reader differs in that it contains a properly programmed processor and sufficient memory to enable the desired "parsing" and omitting of certain portions of the MICR code contained at the bottom of checks being read.

The MICR encoding of checks is known, and a detailed explanation of the MICR encoding scheme may be found in *The MICR Handbook* by Rylla R. Goldberg, published by Heath Printers, the subject matter which is hereby incorporated by reference. As noted in *The MICR Handbook*, and as will be subsequently described, the field of the MICR symbology located on the bottom of the check is broken into various data fields in which different banks can place different data at different locations. Conventional automatic check readers such as those noted in the above-noted patents often cannot detect a customer's checking account number because it is interspersed with other data such as the check sequence number.

The present automatic check reader is provided with structure which enables the customer checking account number and the bank transit number (which identifies the bank) to be detected within the code printed on the customer's check. This process involves detecting or parsing (the examination or analysis of a string of numbers or characters which is designed to detect or identify various subgroupings or sets within the string) followed by extraction of that set or sets which have been defined as the customer checking account number. The present automatic check reader is thus provided with circuitry which enables the customer's checking account number and the bank transit number to be parsed or detected and the remainder of the data extracted or omitted, such that the customer's checking account number and the bank transit number may be used as the unique customer identification code for the present invention. The present check reader thus provides substantial advantages over prior check readers which have not been useful for check verification or marketing techniques because it was not possible for such prior check readers to consistently detect customer account numbers on checks presented from different banks and bank branches.

Referring to FIG. 2B, the check reader 119 of the present invention incorporates a read head 125a which comprises a magnetic or optical read head operable to read MICR characters imprinted on checks which are passed through the check reader. The output from read head 125a is applied to a magnetic wave-form analyzer 125b which applies an analog signal to the analog to digital converter 125c. A digital output from converter 125c is applied to the character recognition logic 126b of the present invention. A disk or EEPROM 126a contains stored therein an E-13(b) character table which is applied to the character recognition logic 126b. Utilizing conventional technology, the logic 126b generates recognition data to data store registers 127 for application to microprocessor 128a when required. The disk or EEPROM data storage 126a includes a transit code table and a parsing program, and provides data and instructional programming for the microprocessor 128 to perform a parsing program discussed in more detail in FIG. 4B. An input/output device 129a is connected to microprocessor 128a, as is an output device 129b.

Figure 2D:
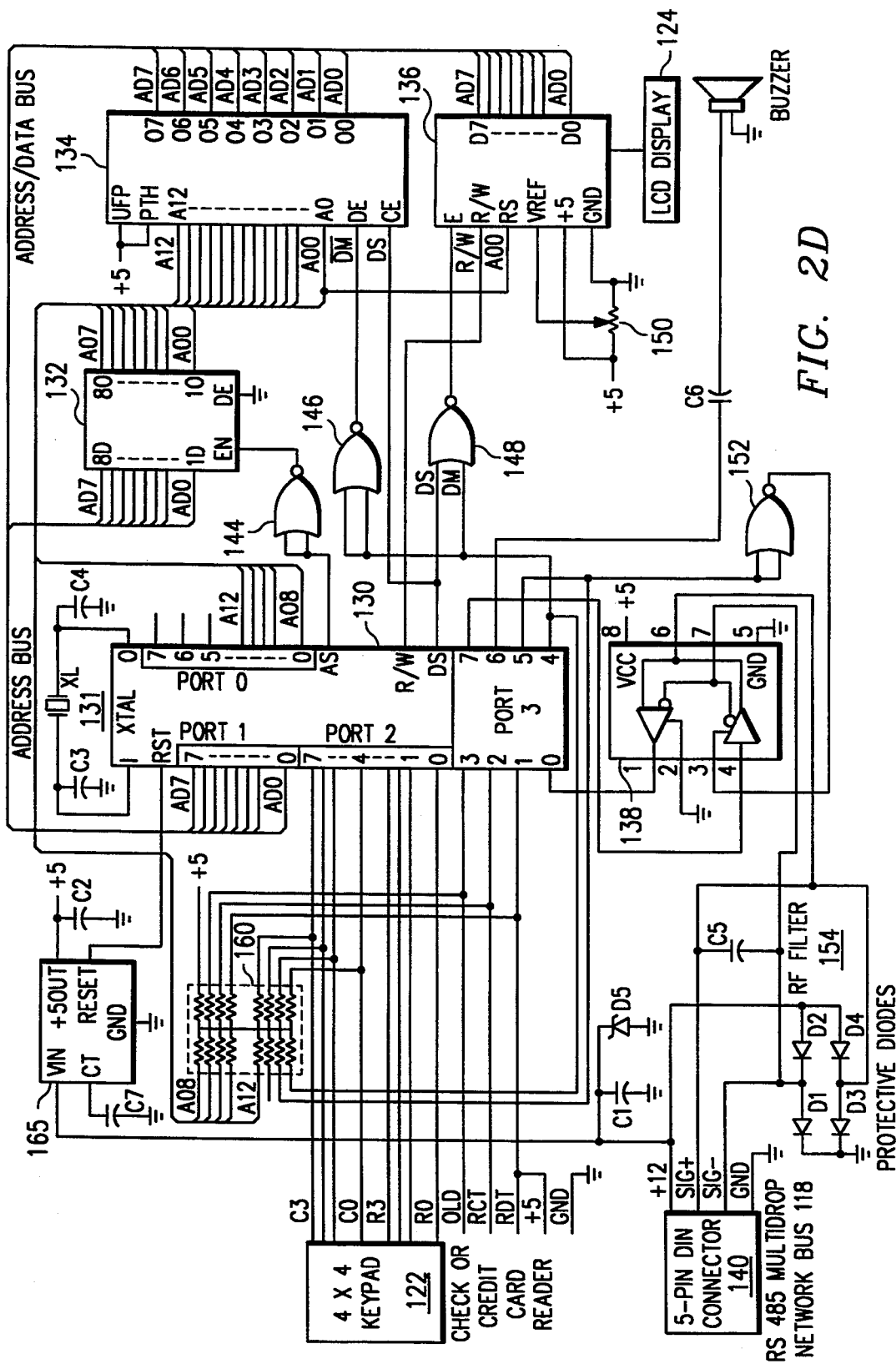
FIG. 2D shows schematic circuit detail for the transaction terminal.

In operation, the read head 125a reads MICR characters on the check and applies signals to the analyzer 125b to provide an output from the analog to digital converter 125c of the MICR characters being detected. The character recognition logic 126b provides optical character recognition to generate an indication of the characters represented by the MICR symbology on the check. This data is stored in the data stored registers 127 for application to the microprocessor 128a. The microprocessor 128 utilizes information from the transit code table in the disk or EEPROM 128b to determine the particular bank whose check is being scanned and also the particular location of the customer account number in the MICR code for that particular bank. The parsing program 128 is then operable to parse or eliminate all aspects of the MICR code except for the desired customer account number. The microprocessor 128 then generates an output to the output device 129b which indicates the desired customer account number of that particular check. The output device 129b is connected to pins 1-3 which serve as the I/O of the transactional terminal 121 circuitry which is shown in FIG. 2D, to be subsequently described.

The detected customer account number and bank transit number are then subsequently used in the various programs and subroutines of the present invention to provide check verification and marketing techniques in accordance with the invention. As noted, the present automatic check reader differs from previously developed check readers in its ability to detect the location of the customer account number and to omit all other portions of the MICR code except for the desired account number and perhaps the transit number. In this way, the present automatic check reader may be used to process all checks from all banks and their branches, regardless of the location of the customer account number and regardless of which branch of a particular bank is being utilized or even in such situations where a branch is sold or transferred to another entity.

FIG. 2C illustrates a typical check which will be used to illustrate the operation of the automatic check reader of the invention. As described in *The MICR Handbook* by Rylla R. Goldberg, and as is commonly known, the MICR check field contains four fields, namely the Amount, On Us, Transit, and Auxiliary On Us fields. Conventionally, the Amount field includes positions 1-12 in the MICR field, the On Us field includes positions 14-31, the Transit field positions 33-43 and the Auxiliary On Us field encompasses positions 45-65 in the MICR band. In the illustrated check in FIG. 2B, the Transit field comprises symbols plus the transit number sequence 101010733. This transit number identifies the particular banking institution. This transit number is set apart from the data contained in the On Us field, which field contains the customer's account number and also contains the number of the particular check. In this instance, the number sequence in the On Us field is 179201476663. The last two digits 0 and 1 in the MICR field are optionally included on many checks and may be offset by a symbol to indicate the branch number of the particular bank.

It can thus be seen that the sequence 179201476663 contains both the sequence number of the particular check, which in this particular instance is 1792, and also the customer's checking account number 01476663. As noted, it is very important in the present invention to automatically detect the customer's checking account number. It is common for many banks to provide symbology which separates the number of the particular check and the customer's account number. However, with many banks, as in the illustrated check of FIG. 2C there is no symbology which separates two pieces of information and therefore it has not been heretofore possible to automatically determine the actual customer's account number in all banks by conventional check readers. For example, conventional check readers which would scan the On Us field for the account number would indicate that the customer's account number was 179201476663, whereas the customer's true account number is 01476663.

An important aspect of the present invention is the ability of automatic check reader 119 to find the sequence number of the check and omit that number to leave the true customer account number. The encoding scheme may be different for each bank. This is accomplished by utilization of the disk or EEPROM 128a which contains tables which designate what encoding scheme is used in the MICR band for each bank. For example, the table stored in EEPROM 128b would indicate that the Mills County Bank, identified by the transit number 101010733, had a convention of always placing the check number in the first four locations of the On Us field. In the case of the check in FIG. 2C, the check reader 119 would access this information to know that the first four digits of the On Us field were merely the number of the check and should thus be omitted or parsed in order to determine the true checking account number of the customer, which was 01476663. Specifically, in the check illustrated in FIG. 2C, it can be seen that the number of the check at the upper right hand corner is 1792. This number would then be omitted by the check reader 119 to provide the true customer account number. In some instances, the customer account number may be combined with the transit number to provide a unique ID number.

It will be understood that the check number advances one unit each time a new check is written and therefore the data contained in the On Us field of the Mills County Bank would be continuously changing. Only by the check reader of the present invention having a stored knowledge of a particular location of the check number of the Mills County Bank would it be able to detect and omit or parse out the unwanted check number information.

The present check reader of the invention can determine the instances when the On Us field contains a space or suitable symbology separating the check number from the customer's account number, in addition to the scheme previously noted. In such cases, the check reader parses and omits the shortest number, which will be the check number. A particularly important aspect of the present invention is that the automatic check reader can read the MICR code of all banks and accurately pick out the customer's account number for utilization as a unique customer ID to perform the advantages of the invention.

Figure 3:
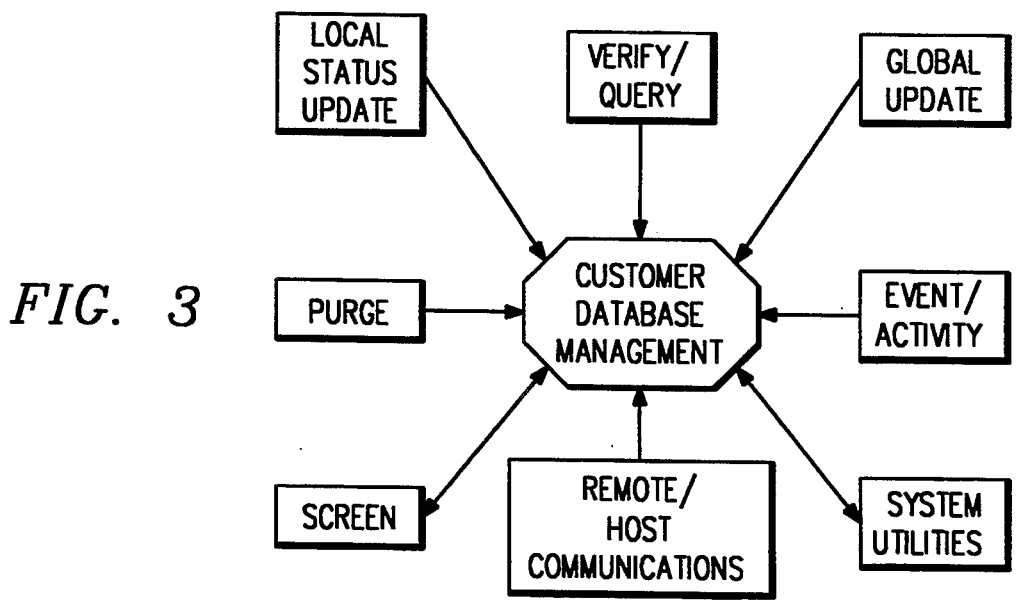
FIG. 3 functionally diagrams the check transaction processing system.
Figures 1, 4A:
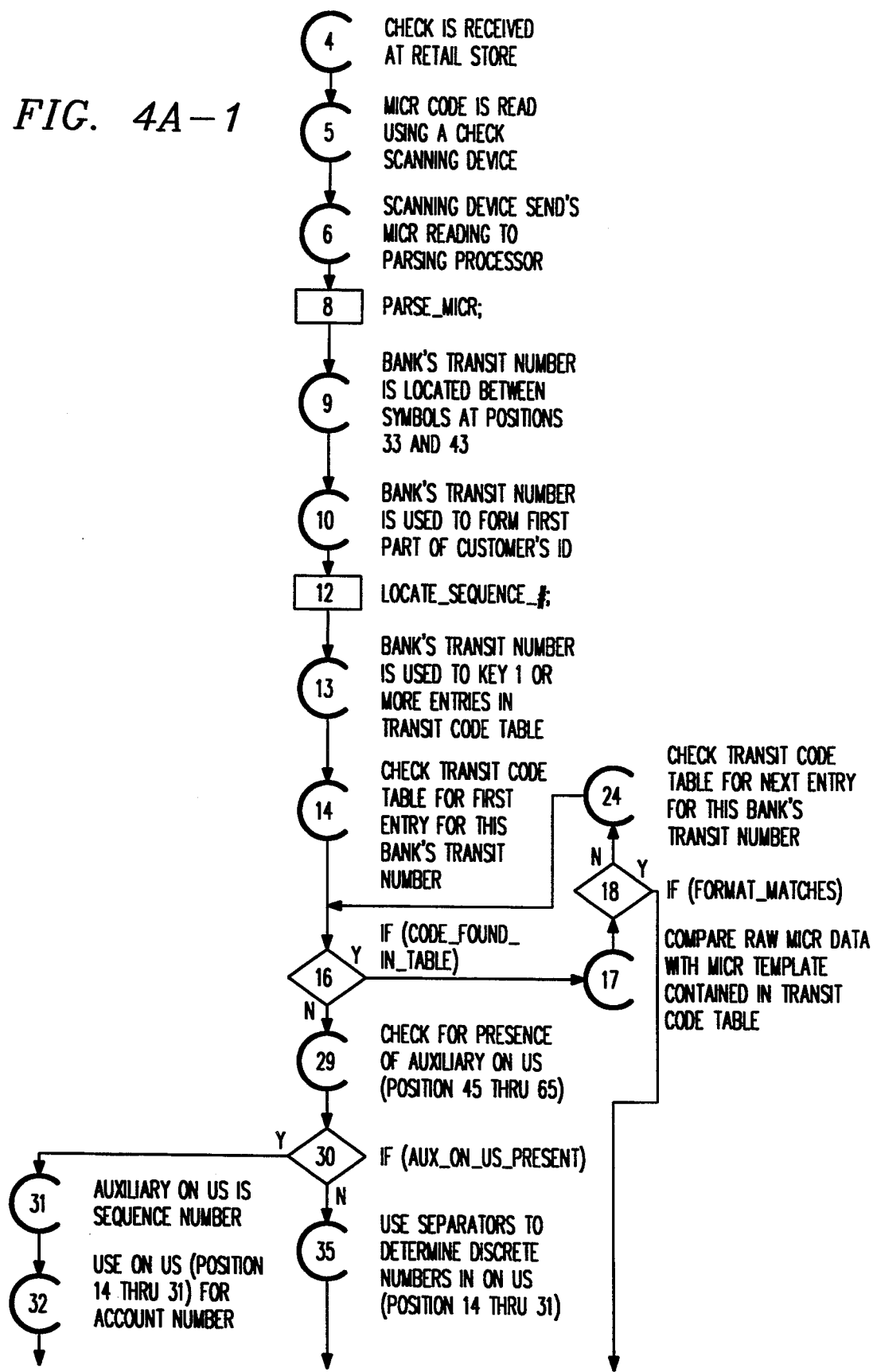
Figures 2, 4A:
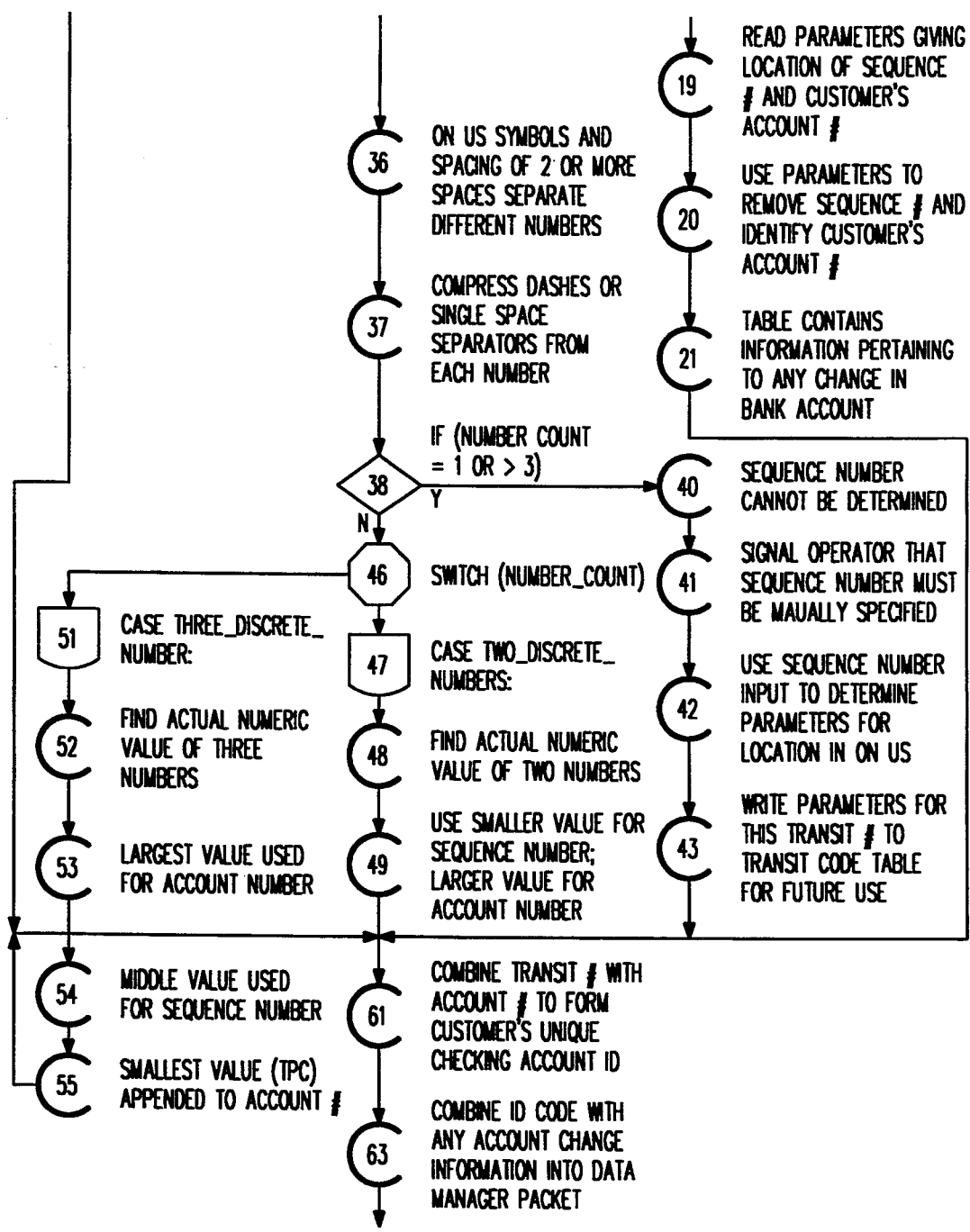
Figures 3, 4A:
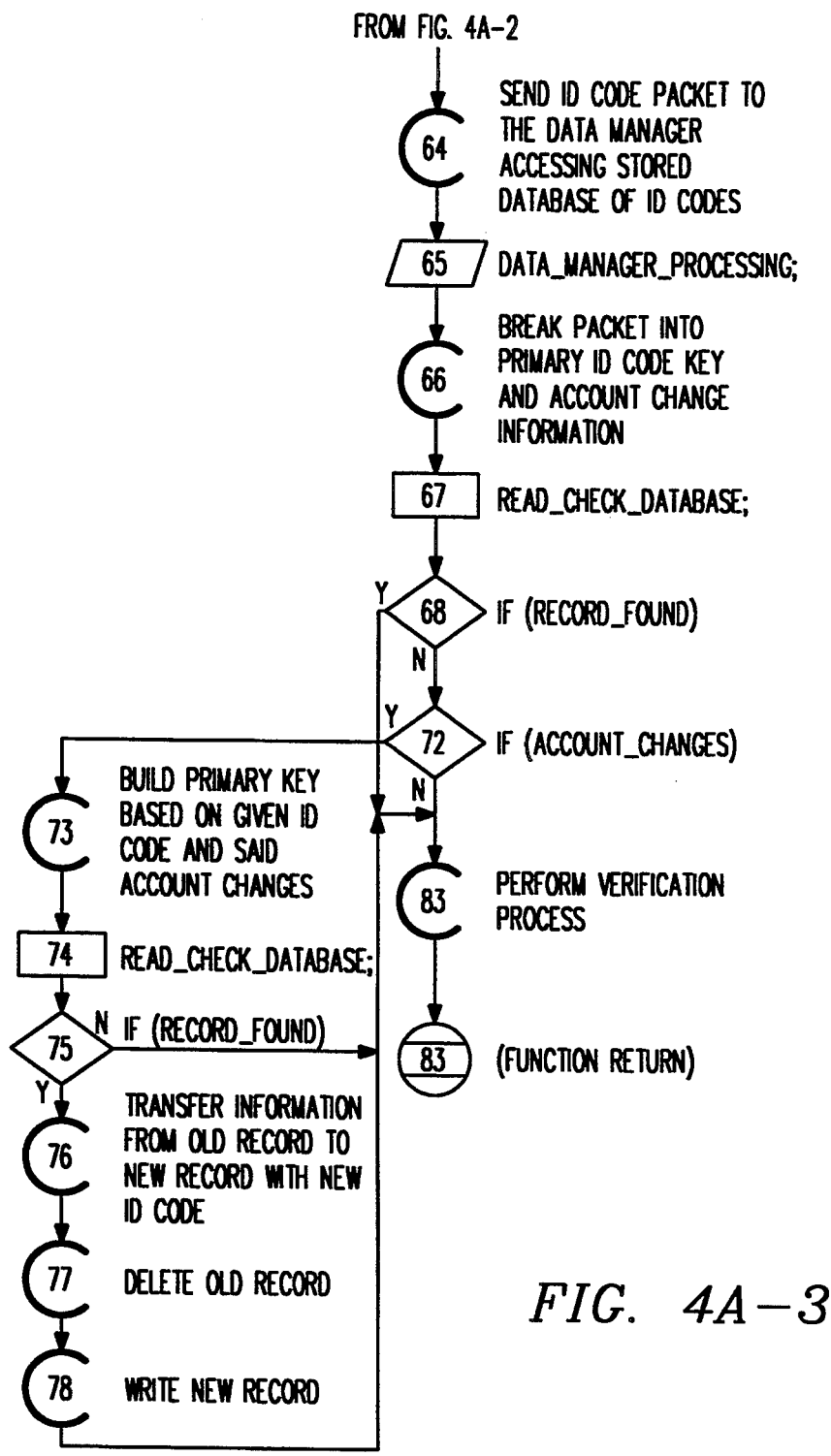

Another important aspect of the invention, as will be described in greater detail in FIGS. 4A-1 through 4A-3, is the ability of the automatic check reader 119 to be taught by the operator to recognize the eccentricities of each bank's MICR code. For example, if the system were for the first time attempting to read a check by the Mills County Bank and thus could not pick out the customer's account ID because it did not know the code for Mills County Bank, the present system could be taught by the operator and the new knowledge stored in table 128b. From that point forward, the system would be trained to recognize the customer's account number and to omit the unwanted check number in the first four positions of the On Us field.

The present automatic check reader 119 also can be taught to detect changes of a bank's branch number, and instances in which institutions are purchased and their transit number is changed, and cases wherein financial institutions run into difficulties and are required to change owners and therefore change transit Ids. Previous check readers were not able to keep track of such changes in banks and transit numbers. With the present check reader 119, such information can be stored in the transit code table 128b. Therefore, if the Mills County Bank of FIG. 2C changes its transit number or its branch number, that information can be entered into the transit code table 128b and from that point forward, the system will continue to recognize Jack Smith's checks and his unique checking account number even though the bank's transit number has been changed. With prior check readers, such changes in transit numbers would be scanned and considered to be a different bank and therefore Jack Smith's account number would not be recognized as belonging to the particular Jack Smith.

In addition, banks often have different types of accounts such as money markets, now accounts, commercial accounts, personal accounts and the like. So for a given bank transit number, there may be several non-obvious embedded locations for the particular next sequence number. For example, in the check shown in FIG. 2C, the first four digits in a personal checking account are known to represent the check sequence number. However, for a savings, NOW or money market account for the Mills County Bank, the check sequence number might be moved to the middle or the end of the On Us field. The information for each particular bank is stored in the transit code table 128b of the present reader 119 such that all branches and types of accounts of a bank may be accurately detected. The ability to teach or train the system to accommodate such new information upon the occurrence of changes is also important, as such new information may be input by the operator into the transit code table 128b and used from that point onward to detect accurately the customer's checking account number, as well as all customers for that bank.

Another important aspect of the invention is that the MICR parsing operation previously described and shown in FIGS. 4A-1 through 4A-3 do not have to be accomplished inside the automatic check reader 119. Indeed, the transit code table and parsing program may be incorporated in the host computer 110. A conventional check reader may thus be used to read in the information and the parsing program shown in FIGS. 4A-1 through 4A-3 can be accomplished in the host computer 110. It will also be understood that the automatic check reader 119 might be incorporated into the transactional terminal 121 and that both the automatic check reader 119 and the transactional terminal 121 might be incorporated or associated directly with an automatic cash register commonly in use by retailers.

The important aspect of the invention is the ability to always recognize a customer's checking account number in a MICR line automatically, no matter which bank or which type of account is involved. With the ability to generate an extremely accurate indication of the customer's account number and the bank transit number, a unique customer identification code is provided which may be utilized to provide the many advantages of the invention to be subsequently described.

While the preferred customer identification code comprises the checking account number and the bank transit number, it should be understood that various aspects of the invention may be practical using different customer identification codes. For example, many of the marketing and verification techniques hereinafter described can be accomplished by the store clerk manually entering the name, address and/or phone number into the system through data terminal keypad 122. This unique identifying data could then be used to identify the store customer. While such manual entry is slower and not as efficient or accurate as the automatic reading of the MICR code, the manual technique may have applications in certain circumstances.

As shown in FIG. 2D, the transaction terminal 121 includes:

(a) A Z8 microprocessor 130;
(b) An associated address latch 132;
(c) An EPROM 134;
(d) An LCD (liquid crystal display) module 136; and
(e) A differential transceiver 138.

Address and data paths are provided by an Address/Data Bus and a separate Address Bus.

The transaction terminal is coupled to the RS485 multi-drop network bus (118 in FIG. 1) through a 5-Pin DIN connector 140. The RS485 network bus provides signal lines SIG+ and SIG−, along with a +12 volt power line and a ground line.

EPROM 134 provides program memory for microprocessor 130, while LCD module 136 constitutes data memory. That is, the LCD module functionally interfaces to the microprocessor as memory, providing an 80-character display data register that is treated by the microprocessor as data memory.

EPROM 134 stores programs to control keypad 122, display 124 (i.e., LCD module 136) and network data communications. The keypad program includes conventional routines for decoding key-struck signals and receiving entered characters, as well as key-debouncing and N-key rollover. The display program includes conventional routines that write characters to and read characters from the display data register in LCD module 136. To that end, the display program provides mode control commands to LCD module 136 that control read/write operations, as well as operations for cursor positioning, backspace and scroll. The network program controls token-ring network communications, including establishing a terminal polling address when the transaction terminal becomes active, detecting POLL tokens addressed to the transaction terminal, building and sending NODATA and TXDATA answers, and receiving RXDATA tokens containing response data for the transaction.

LCD module 136 is a self-contained liquid crystal display module that includes liquid crystal display 124, and provides many display control functions internally. Display 124 is arranged in two lines of 20 characters each, with the internal 80-character display data register providing 40 characters of display memory for each line. Each line is independently scrolled under control of the LCD module in response to microprocessor mode control commands (for example, when the scroll key on keypad 122 is depressed). In addition to the internal display data register, the LCD module includes an internal control/status register. Logically, these registers are treated as, respectively, data and control/status ports. Data may be read to or written from the data port, while control is written to and status is read from the control/status report.

From above, the display control program in EPROM 134 provides the various mode control commands that invoke the display control functions implemented by the LCD module. For example, in response to appropriate mode control commands, the LCD module performs the necessary internal operations to move the cursor, output the character under the cursor, write a character in the cursor position, delete a character in the cursor position, clear the display, and output sequentially all characters in the display data register (such as after the enter key is depressed).

Microprocessor 130 provides four input/output ports 0–3. Port 0 is output only, and provides the higher order address bits A08–A12 over the Address Bus (the 3 higher order bits A13–A15 of the 16-bit Z8 microprocessor address are not used by the transaction terminal). Port 1 is input/output, providing the lower order address bits A00–A07 and receiving 8-bit data bytes over the Address/Data Bus. Port 2 is input only, and is coupled to the column/row matrix lines of the 4×4 keypad matrix for keypad 122, i.e., column lines C0–C3 and row lines R0–R3.

Port 3 (0–7) is a multi-purpose input/output port. Pins 0 and 7 are a serial I/O port for an internal UART (universal asynchronous receiver transmitter). Pin 5 is an output drive enable line that controls the transmit/receive state of differential line driver 138. Pin 4 is a data memory DM line used to select either program memory (i.e., EPROM 134) or data memory (i.e., LCD module 136). Pins 1–3 are an I/O port for the check reader 119 or for a credit card reader, and Pin 6 is an output port for a buzzer.

In addition to the four I/O ports, microprocessor 130 provides an address strobe line AS, a data strobe line DS and read/write line R/W.

A clock circuit 131 includes a crystal oscillator that establishes a 7.3728 Mhz system clock. The Z8 microprocessor is clocked down (from its 12 Mhz specification) to accommodate the LCD module's response time.

Address latch 132 receives the lower order address bits A00–A07 from microprocessor port 1 over the Address/Data Bus during the first address cycle. The address latch is enabled to latch these address bits by a microprocessor address strobe provided through an inverter 142. The latched address bits A00–A07 are available at the output of address latch 132 which is coupled to the Address Bus.

EPROM 134 receives a 12-bit address A00–A12 from the Address Bus. The lower order bits A00–A07 are provided by address latch 132, and are available on the Address Bus during the second address cycle when the higher order bits A8–A12 are provided by microprocessor port 0 over the Address Bus. Thus, EPROM 134 receives the complete 12-bit address A00–A12 from the Address Bus during the second address cycle. The addressed data byte AD0–AD7 is available from the EPROM output port over the Address/Data Bus and may be read when microprocessor 130 provides a data strobe DS to the chip enable CE input to the EPROM.

LCD module 136 includes an I/O port (pins D0–D7) coupled to the Address/Data Bus (lines AD0–AD7). To connect either the display data register or the control/status register to the I/O port, Microprocessor 130 selects either data port operation or control/status port operation with a register select signal provided by the address bit A00 from the Address Bus to the R/S input of the LCD module—if A00 is even (logic 0), the display data register is connected to the I/O port, and if A00 is odd (logic 1), the control/status register is connected. Read/write operation is selected by R/W signal from microprocessor 130 to the R/W input to LCD module 136.

LCD module 136 is enabled for output over the Address/Data Bus by an enable signal from a NOR gate 146, which receives input from the microprocessor's data strobe DS line and data memory DM line (port 3, pin 4). That is, LCD module 136 may be read only if both the data strobe and data memory lines are active. In contrast, EPROM 134 is enabled for a read operation only if the data strobe line is active while the data memory line is inactive causing an active output from an inverter 144. In this manner, microprocessor 130 uses the data memory line to select between program memory (EPROM 134) and data memory (LCD module 136).

A potentiometer 148 is used to adjust contrast for the LCD display 124. The potentiometer is connected between the pins +5 volts and ground on LCD module 136, with the potentiometer voltage being applied to the voltage reference pin VREF.

To read instructions from EPROM 134, microprocessor 130 provides a 12-bit address on the Address Bus—the lower order address bits A00–A07 from port 1 through address latch 132, and the higher order address bits A08–A12 from port 0. EPROM 134 is enabled for output by the data memory line (port 3, pin 4) being held inactive resulting in an active output-enable signal from inverter 144 to the EPROM. Conversely, LCD module 136 is disabled for a read operation because the inactive data memory line insures an inactive signal from NOR gate 146 to the LCD module, thereby insuring that EPROM 134 has exclusive access to the Address/Data Bus. During the read cycle, microprocessor 130 enables EPROM 134 to output the addressed data byte by providing a data strobe DS to the chip-enable input to the EPROM.

To read display data from the display data register in LCD module 136, Microprocessor 130 executes a read display routine in the display control program stored in EPROM 134. Microprocessor 130 first disenables EPROM 134 by holding the data memory line (port 3, pin 4) active, causing the output-enable output from inverter 146 to be inactive. LCD module 136 is then enabled for input/output when a microprocessor data strobe drives active the output from NOR gate 148, which now has both its inputs (DM and DS) active.

Once LCD module 136 has been given access to the Address/Data Bus, a display-data-register read operation is accomplished as follows. Microprocessor 130 outputs from port 1 an LCD mode control byte including a register select bit A00 over the Address/Data Bus. The register select bit is coupled through address latch 132 and the Address Bus to the RS input to LCD module 136 which selects bit is in the C/S state, causing LCD module 136 to select the control/status register for I/O access to the Address/Data Bus. Microprocessor 130 also places its read/write R/W line in the write state, so that the mode control byte can be written into the control/status register. Microprocessor 130 then provides a data strobe DS that enables LCD module 136 to latch the mode control byte from the Address/Data Bus into the control/status register.

In accordance with this mode control command, LCD module 136 places a not-ready status byte in the control status register, makes the designated display character in the display data register available for output on the Address/Data Bus, and then places a ready status byte into the control/status register. Microprocessor 130 switches the read/write line to read (the control/status register is still selected for I/O), and then provides a data strobe DS to read the status byte in the control/status register. (The microprocessor continually strokes the LCD Module until a ready status byte is returned from the control/status register.)

Microprocessor 130 then outputs a register select bit (A00) that causes LCD module 136 to select the display data register for output. Finally, the microprocessor provides a data strobe to read the first display data character over the Address/Data Bus into port 1.

This procedure—select control/status, read status, select display data, read display data—is continued until all requested display data characters have been read. That is, microprocessor 130 first reads the status register to determine when LCD module 136 is ready (i.e., when the next display data character is available), and then reads the character.

The procedure by which microprocessor 130 provides display data characters for display by LCD module 136, writing the characters into the display data register, is analogous to the procedure for reading display data characters. Executing a write display routine in the display control program, microprocessor 136 first writes a corresponding mode control command into the control/status register of the LCD module, and then reads status to determine when the LCD module is ready. Microprocessor 130 then selects the display data register, and writes the first display data character over the Address/Data Bus. Microprocessor 130 reads the status register to confirm that the LCD module is ready prior to writing the next display data character. This procedure of reading the status register and then writing a display data character is continued until all display data characters have been written.

Differential transceiver 138 controls data communications over the network bus 118 connected to connector 140. The RS485 communications protocol is implemented by microprocessor 130 executing the network communications program stored in EPROM 134. Port 3 of microprocessor 130 is used as a communications port, with pins 0 and 7 providing a serial I/O port, and pin 5 providing a transceiver drive enable line through an inverter 152 (the differential transceiver is in the transmit mode if the signal is active, and in the receive mode if the signal is inactive).

On the network side of differential transceiver 138, signal lines 6 and 7 are coupled, respectively, to the network bus signal lines SIG+ and SIG−. These signal lines are coupled to the +12 volt line through opposite sides of a protective diode network 154.

While waiting for a token (either POLL or RXDATA) over the network bus, microprocessor 130 holds the transceiver drive enable line inactive, thereby placing differential transceiver 138 in the receive mode. When a token is received through differential transceiver 138 into the serial I/O port (port 3, pins 0 and 7), microprocessor 138 switches the transceiver drive enable line active and transmits either a TXDATA or NODATA answer via the serial I/O port and the differential transceiver.

Keypad input is accomplished in a conventional manner using a 4×4 keypad matrix with column lines C0–C3 and row lines R0–R3. Key-struck decoding is accomplished as follows. Column lines C0–C3 are normally held high by a resistor network 160, while microprocessor 130 (port 2) holds the row lines R0–R3 low. When a key is struck, the corresponding column line is brought into contact with that key's row line, and the column line is brought low, which is detected by microprocessor 130. The microprocessor then switches the port 2 lines high, and sequentially drops a row line low until the key-struck column line goes low, thereby identifying the key that was struck by its row/column intersection.

Keypad control functions, such as debouncing and N-key rollover are accomplished in a conventional manner using program routines of the keypad control program stored in EPROM 134.

Power for the transaction terminal is provided by a voltage regulator 165 that receives +12 volts from the +12 volt line of the network bus. Voltage regulator 165 provides a stable +5 volt logic level.

A transaction terminal is initialized as follows. At power on, voltage regulator 165 provides a reset signal to microprocessor 130 when the +5 volt logic level is stable. Microprocessor 130 turns port 0 off, so that the Address Bus is controlled by the low-current resistor network 160, which holds the Address Bus lines A0-8–A12 high.

Microprocessor 130 outputs from port 1 an initialization address over the Address/Data Bus, which is latched into address latch 132 and placed on the Address Bus. EPROM 134 receives the initialization address A00–A12 (with bits A08–A12 being held high by resistor network 160), and makes the addressed instruction available at its data output port. Microprocessor 130 then reads the first instruction over the Address/Data Bus. Port 0 is turned on, so that resistor network 160 no longer controls the address lines A08–A12 of the Address Bus, and normal operation commences under control of microprocessor 130.

1.4. Multiple-Store Configuration

As shown in FIG. 1, for businesses with multiple stores, a check transaction processing system 110 is located in each store.

One store is designated as a "host" system, and the other stores are designated as "remote" systems. The host system coordinates the global exchange of check verification data and other customer information, but otherwise operates as a local system for that store in the same manner as the remote systems. Operation as a host does not affect concurrent local operation, i.e., host/remote status is transparent to the check transaction processing operation at each store.

Each store operates relatively autonomously in developing and maintaining its local customer database and providing check transaction processing. However, the stores are also able to globally exchange certain customer information useful to all of the stores, particularly for purposes of check verification. For example, while it is probably unnecessary from a credit standpoint for the stores to exchange information about customers who typically frequent only a single store and do not present check transaction problems, the stores will probably want to exchange information about customers who have written bad checks at one or more stores, or who are in a cautionary status as new customers. Moreover, the present system permits exchange of data between stores for marketing purposes. Such a global exchange of customer information reduces the likelihood that the business will experience a significant loss from a concerted bad check writer.

Each store's customer database is updated with both local and global customer information. Each local check transaction processing system 110, including the designated host system, continually updates its customer database with local customer information, either automatically through processing check transactions or through operator-input of customer status data (such as negative status information). At regular intervals, each remote system transfers to the host selected customer information (such as negative and caution status information). The host updates its customer database with this customer information, and transfers back to each remote system global customer information from all remote systems. Each remote system then updates its customer database with this global customer information.

1.5. Exemplary Components

The detailed specifications for transaction processor 112, and its associated disk storage 114, and network communications interface 116 are not critical to this invention, being a matter of design choice. For the preferred embodiment, transaction processor 112 uses a Western Digital Processor Board Model No. WD286-WDM2 based on the Intel 80286 processor chip. Disk storage unit 114 is a Seagate Technologies Model ST225, and communications interface 116 is Sealevel Systems RS485 Communications Board Model No. SIO-485. The transaction processor runs MSDOS 3.3.

The detailed specification for point-of-sale transaction terminals 120 is not critical to this invention, being a matter of routine design specification. For the preferred embodiment, transaction terminal 120 includes the following components:

| | |
|---|---|
| Microprocessor 130 | Zilog Z8 (86C9112PSC) |
| Address Latch 132 | 74HC373 |
| EPROM 134 | 27C64 |
| LCD Module 136 | Optrex DMC16207 |
| 4 X 4 Keypad | Standard 4X4 matrix |
| Diff. Transceiver | 75176 (RS485 compatible) |
| Voltage Regulator | LM2925 |

Alternative similar point-of-sale units are commercially available, such as from Omron Business Systems Model No. C.A.T. 90.

2.0 FUNCTIONAL DESCRIPTION

As diagrammed in FIG. 3, the check transaction processing system performs the following general functions:

(a) Verification (with Transactional Update) and Query
(b) Local Status Update
(c) Global Update
(d) Event-driven activities
(e) Customer database purge
(f) Host/Remote communications as well as the customer database management operations necessary to support these functions. In addition, certain system information and diagnostic functions are performed.

The verification function involves sending a request for check transaction verification from a point-of-sale terminal 120 to the transaction processor, which performs the necessary database operations to process the request, update the customer database with transactional data (such as frequency and dollar amount) to reflect the current transaction, and return an appropriate response. The local status update function involves continuously inputting customer status changes (particularly to reflect bad check experience) for customers in a store's local customer database. The global update function, for multiple-store systems, involves continuously transferring among the stores selected customer information (preferably caution and negative status information). The purge function involves removing obsolete or unwanted customer records from the customer database based on specified purging criteria. The event-driven activities involve certain database management functions (such as purge and backup), as well as host/remote communications for global update, automatically performed at regular intervals.

2.1. Database Structure

The customer database includes all customer information used and maintained by the check transaction processing system. The customer database comprises two separate files containing customer information: the customer file and the negative status file. In addition, a system control file contains transactional limits used during check verification and purge limits.

The customer file contains customer records that include the following customer information:

| Field | Description |
|---|---|
| Check ID | Customer checking account number |
| Verification Status | POSITIVE, NEGATIVE, CAUTION, CASH ONLY, or STOLEN |
| User Flags | User assigned flags that designate a customer as PREAPPROVED for check transactions regardless of any transactional limits, or as being authorized for check transactions on a MANAGER ONLY approval basis regardless of actual status |
| Transfer Date/Time | Date/time the customer record was last accessed and updated (written to disk), used in host/remote transfers for global update (transfers from host to remote generally do not affect this date) |
| Access Date/Time | Last date/time the customer record was accessed and updated (a query function does not change the access date/time) |
| Status Change Date | Date/time customer status changed (e.g., CAUTION TO POSITIVE) |
| DWT Frequency | Day/Week/Total values for transaction frequency (updated transactionally during check verification and globally |
| DWT $Amount | Day/Week/Total dollar amounts (updated transactionally during check verification and globally |
| Previous Status | Customer's previous status (such as CAUTION prior to being rolled POSITIVE) |
| Frequency Since Transfer | Total number of check transactions since the last global transfer |
| $Amount Since Transfer | Total dollar amount volume since the last global transfer |
| Marketing Data | Purchases made of predetermined products, store departments and the like |

The file specification for a customer record is set forth in Table 1 at the end of the specification.

The customer file is indexed by (a) check ID, and (b) status/transfer date/check ID.

The preferred intervals for maintaining frequency and dollar amount transactional data are Day/Week/Month/Total, where the day is the current 24-hour period, the week is the previous 7 days, the month is trailing 30 days, and the total is the total since the customer's first check transaction. The DWT designation will be used throughout this specification to indicate the three separate values for either Frequency or $Amount. Preferably, DWT Frequency and $Amounts are maintained on a global basis, so that for those records that have been globally updated (such as NEGATIVE and CAUTION status customer records), the DWT values will be global rather than local. Alternatively, separate local and global DWT transactional data can be maintained in the customer records, as shown in Table 2.

A customer can be assigned one of five check verification status designations:

| Status | Description |
|---|---|
| CAUTION | The customer is a new customer, and a specified check clearance interval since the customer's first check transaction has not passed |
| NEGATIVE | The customer has one or more outstanding bad checks at any store location |
| POSITIVE | The specified check clearance interval since the customer's first check transaction has passed, and no bad checks are outstanding at any store location |
| CASH ONLY | The customer is not authorized to cash checks, even though no bad checks are outstanding |
| STOLEN | The customer has reported stolen checks |

Customer status is assigned during customer record creation, and then updated (transactionally, locally or globally) to reflect changes in customer status, such as due to elapsed time between check transactions or bad check history.

In addition, the local update function can be used to assign to a customer either of the following user flag designations, which override normal status responses to check verification or status query requests:

| User Flag | Description |
|---|---|
| PREAPPROVED | The customer has been preapproved for check transactions that may otherwise exceed certain transactional limits applied even to customers with POSITIVE status |
| MANAGER ONLY | The customer is not authorized to cash checks without manager approval, even though no bad checks are outstanding |

In response to a check verification (or status query) request entered at a transaction terminal, the transaction processor returns a response with either customer status, or if specified transactional limits have been exceeded, a CALL MANAGER directive, unless the PREAPPROVED or MANAGER ONLY user flags in the customer's record have been set. Generally, a check transaction will be authorized if the customer has a POSITIVE status or is PREAPPROVED, will require manager approval for MANAGER ONLY regardless of status, and will be refused if customer status is NEGATIVE, CASH ONLY or STOLEN. Check authorization for customers with CAUTION status is a matter of store policy. For example, check authorization can depend upon DWT Frequency or $Amount, or the type of check transaction (such as amount of purchase only), or upon having the check transaction approved by a store manager.

The CALL MANAGER directive is not a verification status contained in a customer record, but rather, is the response to a verification request if, for any status (including POSITIVE), the current check transaction causes transactional limits specified in the system control file for DWT Frequency and $Amount to be exceeded.

The negative status file contains negative status records that include the following customer information (by location for multiple store systems):

| Field | Description |
| --- | --- |
| Check ID | Customer checking account number |
| Location | The location identification for the store (each store having a NEGATIVE and/or CASH ONLY status history is assigned a separate negative status record) |
| NEGATIVE Status | Active -- That location has a bad check outstanding |
| | Inactive -- That location has no bad checks outstanding |
| CASH ONLY Status | Active -- That location has designated the customer as CASH ONLY |
| | Inactive -- That location has not designated the customer CASH ONLY |
| Access Date/Time | Last date/time the negative status record was accessed and updated (a query function does not change this date) |
| NEGATIVE Date/Time | Date/time the status first became NEGATIVE |
| CASH ONLY Date/Time | Date/time the status first became CASH ONLY |
| BAD Frequency | Total number of bad checks at that location |
| BAD $Amount | Total dollar amount in bad checks at that location |

The file specification for a negative status record is set forth in Table 2 at the end of the specification.

The negative status file is indexed by (a) status/check ID/location, and (b) status/access date/check ID/location.

The negative status file supplements the customer file for those customers with a bad check history by recording BAD Frequency/$Amount by location, and also maintains CASH ONLY status by location.

The system control file includes the following selectable limits:

| Limits | Description |
| --- | --- |
| CAUTION/POSITIVE | This limit defines a check clearance interval for new customers who will be rolled for check transactions after that interval (assuming the first check is not returned) |
| CALL MANAGER | Separate DWT limits are provided by status for both Frequency and $Amount, defining the transactional limits applied to each status |
| PURGE | Separate Purge limits are specified for each of the five customer status designations; also used to define a Reset/CAUTION interval |

The file specification for the system control file is contained in Table 3 at the end of the specification.

These limits are all specified by the user during system configuration. The CALL MANAGER limits are used to override the normal customer status response to a verification request when any DWT Frequency/$Amount CALL MANAGER limit is exceeded by the current check transaction. As an alternative to using the Purge limits for deleting customer records with a specified (by status) degree of obsolescence, these limits can be used to roll a POSITIVE or any other status back to CAUTION if the specified Reset/CAUTION interval between check transactions (defined by the corresponding Purge limit) has passed. In addition to these limits, the system control file contains various system information.

The specific design of the customer database, and in particular the file specifications for the customer file, negative status file, and system control file, are not critical to the invention, being a matter of design choice. Any customer database will likely comprise customer records identified by the customer check ID, and include selected transactional/customer information; such as check verification status and transactional frequency and dollar volume over specified intervals.

2.2. Function Codes

The specific functions available in the check transaction processing system are invoked by entering at a transaction terminal 121 a request including an appropriate function code (function key plus code number) and request data (such as check ID and $Amount).

The specific check transaction processing functions are set forth in Table 4 at the end of the specification, with each function being described in terms of function code, description, keypad input, and keypad output.

These functions are in the following general categories:

| Function | Description (Function Code) |
| --- | --- |
| Verify | Request check verification status for the current check transaction (F55) (updating the corresponding customer record to reflect the current transaction) |
| Query | Request information about status (F1), NEGATIVE status and locations (F2, F3, F4) and DWT Frequency and $ Amounts (F5) (the customer database is not updated) |
| Input Status | Add (F40, F41, F44) and Delete (F60, F61, F62, F63, and F66) the status values CASH ONLY, STOLEN and NEGATIVE, and Add (F42, F43) and Delete (F62, F63) PREAPPROVED and MANAGER ONLY user flags |
| Event Activity | Start (F950) and Stop (F951) an event activity, request event time (F952), and request activity status (F953) |
| System Information | Request certain system information, including memory usage (F902), disk usage (F903), customer file size (F904), negative status file size (F905), CAUTION/POSITIVE roll period (F906, F907), Purge limits (F906, F908-F912), CALL MANAGER limits (F906, F913-F917) |
| System Diagnostics | Request system diagnostic functions, including log-in/out (F77/F88), keypad debug (F960), modem debug (F970), data manager debug (F980), open/close customer database (F981/F982) and shutdown (F999) |

2.3. Verify/Query

The verify function is used both to provide verification status (such as POSITIVE, NEGATIVE or CAUTION) for a check transaction, and to update the transactional data in the customer database. The principal difference between the verify and query functions is that, while both functions retrieve the specified (by check ID) customer record (or in the case of query, the negative status record) to provide an appropriate response, only the verify function actually updates the customer database by writing the updated customer record back to disk.

As previously noted, check reader 119 reads the MICR code on checks and senses the customer account number in order to generate a unique customer ID for use by the processor of the present invention. As previously discussed, an advantage of the present check reader 119 is its ability to detect the customer account number on any and all bank checks, regardless of the location of the account number within the MICR number and regardless of whether the account number is properly identified by spaces or symbols. In addition, the present check reader operates to check against a stored Transit Code Table to detect changes in the bank's transit code and the like.

FIGS. 4A-1 through 4A-3 illustrate a flow chart illustrating the operation of the MICR parsing and omitting function of the present invention. This function can be accomplished in the processor and storage of the check reader 119 or in the host processor 110. Explanation of the MICR parsing and omitting function is as follows:

| Step | Description |
|---|---|
| 4 | Check is taken for tendering purchase at retail store. |
| 5 | Scanning device is used to read the MICR code from the bottom of the check. |
| 6 | Scanning device sends MICR data to parsing processor 128a. Processor may be in reader itself or external computer. |
| 8 | MICR code must now be parsed for meaningful data. ANSI standards specify the following field locations within MICR band:<br>Amount field 1–12<br>On Us 14–31<br>Transit 33–43<br>Auxiliary On Us 45–64 |
| 9–10 | Use transit field for the first part of the customer's ID number. |
| 12 | The check's sequence number (which matches the number on the top right hand corner of the check) must be located in order to determine the customer's bank checking account number. |
| 13 | A variable length, dynamic TRANSIT CODE TABLE is maintained for checks that cannot be successfully parsed. In addition, information for MICR changes such as new transit number or addition or change of Transaction Processing Code (TPC - used for branch banking) are indicated in the table. The indexed key for this table is the transit number allowing duplicates for multiple entries for each bank. Included for each table entry is the current MICR "mask" and a prior "mask" to show any changes. Updates to this TABLE can be entered from the keypad or downloaded from another computer. |
| 14 | START a database query in the TRANSIT CODE TABLE at the FIRST entry with the transit number scanned from the check. |
| 16 | If NO entry is found for this transit number, proceed to the parsing functions starting at step 29. Otherwise continue to step 17 to determine if this table entry pertains to this check. |
| 17–18 | Use the current MICR "mask" in the table as a template to determine if this MICR data corresponds with this table entry. If they do match proceed to step 19, otherwise go to step 24 to try the next entry. |
| 19–20 | Locate the sequence number in the current MICR "mask" and use this to remove sequence number from MICR data. |
| 21 | If the prior "mask" indicates that the banking institution has either changed transit numbers or made additions to their account number (such as TPC code for branch banking), use this prior mask to build the key for the OLD record. Proceed to step 61; |
| 24 | Query for the NEXT entry in the TRANSIT CODE TABLE for this transit number. If no additional entry was found, proceed to parsing functions starting at step 29, otherwise go to step 17 to determine is this Table entry pertains to this check. |
| 29–32 | Data in the Auxiliary On Us field, unless otherwise indicated in the TRANSIT CODE TABLE, is the check sequence number. This would indicate that all data in the On Us field make up the customer's bank account number. |
| 35–37 | Parse On Us field. Use any data within positions 13 through 32 as the On Us field. Discrete numbers are usually divided with 2 or more spaces or the ANSI On Us character. Embedded single spaces and the ANSI MICR dash are removed from within said discrete numbers. |
| 38 | Test for number of discrete numbers parsed from the On Us field . . . |
| 40–43 | If one, or more than three discrete numbers are located in the On Us field, the sequence number is either not present or is embedded in such a way that its location cannot be determined. The operator is signaled that the sequence number cannot be determined. Operator then enters the sequence number including any lead zeros. The system can then determine the relative position of the sequence number in the On Us field and stores this as an additional entry to the TRANSIT CODE TABLE. |
| 47–49 | If two discrete numbers are located in the On Us field, unless otherwise indicated in the TRANSIT CODE TABLE, the number with the lesser value is the check sequence number, and the number with the greater value is the customer's checking account number. |
| 51–55 | If three discrete numbers are located in the On Us field, unless otherwise indicated in the TRANSIT CODE TABLE, the number with the greatest value is the customer's checking account number. The smallest value is the Transaction Processing Code and is appended to the end of the checking account number. The middle value is the check sequence number. |
| 61 | Once the bank's transit number and customer's checking account number are parsed from the MICR band, they are combined (transit number followed by account number) to form the customer's unique checking account ID. |
| 63–64 | A packet such as following is built and |

-continued

| Step | Description |
|---|---|
| | passed to the Data Manager: |
| | char source_id;  /* Node ID indicating source of packet */ |
| | char FLAG;  /* A flag signaling a change in account number */ |
| | char ID_CODE[30];  /* 30 byte field containing current ID CODE */ |
| | char OLD_CODE[30];  /* 30 byte field containing old ID CODE */ |
| 65–67 | Use ID CODE as primary key for accessing check database. |
| 68 | If record is found, go to step 83 for the verification process. Otherwise proceed to step 72 for possible account change processing. |
| 72 | If FLAG indicates there was a change in the account number, proceed to step 73 to locate the old record, otherwise go to step 83 for the verification process. |
| 73–75 | Using OLD CODE as primary key to query the check database. If no record is found, proceed to step 83 for the verification process, otherwise proceed to step 76 to transfer the information from the OLD record to the NEW. |
| 76 | Copy OLD record to NEW record. |
| 77 | DELETE OLD record from check database. |
| 78 | Move new ID code into NEW record. WRITE NEW record to check database. |
| 83 | VERIFICATION PROCESS. |

It can thus been seen that the check reader 119, in combination with the MICR parsing subroutine of FIGS. A-1 through 4A-3 operates to detect and extract the customer's account number on all checks, regardless of where located or even if improperly identified by a space or symbol. By teaching the processor any changes in the bank transit number or any unique positioning of the account number, the system thus is always able to promptly identify and detect a customer's unique ID for further use.

Figure 4B:
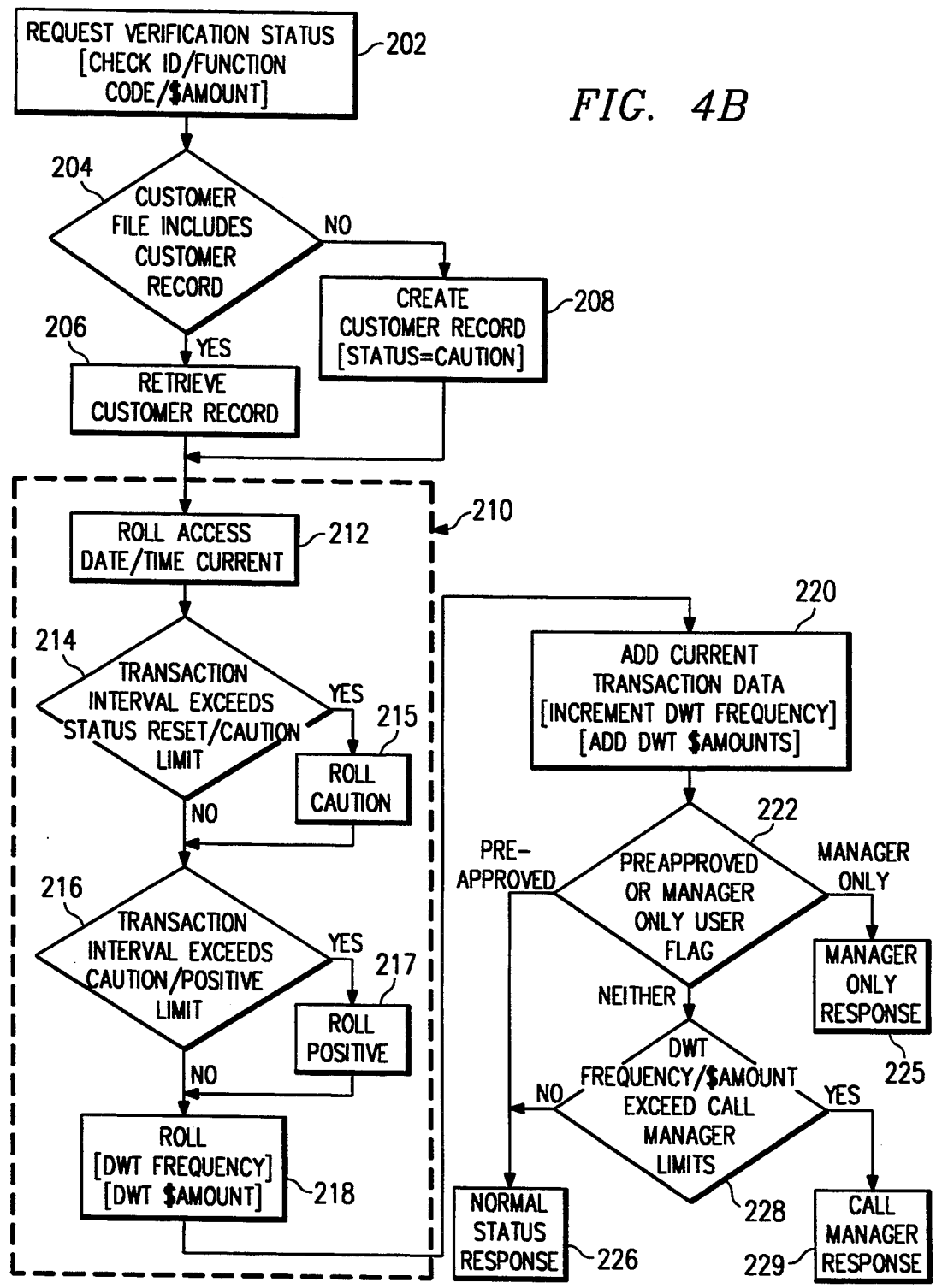
FIG. 4B diagrams the verification function.

FIG. 4B diagrams the check verification function. A check verification function is initiated (202) by entering a verify request (check ID/function code/$Amount) from a transaction terminal, which is transmitted to the transaction processor for check transaction processing and to determine the appropriate check verification response.

The transaction processor uses the check ID input from the MICR parsing subroutine of FIGS. 4A-1 through 4A-3 to search (204) the customer file for a corresponding customer record, which is retrieved (206), or if it does not exist, created (208) with a CAUTION status. The customer record is updated (210) by rolling Access Date/Time, Status and DWT Frequency and $Amount to reflect the current access date/time.

First, the Access Date/Time in the customer record is rolled (212) forward to the date/time for the current check transaction, establishing the transaction interval, i.e. the time elapsed since the customer's last check transaction.

Next, for a given status, the transaction interval is compared (214) with a corresponding selected reset/CAUTION interval—if the transaction interval is such that the reset/CAUTION interval for the customer's status is exceeded, Status is rolled (215) to CAUTION, and the customer is treated as a new customer from that time. If the customer record has a CAUTION status, the transaction interval is compared (216) with a selected CAUTION/POSITIVE limit defining a check clearance period— if this check clearance period has passed, the CAUTION status is rolled (217) POSITIVE.

The last roll/update operation is to roll (218) the DWT values for Frequency and $Amount to reflect the current access date/time.

After the roll/update operation (210) updates the customer record to reflect the current access date/time, the current transactional data are added (220) by incrementing DWT Frequency and adding the transaction $Amount to the corresponding DWT $Amount. The DWT transactional data in the updated customer record now reflects the current transaction.

Next, the user flags in the customer record are checked (222)—if the MANAGER ONLY flag is set, a MANAGER ONLY response is returned (225) regardless of status, while if the PREAPPROVED flag is set, the normal status response (POSITIVE) is returned (226) regardless of any transactional CALL MANAGER limits.

Finally, DWT Frequency/$Amount are compared (228) with the CALL MANAGER limits for the customer's status to determine whether any of these limits are exceeded. If not, a normal response with the customer's check verification status is returned (226); if any limit is exceeded, a CALL MANAGER response is returned (229).

For the status query function, the same roll/update operation (210) is performed to provide a customer record with updated Access Date/Time, Status and DWT Frequency/$Amount from which an appropriate status response can be derived. However, the updated customer record is only used to derive the response to the query request—the updated record is not written back to disk, so the customer database is not updated.

2.4. Local Status Update

Local status update of the customer database is accomplished by inputting certain status (and user flag) information to reflect bad check experience or store policy.

Status input functions are used to Add or Delete the status values NEGATIVE, CASH ONLY and STOLEN. Typically these functions will involve modifying the Status of an existing customer record and/or negative status record, although new records may be created. In addition, local input functions are used to Add or Delete user flags that designate the customer as PREAPPROVED or MANAGER ONLY.

For multiple store systems, a separate negative status record is kept for each location having a NEGATIVE and/or CASH ONLY status history. Thus, assuming negative status records are transferred during the global update function, each store's negative status file will contain separate negative status records for the various locations, sometimes for the same customer. Generally, a store can only affect through the local update function, negative status records for its location.

For each status input function, the update operation for the customer record includes the roll/update operation described in connection with FIG. 4B (210) to reflect the current access (update) to the customer record (which is written to disk to update the customer file).

FIG. 5 diagrams the local status input function for Add/Delete NEGATIVE status. A store uses this operation only for the negative status records for that location, and only when all bad checks have been recovered or otherwise resolved. For the Add NEGATIVE status function, the corresponding negative status record for that location is retrieved or created (230), and NEGATIVE status is set (232) Active and BAD Frequency/$Amount is adjusted (233) by adding the current bad check transaction. The corresponding customer record is then retrieved or created (235), and updated by the roll/update operation (238) but with status set (239) to NEGATIVE.

For the Delete NEGATIVE Status function, the corresponding negative status record is retrieved (230), and NEGATIVE Status is set (232) to Inactive and BAD Frequency/$Amount are set (233) to zero. If that customer has no other bad checks outstanding at any location (i.e., no other negative status records with NEGATIVE Status Active) (236), then the corresponding customer record is retrieved or created (237) and updated by the roll/update operation (238), but with status rolled (239) to its previous state (i.e., prior to becoming NEGATIVE).

For status input functions that Add/Delete CASH ONLY (which status is also kept by location in negative status file), the basic operation is the same as for Add/Delete NEGATIVE except that the BAD Frequency/$Amount data are unaffected.

For the status input functions that Add/Delete STOLEN, only the customer file need be updated. For the Add STOLEN function, the corresponding customer record is updated in accordance with the roll/update operation, but with status rolled to STOLEN. For the Delete STOLEN function, the corresponding customer record is updated and rolled to CAUTION.

For the user flag input functions that Add/Delete PREAPPROVED or MANAGER ONLY, again, only the corresponding customer record need be updated.

2.5. Global Update

For multiple-store systems, the global update function is used to coordinate the exchange of certain customer information among the individual stores.

Global update is accomplished by file (record) transfers between each remote system and the host system. The host system receives selected customer records and negative status records from each remote, updates its customer database, and then transmits globally updated records back to each of the remotes. Each remote is able to maintain a local customer database, supplemented with selected global customer information deemed to be useful to all stores in the system.

The type of customer information transferred by the global update function is based on store management policies. The recommended approach to exchanging global customer information is as follows:

(a) Negative Status Records—All NEGATIVE status records (NEGATIVE or CASH ONLY status) accessed (created or updated) since the last transfer; and (b) Customer Records—All customer records with status values CAUTION, NEGATIVE, CASH ONLY and STOLEN accessed (created or updated) since the last file transfer;

(c) POSITIVE status records (even those designated MANAGER ONLY) are not recommended for global transfer.

As a result, the local customer database contains negative status records (including NEGATIVE and CASH ONLY status and BAD Frequency/$Amount) for all store locations (although each remote system only transfers to the host the negative status records for its location). For those customer records transferred, DWT Frequency/$Amounts can be maintained either globally or locally and globally. That is, a store may decide not to maintain both global and local transaction data since, for regular customers that primarily frequent that store (i.e., the customers of primary interest) global and local transaction data are essentially the same anyway. On the other hand, a store may want to keep its local transaction data completely separate from the global data attributable to all stores.

The host/remote file transfers that support global update are accomplished automatically through the event/activity function described in Section 2.7. Generally, for each remote system, host/remote file transfer constitutes an activity automatically invoked at predetermined regular event intervals. This procedure insures that the local customer databases are regularly supplemented with globally updated status and other customer information affecting check verification.

A global update session is initiated by a remote system, or in the alternative by a host computer. The remote transmits only those negative status or selected customer records accessed (updated) since the last host/remote file transfer. Since a remote only updates (or creates) negative status records for its location (although negative status records for other locations may be queried), a remote only transfers those local records (but will receive back from the host recently updated negative status records for all locations). And, only those updated customer records meeting the selected status criteria are transferred (i.e., POSITIVE status records are not transferred, even if designated MANAGER ONLY).

Negative status records are extracted using the index [status/transfer/date/ID/location], while customer records are extracted using the index [status/access date/ID].

FIGS. 6A and B diagram the host global update function by which the host system receives recently updated negative status and customer records, and performs a global update of its customer database. For remote negative status records (remote location only), the host retrieves or creates (240) a corresponding host record, and sets (243, 244) host status (NEGATIVE/CASH ONLY, ACTIVE/INACTIVE) and host BAD Frequency/$Amount equal to the corresponding remote values. For remote customer records, the host retrieves or creates a corresponding host record, and updates existing host records using the roll operation (246). Host and Remote status are compared, and if different, the host assigns status (247) according to predetermined status arbitration criteria. The host then adds (248) the Frequency/$Amount accumulated at the remote since last transfer to the Host DWT Frequency/$Amount, and selects (249) the greater of host/remote DWT data as correct, updating the host record accordingly.

After global update of the host customer database, the host transmits to the remote all negative status records and selected customer records accessed (updated) at the host since the previous transfer. Because every remote record transferred to the host caused a corresponding host record to be created or updated, and therefore accessed, the host-to-remote file transfer necessarily includes all host records corresponding to the remote records transferred to the host during that session. In particular, host negative status records for all locations, meeting the recently accessed transfer criteria, are transferred to the remote. For negative status records from other locations, the remote merely copies (253) the host record (remote location records received from the host are necessarily the same as the remote record). For customer records, the remote first rolls (254) the DWT Frequency and $ Amount. If host DWT Frequency/$Amount is less than the corresponding remote DWT data (255), the remote rolls (256) access data to insure that the remote record is transferred back to the host during the next global update transfer session (to update the corresponding host record with the greater DWD data); otherwise, the remote selects (257) the host DWT data. That is, the global update function assumes that the greater DWT Frequency/$Amount is correct. Finally, the remote compares host/remote status, and if different, assigns status (258) according to predetermined status arbitration criteria.

2.6. Purge

The customer database purge function allows a store to orient its customer database toward active customers, stabilizing the database size by deleting certain customer records and negative status records deemed to be obsolete.

During database purge, customer records or negative status records with a given status are read, and the access data/time is compared with the corresponding purge limit from the system control file. Records not accessed during the interval defined by the purge limit are deleted.

Implementing the purge function is optional as a matter of store policy. For the preferred embodiment, the purge limits are also used to define a reset/CAUTION interval (described in connection with FIG. 4B). If a record is not accessed during that interval, its status is rolled to CAUTION. Thus, the check transaction processing system defaults to the reset/CAUTION operation if the purge function is not operational.

The purge limits are a matter of design selection. The following purge limits are recommended:

| | |
|---|---|
| CAUTION | 90 days |
| POSITIVE | 180 days |
| NEGATIVE | 360 days |
| CASH ONLY | 360 days |
| STOLEN | 360 days |

Because customer record status is not rolled automatically from CAUTION to POSITIVE, but only as a result of a transaction in which the access date/time is also rolled current, the customer database maintains an accurate record of CAUTION status for those first-time customers who do not return after the check clearance interval. Those CAUTION status customers who do not return to a store within a reasonable period of time can be eliminated from the customer database. Likewise, POSITIVE status customers who stop transacting business with a store can be eliminated from the active customer database.

Selected purge limits are entered into the system control file during system installation/configuration. If the purge function is selected, performing it automatically as an event-driven activity (described in Section 2.7) is recommended.

2.7. Event/Activities

Event-driven activities are performed automatically by the check transaction processing system to implement certain functions without operator intervention.

The configuration and timing of these activities is a matter of routine design selection. The following event-driven activities, and the associated event intervals, are recommended:

| | |
|---|---|
| Host/Remote File Transfer | Every 15 minutes |
| System Backup | Every 10 minutes |
| Purge | Every 24 hours |

In addition, certain report functions can be made automatic as event-driven activities, such as reporting every day all customer records with CAUTION or NEGATIVE status.

The specified event-driven activities and associated event intervals are contained in an event table established during system installation/configuration. These activities are then executed in background at the designated event times without user intervention, and without affecting other foreground functions such as check verification. Once the event table is configured, the various activities may be started or stopped by invoking appropriate functions from a transaction terminal (functions F950 and F951 in Table 4).

For multiple-store systems, performing the host/remote file transfers necessary for global update on a regular, event-driven basis insures that CAUTION/NEGATIVE status information for check verification purposes is kept current throughout the system. Performing such transfers at relatively short intervals keeps the individual host/remote communications sessions sufficiently short that other functions, such as check verification, are not significantly affected. Moreover, performing host/remote file transfers on a regular basis at short intervals helps guard against fraudulent bad check passing schemes.

Regularly, purging the customer database facilitates database stabilization, and focuses the database on reasonably regular customers. The need for regular, and often, event-driven driven backup is obvious, and is not burdensome of system computing resources because only those customer records actually updated during the short interval between backup events need be backed up.

2.8 Communications

The communications function is primarily used to support host/remote file transfers for global update in multiple-store systems. In addition, the communications function can be used for remote diagnostic operations.

The communications function is implemented in a conventional manner. Both the implementation of the communications function and the mode of communications (such as using modem communications over dial up lines) are a matter of routine design selection. Implementing the communications function so as to be essentially transparent to the local operation of the remote and host check transaction processing systems is recommended (see Section 3.6).

2.9. System

Certain system diagnostic and system information functions are available to users of the check transaction processing system.

These system functions are not critical to the inventory but are a matter of routine design selection. The recommended system functions are identified in Section 2.2 and Table 4, and include querying the customer database and system control file, obtaining disk usage and file size information, starting/stopping activities in the event file, and controlling certain keypad and modem configuration functions, as well as controlling certain system level functions such as logon, log-off, open/close database, debug and system shutdown. In particular, these system functions are useful to store supervisory personnel for querying the customer database and for controlling event-driven activities, and to vendor support personnel for remote diagnostic purposes.

2.10. Risk Management

The check transaction processing system enables a store to adopt a risk management approach to check verification. Specifically, through selection of the CALL MANAGER limits for each status (including POSITIVE) a store has considerable flexibility in adjusting its check authorization policy to accommodate the different risks presented by different customers, both in terms of bad check risks and recovery risk.

Adopting specific risk management procedures for check verification is a matter of store policy implemented by routine design selection. In addition to selecting the CALL MANAGER transactional limits for each status, the reset/CAUTION interval can be selected to force customers who do not return for that interval into a CAUTION status. Moreover, the user flags—PREAPPROVED and MANAGER ONLY—can be used to assign special check verification treatment to selected customers regardless of status or transactional (CALL MANAGER) limits.

Adopting risk management approach to check verification through selecting transactional CALL MANAGER limits enables each store to make a policy decision about the degree of risk the store is willing to take within a given interval. Moreover, this approach can be tailored to the specific business climate of the store in terms of dollar volume, profitably, customer base and management philosophy. By specifying transactional CALL MANAGER limits in terms of status, frequency, dollar amount and transaction interval, the store's risk management approach to check verification can reflect statistical patterns for bad check/recovery risks.

For example, frequency and dollar volume limits are important for the CAUTION status to reduce the risk that a store will be hit by a concerted bad check scheme. (Global update is particularly important in this area.) Depending on past experience with its typical customer, or store policy, a new customer can be restricted in terms of numbers of checks and/or dollar volume during the selected check clearance interval.

Frequency and dollar volume limits are just as important for the POSITIVE status. A store should not assume any significant risk in terms of dollar volume (either for a current transaction or over a given relatively short interval such as a week) just because a customer has had one or a few checks clear. That is, total historical check transaction frequency is a significant factor in assessing the risk of cashing a given check; both in terms of likelihood that the check is bad and likelihood that a bad check will be recovered.

2.11. Customer Information Reporting

The check transaction processing system allows a store to build and maintain a customer database containing customer information useful for identifying new customers and developing customer profiles, in addition to its use for check verification.

Reporting customer information, such as verification status and DWT Frequency/$Amounts, is a matter of routine design selection and store policy.

Customer information reports are recommended (a) to identify new customers, and (b) to develop customer profiles, both of which can be used in targeting marketing, advertising and promotional programs, and for other customer relations purposes. Specifically, new customers are identified by regularly reporting customer records with a CAUTION status. Regular customers are identified by reporting customer records based on DWT Frequency data, while the level of a customer's business is identified by reporting customer records based on DWT $Amount data. Additional customer information that can be readily collected in the customer records includes zip code and marital status information useful in demographic analysis.

The check transaction processing system permits the customer information contained in the customer database to be collected in an unobtrusive and efficient manner during high volume check transactions.

3.0 PROGRAM DESCRIPTION

The various check transaction processing functions described in Section 2.0 are implemented using a check transaction processing system ("CTPS") program executed by the transaction processor.

The CTPS Program must implement several operations in real time:

(a) transaction terminal network communications, including communicating verification requests and the corresponding responses;

(b) database operations, including responding to verification requests and updating the customer database;

(c) event-driven activities, including global update, which must execute in the background while the check verification function is executing; and (d) host/remote communications to support global update.

Moreover, while the purge function may be run after-hours as a batch operation, system backup should be executed at regular intervals throughout a business day as an event-driven background activity.

To achieve acceptable performance using a 286-class engine for the transaction processor, the preferred embodiment of the CTPS Program uses a multi-tasking architecture. The various functions performed by the CTPS Program are implemented as separate program tasks executed by the transaction processor in a multitasking mode. For the preferred system configuration (described in connection with FIG. 1), a multi-tasking architecture for the CTPS Program is superior in performance to available alternatives, such as polled interrupts.

3.1. General

As shown in FIG. 7, the CTPS Program includes various task programs interfaced through a System Kernal. Since the preferred MS/DOS Operating System is not multi-tasking, the System Kernal is required to implement (a) task switching, and (b) intertask communications. In this operating environment, the MS/DOS operating system is used only for disk file I/O, with the System Kernal interfacing functionally to the individual task programs as an operating system.

System Kernal 400 controls task switching, intertask message communications (requests and responses), subtask spawning, and task synchronization using semaphores.

Data Manager Task 500 controls all database operations used in check transaction processing functions (such as verification with transactional update, query, local status update, global update and purge), executing function requests from the other task programs (such as the Terminal Manager Task and the Event Manager Task) and returning response data.

Terminal Manager Task 700 controls data communications over the transaction terminal network, receiving function requests from the transaction terminals and spawning terminal request subtasks that transmit a request to an executing task (usually the Data Manager Task) and then build an appropriate response from the response data provided by that executing task.

Event Manager Task 800 implements activities designated for automatic execution on an event-drive basis, such as host/remote file transfers for global update, spawning a background event subtask at the specified event time to execute the specified activities.

Modem Manager Task 900 controls telecommunications primarily for host/remote file transfer for global update, but also for remote diagnostic purposes.

In addition to these check transaction processing tasks, a Screen Manager Task 950 and a System Utilities Task 960 are provided for maintenance and diagnostic purposes.

In general, for the Verify/Query and Local Status Update functions, the Terminal Manager Task sequentially polls the transaction terminals which enter and transmit requests, such as:

Verify [Function Code/check ID/Function Code/$Amount]
Query [Function Code/check ID]
Add/Delete [Function Code/check ID/Status]

For each terminal request, the Terminal Manager Task spawns a corresponding terminal request subtask that dispatches the request to a corresponding function/request routine, which sends the request to the Data Manager Task. The Data Manager Task executes the request, and notifies the function/request routine (by a semaphore operation) that response data is ready. The function/request routine then builds the appropriate response from the response data, and writes it into the terminal buffer for the requesting terminal. The Terminal Manager Task sends the response to the requesting terminal in the next polling sequence.

For the Global Update function, the Event Manager Task running in a remote system sequences through an event table, and at specified event times and intervals, spawns a corresponding event subtask to execute the global update activities, i.e., send/receive customer records and negative status records. The subtask dispatches to corresponding activity routines, i.e. activities that send/receive customer and negative status records. The send activity routines first request the remote Data Manager Task to retrieve records accessed since the previous global update, and then request the remote Modem Manager Task to transfer those records to the host Data Manager Task for global update. The receive activity routines first send requests for globally updated records through the remote Modem Manager Task to the host Data Manager Task, and then requests the remote Data Manager Task to globally update the remote customer database using the records returned by the host.

3.2. System Kernal

The System Kernal Program is implemented functionally by a multi-tasking module and a system services module.

The multi-tasking module controls resource allocation through task switching, with multi-task execution being implemented using standard context switching to swap task instructions/data between (a) the program and data memory areas allocated to the task, and (b) the task execution registers (i.e., the program counter, stack and other specified and general purpose registers). To implement intertask communications, the multi-task module allocates for each task data memory areas for request and response data, and maintains a task control block that contains for each task (a) task queues for intertask requests, and (b) semaphore flags.

The system services module implements intertask communications through calls to the multi-task module. For intertask communication, the system services module implements semaphore operations on the allocated semaphore flags in the task control block.

Functionally, the System Kernal interfaces to the various task programs that comprise the CTPS Program as a multi-tasking operating system. The Kernal performs four principal operations that establish a multi-tasking environment for the check transaction processing system:

(a) task switching;
(b) task control block management for task queues and semaphores;
(c) intertask communication of task requests/responses using the task control block and allocated data areas; and
(d) spawning subtasks.

The first two operations are performed by the multi-tasking module, while the second two operations are performed by the system services module.) In addition, the System Kernal manages the system control file, and performs diagnostic and system utility operations (these operations being implemented by the system services module).

The specific program implementation of the System Kernal is not critical to this invention, being a matter of routine design specification. Indeed, as described in Section 4.0., the System Kernal can be replaced with a commercially available multi-tasking operating system.

For the preferred embodiment, the multi-tasking module is implemented with a commercially available program, Time Slicer from Life Boat Systems. Time Slicer provides a conventional multi-tasking environment, including task switching (context switching) and task control block management (request queues and semaphore flags). These multi-tasking operations are implemented in a conventional manner. Alternative multi-tasking modules are commercially available.

At system initialization, the System Kernal allocates the task control block (queues and semaphores flags) and the data areas for the various tasks. Thereafter, the System Kernal receives service requests from a requesting task addressed to a responding task and written into the System Kernal's request queue.

The requesting task builds a service request in the following format responding task ID
requesting task ID
function code
address of request data
address for response data
stope semaphore The function code is one of the function codes set forth in Table 4. The addresses for the request and response data are data memory locations allocated to the requesting task.

Figure 8:
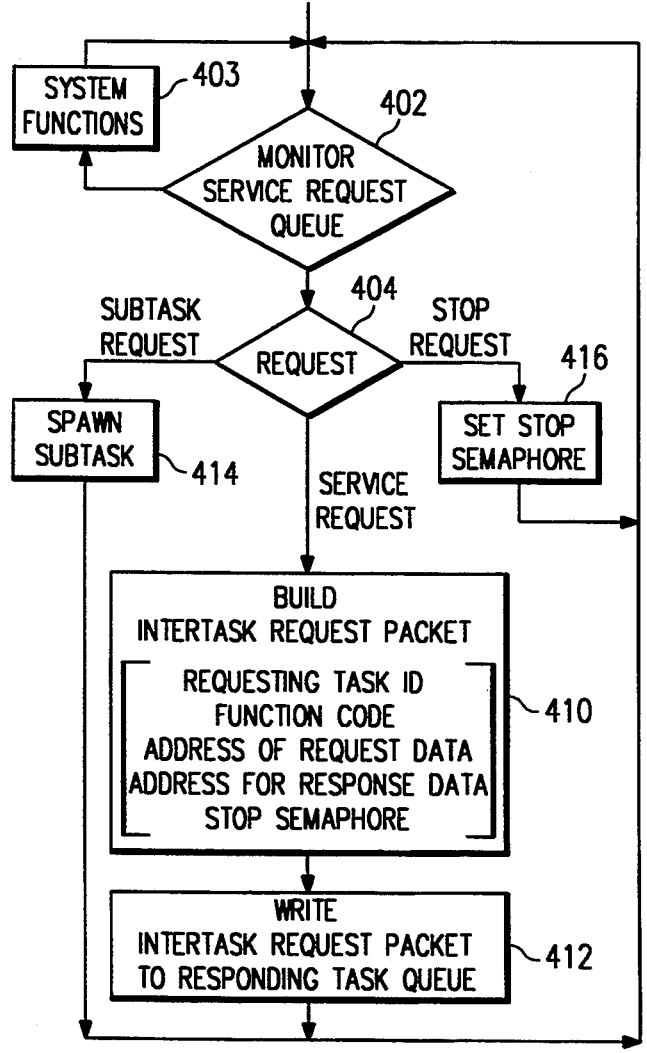
FIG. 8 is a program flow diagram of the System Kernal that provides task switching and intertask communication for the other program tasks.

FIG. 8 diagrams the intertask communication and subtask call functions implemented by the System Kernal. The System Kernal continually monitors (402) the request queue, executing service requests on a first-in first-out basis. The system kernal first determines (404) whether the next-in-line request is a service request or a subtask request from a requesting task, or a stop request (indicating request execution completed) from a responding task.

In the case of an intertask service request, the system kernal builds (410) a corresponding intertask packet, and writes (412) the packet into the responding task queue in the task control block. In the case of subtask request (which includes the subtask file name), the System Kernal spawns (414) the specified subtask (which typically executes the called function using intertask service requests). In the case of a stop request from a responding task, the System Kernal sets (416) the specified semaphore flag in the task control block, notifying the requesting task that request execution is complete and response data is ready.

The intertask request packet built by the System Kernal is in the following format:

requesting task ID
function code
address of request data
address for response data
semaphore flag That is, the intertask request packet includes the same information as contained in the service request from the requesting task, but without the responding task ID. That identification is unnecessary since each task is assigned a specific allocation of address space for its task queue and semaphore flags in the task control block, and for its data area. The stop request is the intertask request packet, which the System Kernal recognizes as a stop request when it appears in its request queue.

In general, intertask request execution is accomplished as follows: Each task monitors its task queue in the task control block. If the task queue does not contain a request, the task continues executing internal functions. When an intertask request packet is written into a task queue by the System Kernal (in response to a service request), the responding task reads the packet from the queue. The responding task decodes the request packet, and dispatches the request to an execution routine (either directly or by first spawning a subtask that handles dispatching). This execution routine reads the request data located in the requesting task's data area at the address specified in the intertask request packet, and executes the requested function using the request data. After request execution, the execution routine provides a response by writing response data to the specified address in the requesting task's data area, and sends a stop request (which is the intertask request packet) to the System Kernal indicating that request execution is complete and response data is ready. The System Kernal executes the stop request by setting the specified semaphore flag.

For example, in the case of a verification request entered at a transaction terminal, the Terminal Manager Task spawns (through the System Kernal) a terminal request subtask. The terminal request subtask dispatches to a verification/request routine that sends a verification request through the System Kernal to the Data Manager Task. The Data Manager Task reads from its task queue the verification request (i.e. the intertask verification/request packet), and determines that a verification function is requested. The Data Manager Task dispatches the request to an verification execution routine that reads the request data (check ID and $Amount) from the specified request data address, and performs the necessary customer database operations, including retrieving or creating a corresponding customer record and updating status and transactional data (DWT Frequency and $Amount) to reflect the current transaction. The execution routine then writes the updated customer record to the specified response data address, and sends a stop request (i.e., the intertask request packet) to the System Kernal. The System Kernal sets the specified semaphore flag, and the terminal request subtask reads the customer record and builds an appropriate response that is sent to the terminal by the Terminal Manager Task.

3.3. Data Manager Task

The Data Manager Task manages the customer database, maintaining the customer record file and negative status record file, and the related indices. The Data Manager Task controls all database operations for check transaction processing functions (such as verify/query and local and global update) and customer database management functions (such as backup and purge), including record creation, retrieval, modification and deletion.

The check transaction processing functions performed by the Data Manager Task are, generally:

(a) Verify (with Transactional Update)
(b) Query
(c) Local Status Update
(d) Global Update (Host and Remote)

The verify, query, and local status update functions are invoked from a transaction terminal. The global update function is an activity invoked by the Event Manager Task.

For the preferred embodiment, the Data Manager Tasks interfaces to the disk files (i.e., the customer, negative status and system control files) through a commercially available library of database management routines, C-Tree from Faircom Software. The C-Tree library, in turn, uses the MS/DOS File System (DFS) to handle disk file I/O. The configuration of those routines to operate with the Data Manager Task and the MS/DOS DFS is a matter of routine design specification. Other such libraries of database management routines are commercially available.

At system initialization, the Data Manager Task opens the customer and negative status files, and a password file (used for supervisor functions requiring a password).

Figure 9A:
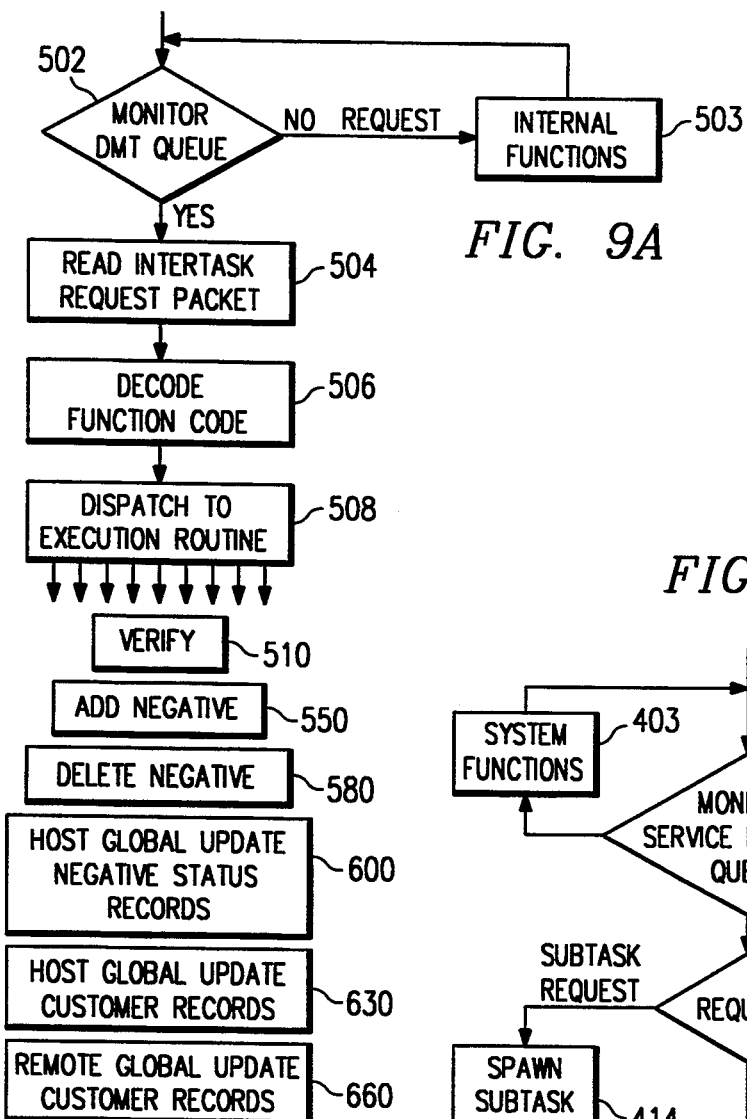
FIG. 9A is a program flow diagram of the Data Manager Task.

FIG. 9A is a program flow diagram for the Data Manager Task. The Task continually monitors (502) its task queue for requests (intertask request packets) written into the queue by the system kernal. These requests primarily involve database operations in connection with check transaction processing functions, and are received from the Terminal Manager Task (Verify/Query and Local Status Update) and the Event Manager Task (Global Update, Purge and Backup). Some requests involve system diagnostic or information requests such as for disk or database information (see Section 2.2).

If no requests are in the Data Manager Task queue, it executes internal functions (503). When the Task receives a request, it performs the following operations:

(a) reading (506) a function request packet from the task queue;
(b) decoding (506) the function code; and
(c) dispatching (508) the function request to a corresponding function execution routine.

The function execution routine executes the function, performing the necessary database operations, and upon completion, writes appropriate response data into the location specified by the requesting task, and then sends a stop request (the intertask request packet) to the system kernal.

The various functions identified in FIG. 9A—Verify (510), Host Global Update (Negative Status) (600), Host Global Update (Customer) (630), and Remote Global Update (660)—are representative of the check transaction processing functions performed by the CTP Program. These functions, and the associated execution routines, are described in detail in connection with FIGS. 9B-9H.

Figure 9B:
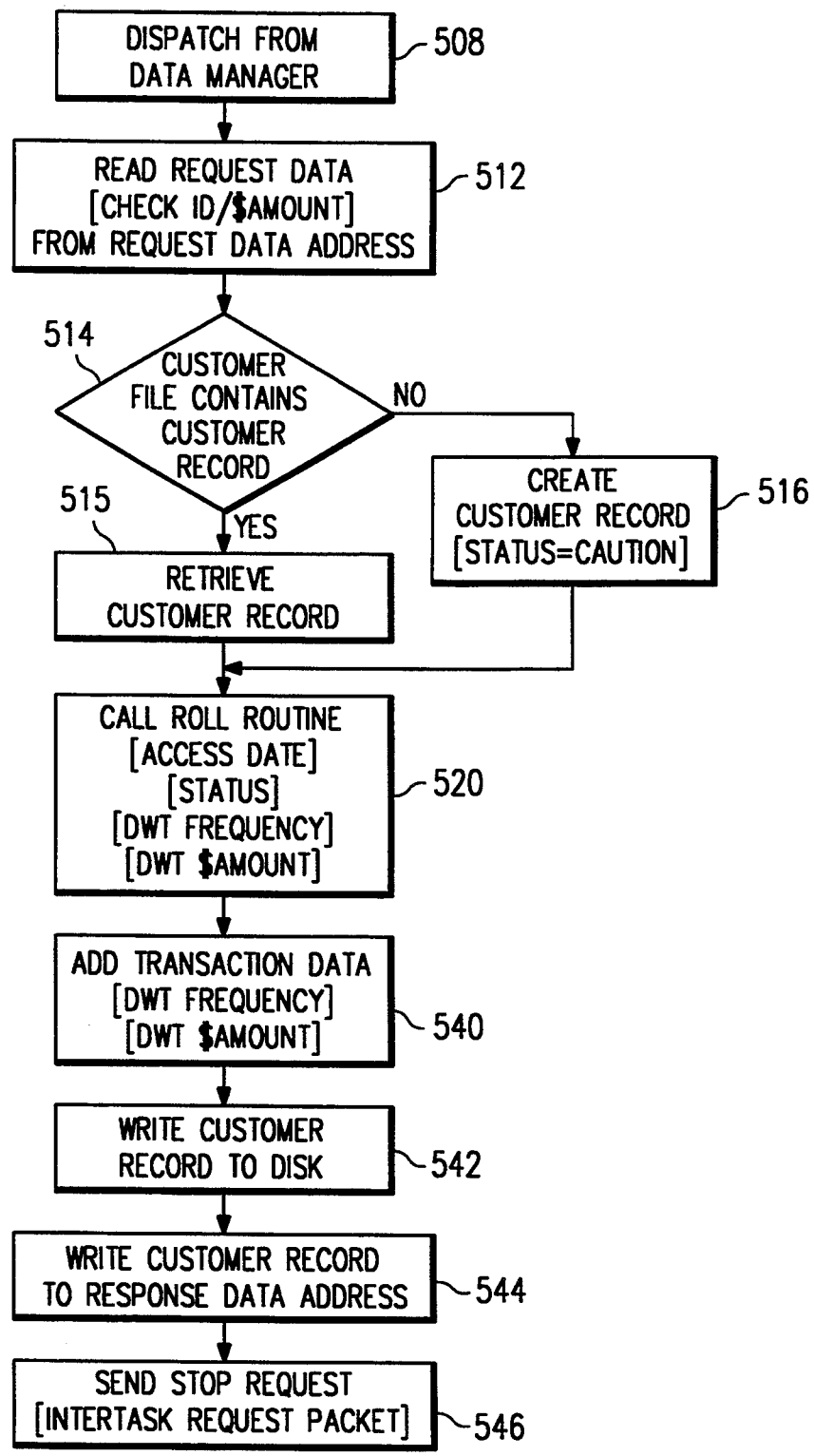

FIG. 9B is a program flow diagram for the Verify routine in the Data Manager Task. After receiving and decoding the appropriate intertask request packet from the Terminal Manager Task, the Data Manager Task dispatches (508) to the Verify Execution Routine 510.

The Verify routine reads (512) the verification request data (check ID and $Amount) from the request data location specified in the intertask request packet. The customer database is searched (514) using the check ID, and the corresponding customer record is retrieved (515) or created (516) with status set to CAUTION and DWT Frequency and $Amount set to zero.

The Verify routine then calls (520) a roll routine that updates status and transactional data in the record to reflect the current access date/time. The Data Manager Task does not independently update customer records to make status and DWT Frequency/$Amount reflect a current date/time. Rather, the customer records are updated in real time as they are accessed, such as during execution of verify and update functions. Because this roll/update operation is used by many of the function execution routines in the Data Manager Task, a separate routine is provided and called by these routines.

FIG. 9C is a program flow diagram for the roll routine. The routine first rolls (522) the Access Date/Time in the customer record to the current date, and then calculates (524) the transaction interval, i.e., the elapsed time since the customer's previous check transaction.

The purge limit for the customer's status is read (526) from the system control file and compared (528) with the transaction interval. If the transaction interval exceeds the purge limit, a status roll subroutine is called (530) and instructed to roll the status of the customer record to CAUTION. (This reset/CAUTION operation provides a default alternative to the purge function which would delete those customer records with access dates that exceed the corresponding status purge limit.)

Next, the roll routine determines whether, for customer records with a CAUTION status, the predetermined check clearance period defined by the CAUTION/POSITIVE limit has passed. If the customer status is CAUTION (532), then the CAUTION/POSITIVE limit is read (534) from the system control file and compared (536) with the status change date, i.e., the date on which the customer became a CAUTION, either because of an initial check transaction or because of a roll to CAUTION (such as through the reset/CAUTION procedure in 526, 528 and 530). If the period during which the customer has been a CAUTION exceeds the CAUTION/POSITIVE period, then the status roll subroutine is called (537) and instructed to roll customer status to POSITIVE.

The roll routine then rolls (538) the DWT totals for both Frequency and $Amount to reflect the current access date.

The customer record is now updated to the current access date, the roll routine having rolled/updated the Access Date/Time, Status and DWT Frequency and $Amount.

The status roll subroutine is called when any function routine rolls customer status from one value to another. As part of the call instruction, the status roll subroutine receives a new status, CAUTION in the case of the reset/CAUTION operation. Program state-logic then determines whether the roll is allowable according to specified roll state-logic: (a) if allowed, status is rolled to the specified new status; or (b) if not allowed, status is rolled to an allowable status value, or is not rolled, in accordance with the roll state-logic. The status roll subroutine then rolls the status change date in the customer record to the current date (if the subroutine effected a change in status). Thus, for customer records in which the transaction interval exceeds the status purge limit, the customer record is modified to reflect a CAUTION status with a corresponding status change date.

The roll routine returns (539) to the calling routine, in this case, the Verify routine in FIG. 9B. The verify routine adds (540) to the roll/updated customer record the current transaction by incrementing DWT Frequency and adding the current $Amount to the DWT $Amount. The customer record is now updated to reflect both the current access date and the current transaction. The updated customer record (with its transfer date updated current) is written (542) to disk, to update the customer database.

The updated customer record constitutes the response data for the verify request, and the Verify routine writes (544) the record into the response data location specified in the intertask request packet.

Finally, the Verify routine sends (546) a stop request to the System Kernal. The stop request comprises the intertask request packet received from the System Kernal by the Data Manager Task. The appearance of this packet in the Kernal's service request queue notifies the Kernal that request execution by the verify routine is complete. In response to the stop request, the System Kernal sets the semaphore flag specified in the intertask request packet to notify the Terminal Manager Task that the verification request is complete, and the response data is in the specified location.

The query function is used to query the customer database, and retrieve an updated customer record or updated negative status record from which the desired information may be extracted. For each query function, the Data Manager Task dispatches to a corresponding query execution routine that retrieves and updates the requested customer record or negative status record. The essential difference between the query routines and the verify routine is that no current check transaction data is involved, and the updated record is not written to disk to update the customer database.

For example, in the case of a query for customer information (such as status and/or DWT transactional data), the Data Manager Task dispatches the intertask query request packet to the corresponding Query execution routine. The routine reads the check ID from the specified location for the request data, and initiates a search of the customer record file. If no corresponding customer record is found, the query routine returns an error message response. If a corresponding customer record is retrieved, the Query routine calls the roll routine to update Access Date/Time, Status and DWT Frequency/$Amount. The roll/updated customer record is written to the specified location for the response data, and a stop request is sent to the System Kernal. The Query routine does not update the customer database by writing the updated customer record back to disk.

In addition to updating the customer database in real time through the verification operation, the Data Manager Task also implements the following local status update functions:

Add/Delete NEGATIVE
Add/Delete CASH ONLY
Add/Delete STOLEN
Add/Delete PREAPPROVED
Add/Delete MANAGER ONLY These functions are used to input customer status and user flag information.

For multiple store systems, negative status records are kept by location, i.e. each location creates a negative status record for any customer with NEGATIVE or CASH ONLY status at that location. Global Update causes the negative status file at each location to contain negative status records for each location (assuming negative status records are selected for global update). Each location can access through the Add/Delete NEGATIVE and CASH ONLY functions only those negative status records for its location. The query function can be used to query negative status records from other locations.

Figure 9D:
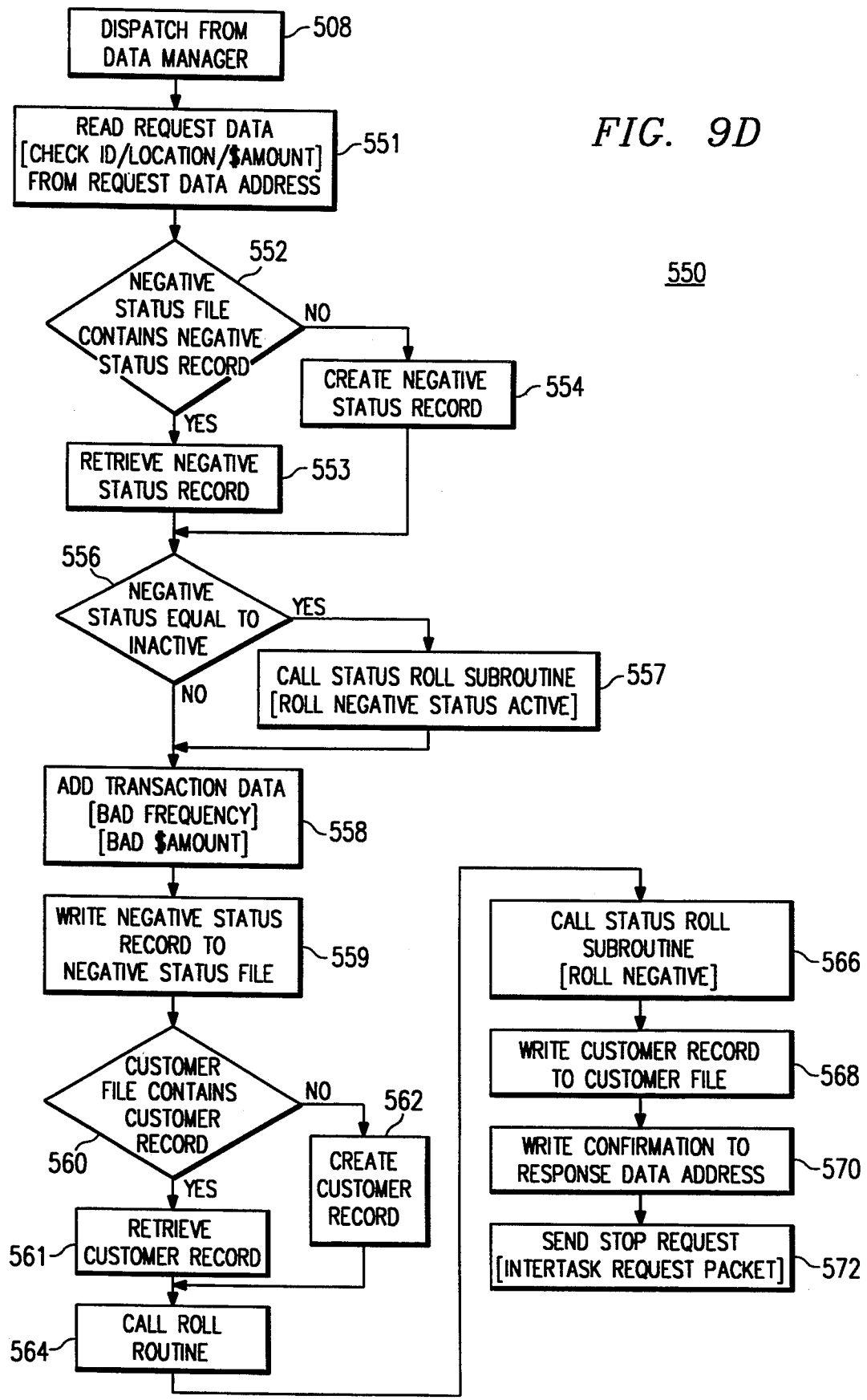

FIG. 9D is a program flow diagram for the add NEGATIVE local status update function. After receiving and decoding the appropriate intertask request packet from the Terminal Manager Task, the Data Manager Task dispatches (508) to the Add NEGATIVE execution routine (550).

The Add NEGATIVE routine reads (551) the request data (check ID/location/$Amount) from the location specified in the intertask request packet. The negative status file is searched (552) for a corresponding negative status record, which is either retrieved (553) or created (554). If NEGATIVE status is Inactive (556), the status roll subroutine in called (557) and instructed to roll to Active. The current bad check data is then added (558) to the BAD Frequency and $Amount totals for that location. The routine then writes (559) the updated negative status record into the negative status file.

The customer file is searched (560) for the specified customer record, which is either retrieved (561) or created (562). The roll routine is called (564) to roll/update the customer record (Access Date/Time, Status and DWT Frequency/$Amount) as described in connection with FIG. 9C. After roll/update, the status roll subroutine is called (566) and instructed to roll customer status NEGATIVE. The updated customer record (with its transfer date updated current) is then written (568) into the customer file.

After the add NEGATIVE function is accomplished, a confirmation response is written (570) into the specified response data location, and a stop request is sent (572) to the System Kernal (which sets the specified semaphore flag).

Figure 9E:
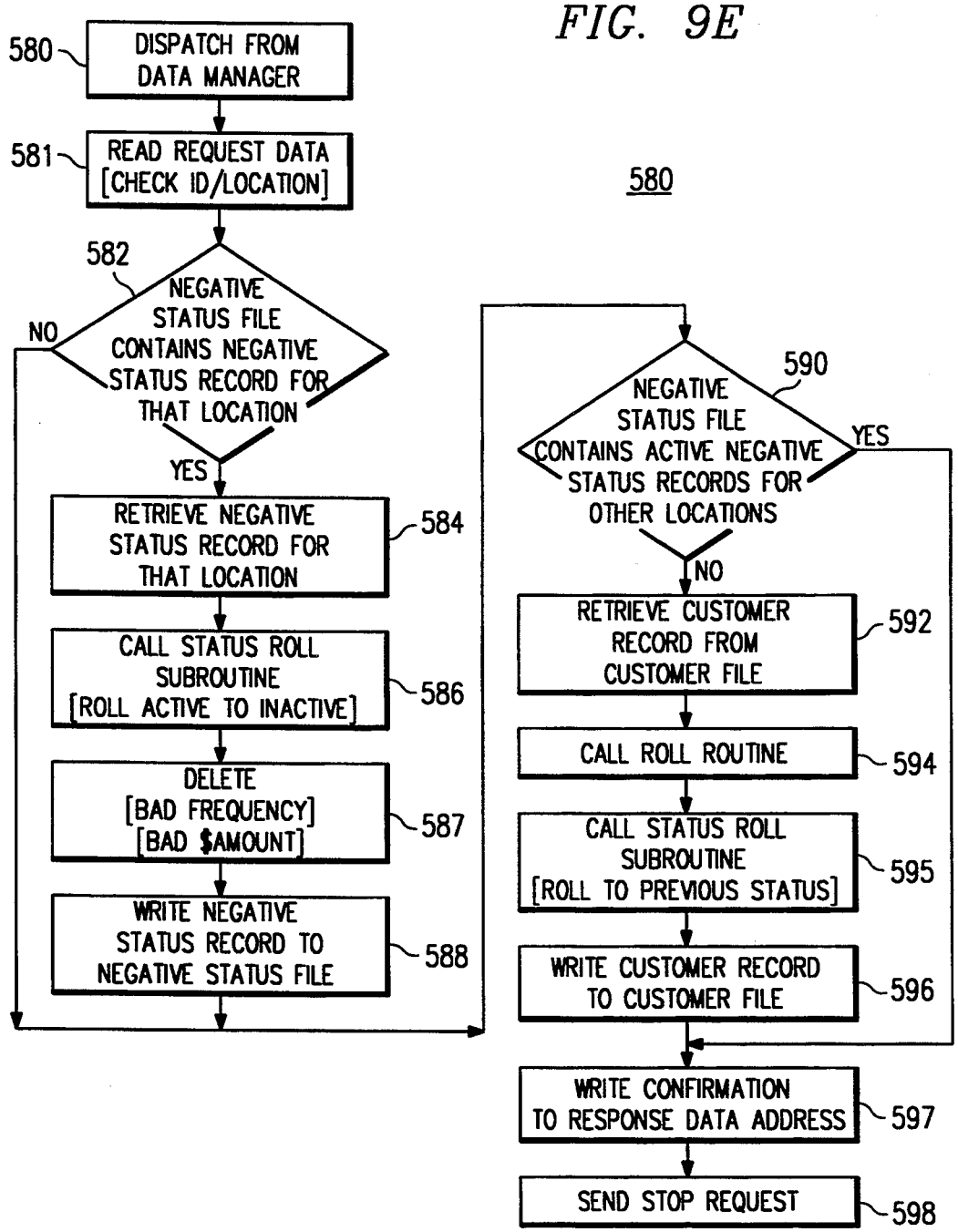

FIG. 9E is a program flow diagram for the delete NEGATIVE function. After receiving and decoding the appropriate intertask request packet from the Terminal Manager Task, the Data Manager Task dispatches (508) to the Delete NEGATIVE execution routine (580).

For multiple-store systems, the Delete NEGATIVE function is used according to the following criteria: (a) it is only used to delete NEGATIVE status for the location requesting the delete NEGATIVE function; i.e., to change NEGATIVE status from Active to Inactive only in the negative status record for that location; and (b) it is only used if all bad checks for that location have been paid off or otherwise resolved. Thus, each location can only affect its own negative status record—the global update function is used to distribute negative status records among all locations.

The Delete NEGATIVE routine reads (581) the request data (check ID/location) from the location specified in the intertask request packet. The negative status file is searched (582), and the negative status record for that location is retrieved (584), if it exists. The status roll subroutine is called (586) to roll NEGATIVE status from Active to Inactive. The BAD Frequency and $Amount data are then deleted (587) indicating that all bad checks have been paid or otherwise resolved.

Next, the routine determines (590) whether another negative status record exists for that customer, i.e., whether the customer has a NEGATIVE status active at other locations. If the negative status file contains no other negative status records for the customer, the customer file is searched to retrieve (592) the corresponding customer record. The roll routine is then called (594) to roll/update the customer record as described in connection with FIG. 9C, and the status roll subroutine is called to roll status to the previous status (i.e., the customer's status prior to becoming a NEGATIVE). The updated customer record (with its transfer date updated current) is then written (596) to the customer file.

After the delete NEGATIVE function is accomplished, a confirmation response is written (597) to the specified response data address, and a stop request is sent (598) to the System Kernal (which sets the specified semaphore flag).

The routines that Adding/Delete CASH ONLY operate analogously to the Add/Delete NEGATIVE routine because CASH ONLY is also maintained by location in a negative status record. These routines function in accordance with FIGS. 9D and 9E, except that transaction data (BAD Frequency/$Amount) is not involved (i.e., step 558 is unnecessary).

The routines that Add/Delete STOLEN affect only the customer file. Thus, these routines read the specified request data (check ID/status), and either retrieve or, for the add routine, create a corresponding customer record. The customer record is updated using the roll routine, and then rolled to STOLEN (add function) or to CAUTION (delete function) using the status roll subroutine. The updated customer record is written to the customer file, and a confirmation response is written to the specified response data location. The routine terminates with a stop request sent to the System Kernal.

The routines that Add/Delete PREAPPROVED and MANAGER ONLY operate to set/clear the corresponding user flags in the customer record in a manner analogous to the Add/Delete STOLEN routine. That is, these routines roll/update the corresponding customer record, set/clear the specified user flag, and then provide an appropriate confirmation response.

For the global update function, the host Data Manager Task receives negative status and selected customer records from all the remote systems, and executes a host global update function. Host negative status and selected customer records are then sent to the remote Data Manager Task which executes a remote global update function. The global update function is implemented by the remote Event Manager Task which executes a global update event/activity (see Section 3.5).

The criteria for selecting records for transfer in connection with global update are:

(a) Negative Status File—All records accessed since the previous host/remote file transfer for global update (NEGATIVE or CASH ONLY status); and
(b) Customer File—All customer records accessed since the previous host/remote file transfer for global update, and having a status value of CAUTION, NEGATIVE, CASH ONLY or STOLEN.

Since a remote location only accesses (updates) the negative status records for its location, each remote only transfers to the host negative status records for its location. The host global update function necessarily accesses each negative status record transferred by a remote during a global update session, so that all such records are transferred back to each remote (along with the host location negative status records that were accessed as a result of local host operation.

Figure 9F:
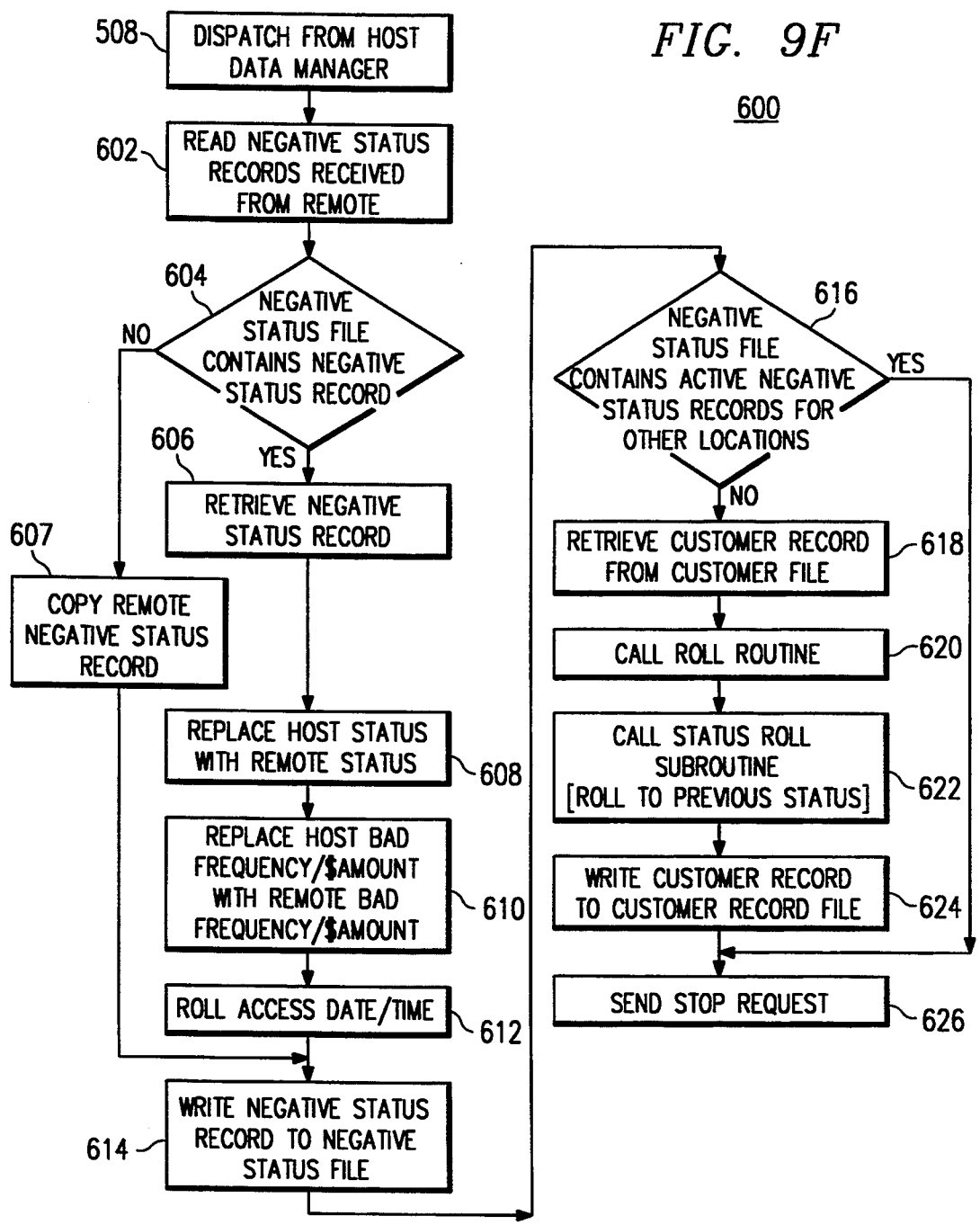

FIG. 9F is a program flow diagram for the host global update function for the negative status file. After receiving and decoding the appropriate intertask request packet (containing the global update request from the remote Event Manager Task), the host Data Manager Task dispatches (508) to the Host Global Update (Negative Status) execution routine 600.

For each negative status record received (602) from a remote location, the host searches (604) its negative status file for a corresponding negative status record for that remote location. If it does not exist, the remote record is copied (607).

If a corresponding host record is retrieved (606), the host NEGATIVE status (Active or Inactive) is replaced (608) with the remote NEGATIVE status from the remote negative status record, and the host BAD Frequency/$Amount is replaced (610) with the remote BAD Frequency/$Amount. The Access Date/Time is then rolled (612) current.

The updated (or copied) host negative status record for the remote location is written (614) to the negative status file, and the negative status file is searched (616) to determine if it contains any NEGATIVE status Active records for that customer for any locations (including the remote negative status record just processed).

If not (i.e., if NEGATIVE status for that customer is Inactive at all locations), the corresponding customer record is retrieved (618) from the customer file. The record is updated by the roll routine (620), and rolled to previous status (622). The updated customer record (with its transfer date updated current) is then written (624) back to the customer file.

The Global Update (Negative Status) routine terminates with stop request sent (626) back to the requesting remote Event Manager Task (see Section 3.5).

Figure 9G:
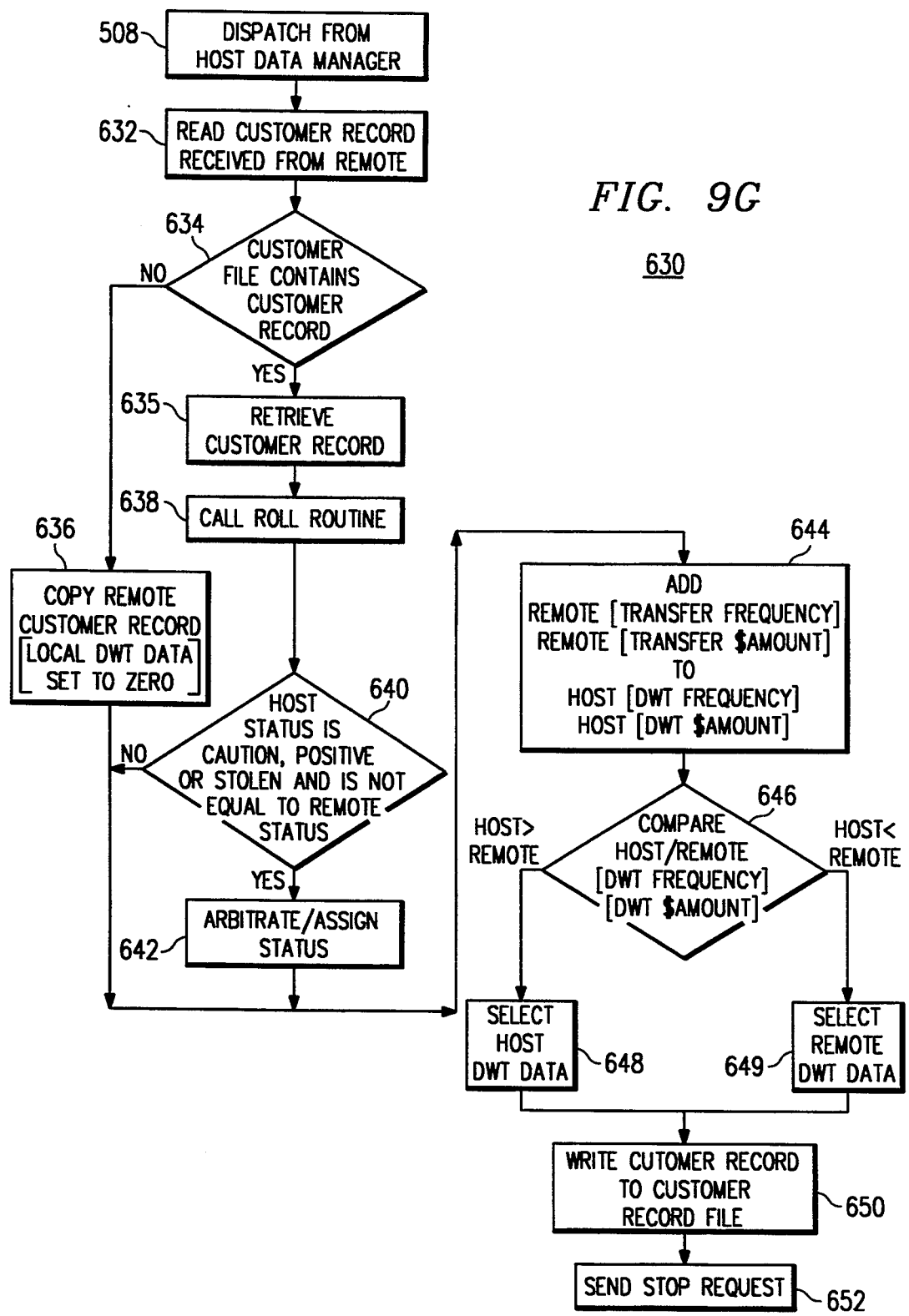

FIG. 9G is a program flow diagram for the host global update function for the customer file. After receiving and decoding the appropriate intertask request packet (containing the global update request from the remote Event Manager Task), the host Data Manager Task dispatches (508) to the Host Global Update (Customer) execution routine 630.

For each customer record received from the remote (632), the host searches (634) its customer file. If a corresponding customer record does not exist, one is created (636) with the local DWT Frequency/$Amount set to zero.

If a corresponding host customer record is retrieved (635), it is updated (638) in accordance with the roll routine in FIG. 9C. If status is CAUTION, POSITIVE or STOLEN, the status for the updated host customer record is compared (640) with the status for the remote customer record. If status is different, the host assigns (642) status in accordance with predetermined arbitration rules, and updates its customer record accordingly. (If either host or remote status is NEGATIVE, global update is accomplished through the Global Update routine for negative status records.)

The host updates DWT Frequency/$Amount in the host customer record by adding (644) to the host DWT Frequency and $Amount the Transfer Frequency and $Amount totals from the remote customer record, and then selecting (646, 648, 649) the greater of the host or remote DWT Frequency/$Amount totals.

Finally, the host customer file is updated by writing (650) the host customer record (with its transfer date updated current) to disk, and a stop request is sent (652) to the remote Event Manager Task.

Once the host has completed updating its negative status file (FIG. 9F) and its customer file (FIG. 9G) for each negative status and customer record transferred by the remote, the remote then requests that the host transfer to the remote the host negative status and selected customer records that have been accessed since the previous transfer. That is, the same criteria that the remote used in selecting records for transfer are used to select host records for transfer back to the remote.

Since for each remote record transferred to the host, the host performs an update operation that changes Access Date/Time, the host-to-remote file transfer will necessarily result in all such updated records being retransmitted back to the remote. In addition, the host will transfer to the remote NEGATIVE status and selected customer records accessed and updated by the host during either (a) local-host verification or update operations, or (b) a host global update operation initiated by another remote.

The remote receives the negative status and customer records transferred from the host, and performs a global update of its customer database. As described in Section 3.5, the remote Event Manager Task requests host records from the host Data Manager Tasks, and then sends them to the remote Data Manager Task with a global update request.

The remote global update function for the negative status file is based on two criteria: (a) for remote-location negative status records, the remote record is assumed to be correct and the remote record is ignored; and (b) for other-location negative status records, the host record is assumed to be correct and it is copied without any update or other access by the remote. After receiving and decoding the appropriate intertask request packet (containing the global update request for the host negative status record from the remote Event Manager Task), the remote Data Manager Task dispatches to the Remote Global Update (Negative Status) execution routine that implements these global update operations.

Figure 9H:
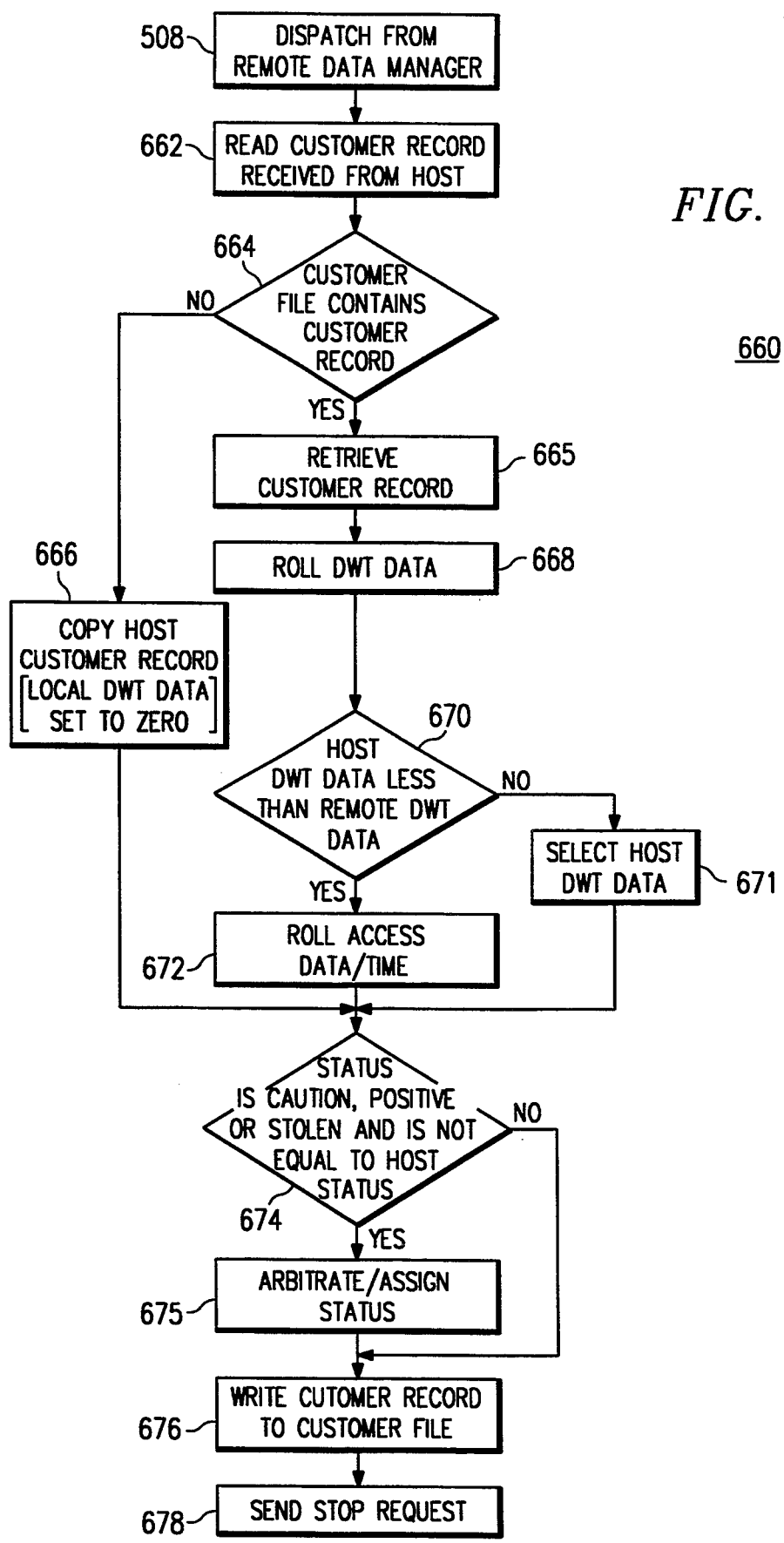

FIG. 9H is a program flow diagram for the remote global update function for the customer file. After receiving and decoding the appropriate intertask request packet (containing the global update request from the remote Event Manager Task), the remote Data Manager Task dispatches (508) to the Remote Global Update (customer) execution routine (660).

For each customer record received (662), the remote determines (664) whether it has a corresponding customer record, and if not, creates (666) one with the local DWT Frequency and $Amount data set to zero. An existing remote customer record is retrieved (665), and DWT Frequency/$Amount rolled (668) current. The remote then compares (670) its global DWT Frequency/$Amount with the corresponding totals from the host customer record, and if the remote totals are greater, rolls (672) the Access Date/Time current. Updating the Access Date/Time for the customer record insures that that record will be transferred back to the host during the next remote/host file transfer session. If the host transactional data is greater, then the Access Date/Time is not changed.

If status is CAUTION, POSITIVE or STOLEN, the status for the updated remote customer record is compared (674) to the host customer record status, and if different, the remote assigns (675) status in accordance with predetermined arbitration rules. (If either host or remote status is NEGATIVE, global update is accomplished through the host global update function for negative status records.)

The updated customer record (with its transfer date updated current) is written (676) to the customer file, and a stop request is sent (678) to the host System Kernal.

The arbitration rules used by the host during global update to assign status (642 in FIG. 9G and 675 in FIG. 9H) for customer records in the case of a conflict between host and remote status are a matter of design choice and routine program implementation. The recommended criteria for specifying arbitration rules are (a) where either the host or the remote indicates POSITIVE and the other indicates CAUTION, the POSITIVE status value is selected; (b) where either the host or the remote indicates STOLEN, the STOLEN status is selected; and (c) NEGATIVE status is not arbitrated.

The database operations associated with purge and backup are also handled by the Data Manager Task. These functions are implemented as event activities by the Event Manager Task. In response to requests from the corresponding event activity routine, the Data Manager Task retrieves the specified records and processes them in accordance with conventional record delete (purge) or copy (backup) operations. Thus, for backup, the Event Manager Task provides a backup key [status-/access date/time], and all records accessed since the last backup are copied to a backup file. For purge, a purge routine operates analogously to the roll routine (FIG. 9C) in reading purge limits from the system control file and comparing them against a purge interval defined by the last access date/time, deleting (or copying off-line) those records that meet the predetermined purge criteria.

3.4. Terminal Manager Task

The Terminal Manager Task manages the communication of requests/responses between the transaction terminals and the transaction processor, implementing a token ring local area network. In implementing token ring data communications, the Terminal Manager Task sequentially polls each transaction terminal using the token ring protocol described in Section 1.2.

When request data (such as check ID/$Amount) are entered into a transaction terminal, the transaction terminal responds to its next POLL token by transmitting TXDATA answer packet including the request to the Terminal Manager Task, which writes the request data into the corresponding terminal buffer.

For each request received from a transaction terminal, the Terminal Manager Task spawns a terminal request subtask that:

(a) Builds a System Kernal service request for the request entered into the transaction terminal;
(b) Sends the service request to the responding task through the System Kernal;
(c) Receives response data from the responding task;
(d) Builds the appropriate response from the response data; and
(e) Sends the response to the transaction terminal.

The responding task depends upon the request function code entered into the terminal. (See Section 2.2) Most of the request functions are for the Data Manager Tasks because they involve customer database access. However, requests to the other tasks for diagnostic or system information can be made from a transaction terminal.

At system initialization, the Terminal Manager Task: (a) Initializes the 32-port network communications interface (116 in FIG. 1A); (b) Allocates TXBUFFER, RXBUFFER and LASTDATA terminal buffers for each of 32 allowable terminals; and (c) Allocates two poll state flags, Poll/Data and Wait, for each of 32 allowable terminals. The TXBUFFER buffer holds TXDATA transmitted by the terminal, while the RXBUFFER buffer holds RXDATA to be sent to the terminal. The LASTDATA buffer contains selected data from the last request transmitted by or the last response received by the terminal (used to hold data that might be used in the next terminal request).

For the preferred embodiment, no attempt is made to deallocate terminal buffers/flags for those communications ports that do not have an active, on-line transaction terminal. This design choice does not require any significant memory allocation for the 32-terminal configuration of the preferred embodiment. Such deallocation procedures are a matter of routine program implementation.

Figure 10A:
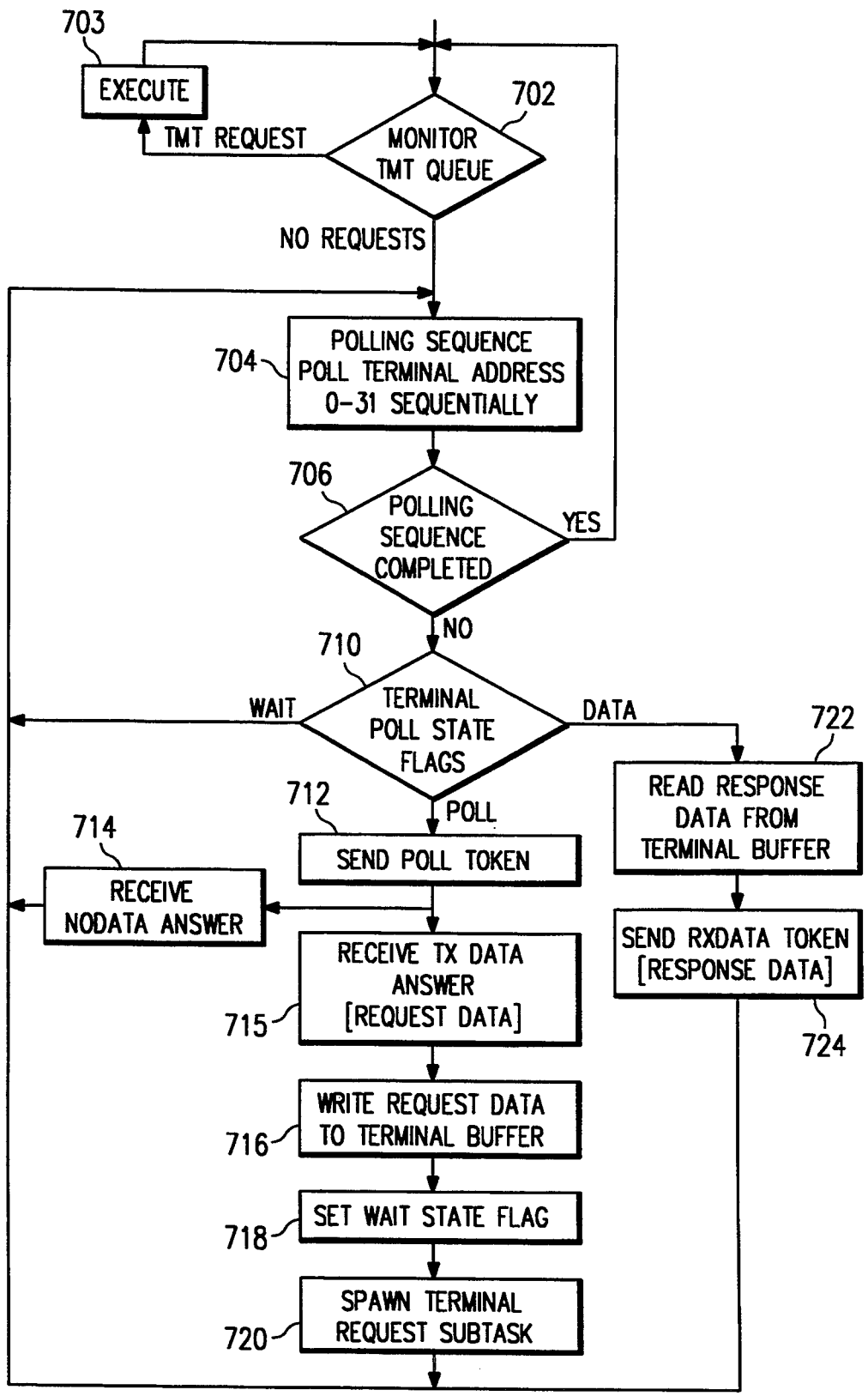
FIGS. 10A and 10B are program flow diagrams of, respectively, the Terminal Manager Task network polling function, and the terminal request subtask.

FIG. 10A is a program flow diagram of the token ring network communication function implemented by the Terminal Manager Task.

The Terminal Manager Task continually monitors (702) its task queue, which is maintained by the System Kernal. Through the System Kernal, system and diagnostic requests can be written into the queue for execution by the Terminal Manager Task. That is, in response to a TMT request (such as a system diagnostic or system information request) written into its queue, the Terminal Manager Task calls (703) a corresponding routine that executes the request.

If no TMT request has been written into the task queue, the Terminal Manager Task begins a token polling sequence (704, 706).

A token polling sequence is accomplished by sequencing through the terminal addresses 0–31. During each polling sequence the Terminal Manager Task polls all 32 ports without regard to whether a port has an active, on-line transaction terminal coupled to it, provided however, that an active terminal in a Wait state (i.e., waiting to receive requested data) is not polled.

The Terminal Manager Task makes no attempt to segregate active and inactive communications ports, or to remove from the polling sequence terminal addresses not assigned to active, on-line transaction terminals. This design choice does not significantly impact network communications for the 32 terminal configuration of the preferred embodiment. An active-terminal-only polling scheme would be a matter of routine program implementation.

Terminal addresses are determined as follows. During each polling sequence, the Terminal Manager Task polls each of the 32 ports—beginning with Port 0, a POLL token (including the corresponding terminal address between 0 and 31) is broadcast and the Task waits until either (a) an answer packet is received, or (b) a time-out period transpires, before sending the next POLL. When a transaction terminal signs on, its internal network communication software causes an [ENTER TERMINAL ID] message to be displayed. The terminal operator is supposed to enter a number between 0 and 31 that is uniquely assigned to that terminal; however, the internal software processes the terminal ID entry using module 31, so that any numeric entry is forced into the 0–31 range.

For each terminal address the Terminal Manager Task determines (710) the polling state of the corresponding transaction terminal—Poll, Wait, or Data.

If the terminal is in the Poll state, the Terminal Manager Task sends (712) a POLL token for that transaction terminal (i.e., a token that includes the corresponding terminal address). The POLL is received by the addressed terminal, and recognized as an invitation to transmit data. The polled terminal transmits either a TXDATA answer (including request data) or a NODATA answer. If a NODATA answer is returned (714), the Terminal Manager Task continues with the polling sequence. If the polled terminal transmitted request data in TXDATA answer (715), the Terminal Manager Task writes (716) the request data into the corresponding terminal buffer, sets (718) the terminal Wait state flag, and spawns (720) a terminal request subtask to execute the request, and then continues the polling sequence.

During execution of the request, while the requesting terminal is in the "Wait" state, the Terminal Manager Task does not poll that terminal, but rather, continues with the polling sequence.

Once a request has been executed and the response data placed in the terminal buffer for the requesting transaction terminal, the request subtask sets the terminal Data state flag. During the next poll sequence, the Terminal Manager Task reads (722) the response from the terminal buffer and sends (724) an RXDATA token that includes the response.

When the token poll sequence is completed (i.e., terminal address 31), the task queue is checked (702) to determine whether any system or diagnostic TMT requests have been written into the queue. If not, a new polling sequence is commenced (704).

When the operator enters the terminal ID, the network software watches for that terminal address—when a POLL with that address is received, the network software waits for a time-out to determine whether another terminal has that address. If not, the network software grabs the next POLL with that address and commences normal network communications.

For the preferred embodiment, the POLL token is one byte (0–7):

| Bit 7   | Token Flag (set if POLL token; otherwise clear) |
|---------|-------------------------------------------------|
| Bits 5–6 | TX-POLL token                                  |
|         | RX-RXDATA token                                 |
| Bits 0–4 | Terminal address                               |

All data communications over the network are in 7 bit ASCII (0–6), so that only the POLL token uses bit 7. The answer packets are also one byte:

| Bit 7    | Not used |
|----------|----------|
| Bits 0–6 | TXDATA   |
|          | NODATA   |

The TXDATA byte is followed by up to 40 characters of data in 7-bit ASCII (0–6), with a single END of data byte (ASCII carriage return). Finally, the RXDATA token [Token Flag Set/RX/Terminal Address] is followed by up to 40 characters of data, with the next POLL token designating END of data.

Thus, in operation, a transaction terminal watches the network for its POLL token (with its terminal address). When its POLL is received it sends back either a NODATA answer byte, or a TXDATA byte followed by up to 40 characters of data terminated in an END character. If the terminal is waiting for response data, so that it has been placed in a Wait state, it will not receive a POLL token. When response data is available, the Terminal Manager Task will retrieve the data from the terminals' RXBUFFER and transmit it with the next TXDATA token.

This implementation for a token ring network is a matter of design choice. Other implementations are a matter of routine program design. Commercial token ring program packages are available.

To execute a request sent by a transaction terminal during a polling sequence, the terminal request subtask first determines which function is requested, and then dispatches to an appropriate service request routine that:

(a) Builds a service request;
(b) Sends the service request to the responding task (via the System Kernal);
(c) Builds an appropriate response from the response data returned by the responding task; and
(d) Writes the response into the appropriate terminal buffer.

In addition, for a verify request, the verify service request routine determines whether any "CALL MANAGER" limits have been exceeded, and if so, causes the "CALL MANAGER" response to be returned to the terminal.

From Section 3.2, a service request is in the following format:

Requesting task ID
Responding task ID
Function code
Address of request data location
Address for response data location
Semaphore flag The service request is sent to the System Kernal, which builds a corresponding intertask request packet.

The responding task that executes the request depends upon the function code. Of course, most function codes will be executed by the Data Manager Task because they involve accessing in some way the customer database.

After execution of the request, the response data returned by the responding task depends upon the request function code. The Data Manager Task returns updated customer or negative status records in response to verify/query requests and confirmations in response to local status update functions and global update functions.

Exemplary terminal request subtask operation is described in connection with a verify request in which the responding task is the Data Manager Task.

Figure 10B:
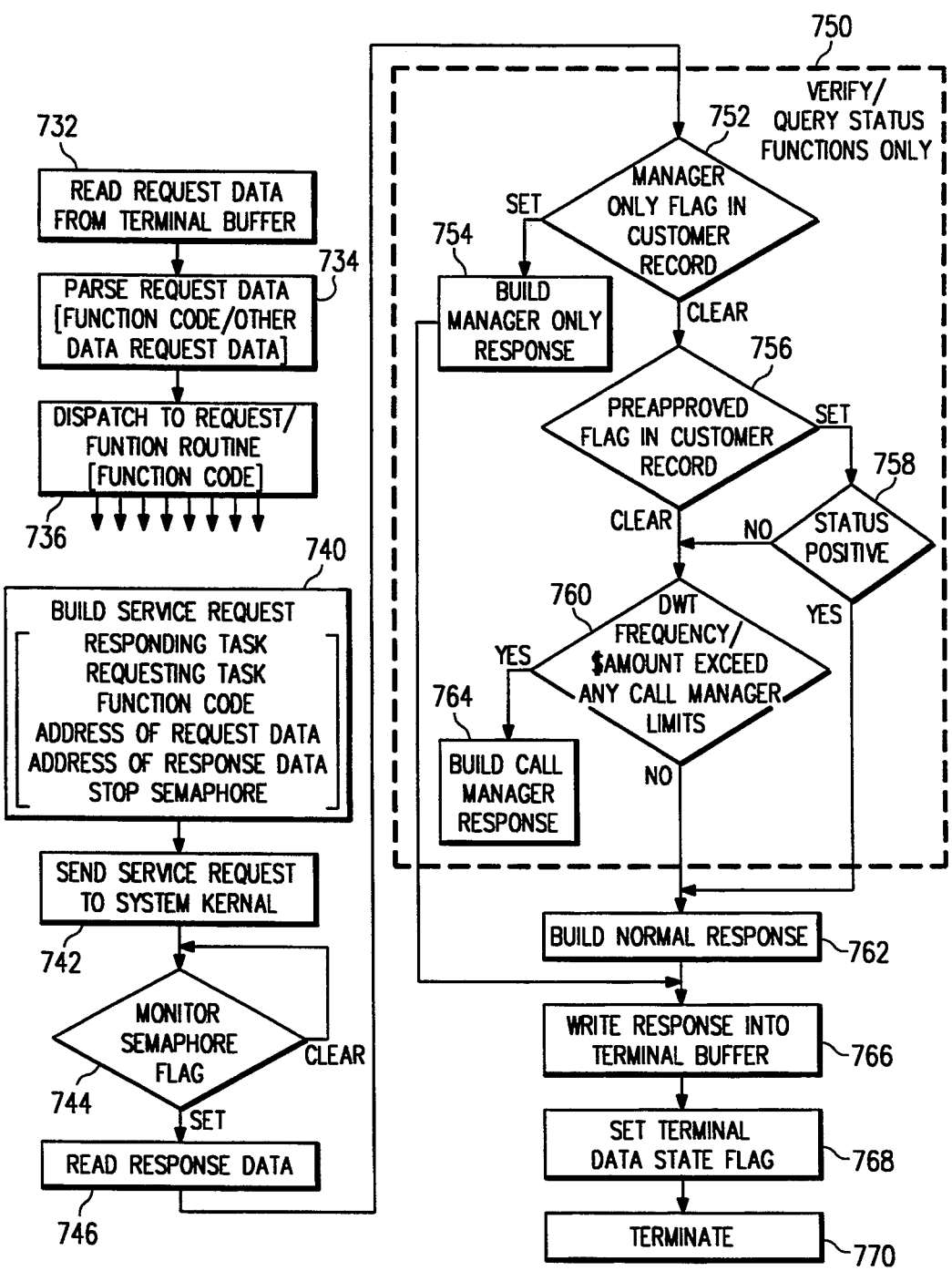

FIG. 10B is a program flow diagram for a terminal request subtask that implements a verification or query status request, to which the response from the Data Manager Task is an updated customer record. The subtask first reads (732) the TXBUFFER terminal buffer for the transaction terminal, parses (734) the request data to identify the function code (verify) and the other request data (check ID and $Amount).

The subtask then dispatches (736) the request to a verify service request routine specified by the verify function code.

The service request subroutine builds (740) an appropriate service request addressed to the Data Manager Task responding task), which is sent (742) to the System Kernal.

The terminal request subtask then suspends execution and monitors (744) the semaphore flag specified in the service request. The semaphore flag is set by the System Kernal in response to a stop request from the Data Manager Task, indicating that the request has been executed and response data (a customer record) written to the response data location specified in the service request.

The terminal request subtask then reads (746) the response data, and builds an appropriate response for the requesting terminal. For the verify (and query status) requests, the corresponding service request routine builds a response from the customer record (response data) only after testing (750) corresponding user flags and CALL MANAGER limits. These user flag and CALL MANAGER operations are not required for other function service requests (such as query negative, local status update or global update).

The first operation in building an appropriate verification response from the customer record returned by the Data Manager Task is to test the MANAGER ONLY flag (752). If that flag is set, the verify service request routine builds (754) a MANAGER ONLY response regardless of customer status, and without testing any CALL MANAGER limits.

If the MANAGER ONLY user flag is clear, the next operation is to test the PREAPPROVED flag (756). If the flag is set, and customer status is POSITIVE (758), a normal (i.e. PREAPPROVED) response is built (762) without regard to any CALL MANAGER limits. If customer status is other than POSITIVE, the PREAPPROVED flag is ignored and CALL MANAGER limits are tested.

After testing the user flags, the next operation in building a response for a verify request is to test the CALL MANAGER limits (760) for the customer's status and DWT data. The DWT Frequency/$Amount CALL MANAGER limits appropriate for the customer's status are read from the system control file and compared with DWT Frequency and $Amount from the customer record. If any CALL MANAGER limit is exceeded, CALL MANAGER RESPONSE is built (764) regardless of status. If no limits are exceeded, the normal response for that status is built (762).

As described in Section 2.3 and 2.10, the CALL MANAGER limits are used to place predetermined transactional limits (DWT Frequency/$Amount) on a check transaction primarily for customers with CAUTION and POSITIVE status. These limits are set as a matter of store policy, and placed in the system control file during system configuration.

For function requests other than verify and query status, the user flag and CALL MANAGER operations (750) are not included in the service request routine, and a normal response is automatically built (762) from the response data read (746) from the specified response data location.

The response—MANAGER ONLY, PREAPPROVED, CALL MANAGER or [Normal]—is written (766) into the appropriate terminal buffer, and when the terminal's RXBUFFER buffer is full, the terminal Data state flag is set (768) to indicate that a response is in the terminal's RXBUFFER buffer and should be sent to the terminal in the next polling sequence. The terminal request subtask then terminates (770).

The basic operation of the terminal request subtask for each request function is as described in connection with FIG. 10B for the verify request, except that the service request routines for request functions other than verify do not implement the user flag or "CALL MANAGER" response functions (750).

3.5. Event Manager Task

The Event Manager Task manages background activities that are executed automatically without operator intervention, maintaining an Event File that includes an Event Table, an Activity Table and associated indices. The Event Table includes event records each specifying an event time, an event interval and associated activity pointers into the Activity Table. The Activity Table includes a list of activity codes.

The basic activities implemented by the Event Manager Task are:

(a) Host/Remote Communications—These activities transfer customer records and negative status records between host and remote systems for global update;
(b) Purge—These activities, one for each status, delete customer records and negative status records that are obsolete based on specified purge limits contained in the system control file; and
(c) Backup—These activities are regularly invoked to backup the customer and negative status files.

The host/remote communications and backup activities operate only on those customer records or negative status records that are accessed (i.e., that have their transfer dates updated) after the last corresponding activity was performed. Host/remote communications are implemented in connection with the Modem Manager Task.

The Event Table contains an event record for each event, with each event record including: (a) an event interval specifying the interval between execution of the associated event activities; (b) the next event time, calculated by the event subtask after completing execution of an event/activity based on the event interval and the system clock; (c) up to 10 activity pointers into the Activity Table; (d) active/inactive flag set or cleared by a start/stop function request (F950 and 951 in Table 4); and (e) diagnostic abort flag that is tested during event-/activity execution by the event subtask, and can be used to abort an event/activity.

In its basic operation, the Event Manager Task sequences through the events (event records) in the Event Table, spawning a corresponding event subtask to execute the specified activity.

Event/activities are started and stopped using a transaction terminal to enter a corresponding request (see the function codes 950 and 951 described in Section 2.2 and set forth in Table 4). After entry of a start/stop request at a transaction terminal, the Terminal Manager Task (terminal request subtask) addresses a service request to the Event Manager Task through the System Kernal. The Event Manager Task receives the service request from its task queue, executes the request by correspondingly modifying the event file, and returns an appropriate response to the Terminal Manager Task.

While event frequency for a given activity is a matter of store policy and design choice, typically, host-/remote communications and backup will be performed fairly frequently to insure both the regular update of the customer database, and the ability to recover from a system failure without significant loss of data. On the other hand, the purge function is more a matter of system administration designed to control the size of the customer database. Indeed, the purge function can be omitted as an event activity. In that case, the status purge limits contained in the system control file define the reset/CAUTION interval used in the roll routine to roll all statuses back to CAUTION if the specified reset/CAUTION (i.e., purge) limits are exceeded, as described in connection with FIG. 9B.

The selection and timing of event-driven activities is a matter of design choice. The recommended event-driven activities, and the associated event intervals, are:

| Host/Remote File Transfer | Every 15 minutes |
| System Backup | Every 10 minutes |
| Database Purge | Every 24 hours |

The Event Manager Task sequences through the event file, selecting the specified event-driven activities on a read-next basis. Event times are specified as time intervals starting from a baseline system time 00:00:00:00:00:00 [yymmddhhmmss] for January 1, 1970 (the transaction processor includes a battery assisted hardware clock synchronized to this baseline system time).

When an event time is reached, and the associated activity is completed, the event time is incremented by the event interval, based on the previous event time and not on when the activity was actually completed. For example, if host/remote file transfers to support global update activities (i.e., transfers of negative status records and selected customer records are to be accomplished every 15 minutes, then each activity is entered into the event file with an interval of 15:00[mmss]. The activity will be entered into the event file, along with its event interval and its initial event time of 15 minutes after system initialization (assumed to be 00:00[mmss]). The activity will then first be executed at 15:00, and when the activity is completed, the associated event time will be incremented to 30:00.

At initialization, the Event Manager Task opens the Event Table and Activity Table, and clears all semaphore flags. Thereafter, the Event Manager Task sequences through the Event Table, spawning event subtasks at specified event times to execute corresponding activities. While a given event may have several activities associated with it, only one event subtask (and only activity within an event record) is executed at a time.

Figure 11A:
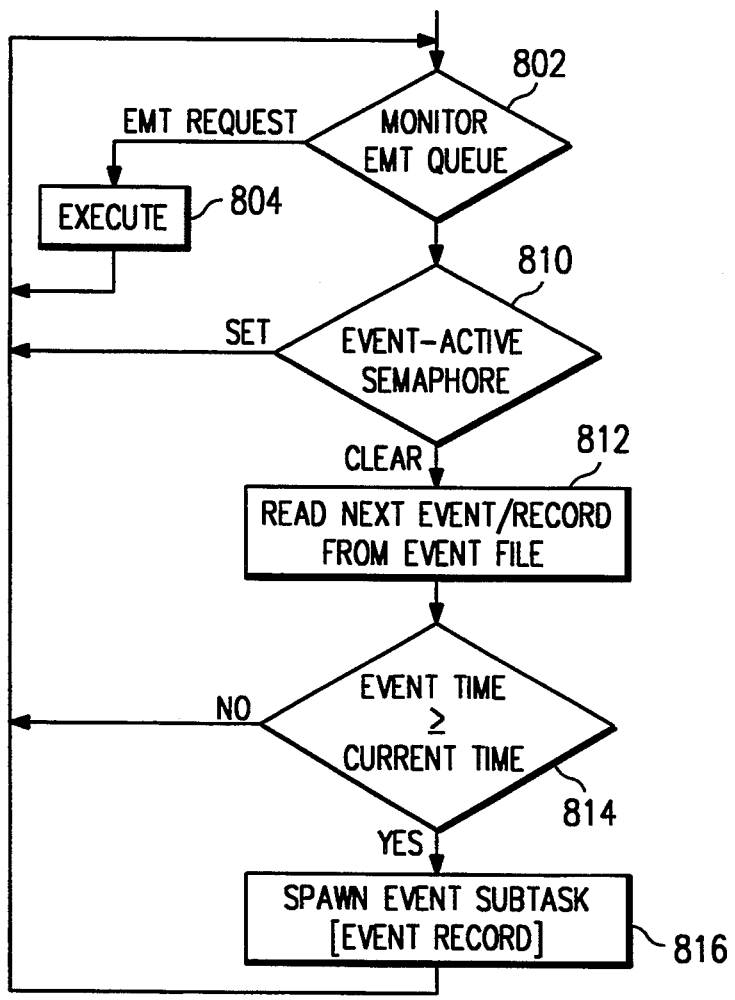

FIG. 11A is a program flow diagram for the Event Manager Task. The task continually monitors (802) the Event Manager Task queue, to determine if any EMT requests have been received from the System Kernal. These requests may be for diagnostic or system information purposes. If so, the appropriate system routine is executed (804).

If the task queue is empty, the Event Manager Task tests the event-active semaphore (810) to determine whether an event is active. If so (semaphore set), the task checks the task queue (802).

If no event is active (semaphore clear), the Event Manager Task reads (812) the next event record from the Event File, and compares (814) the event time in the event record with the current system time. If the event is greater than or equal to the system time, the Event Manager Task spawns (816) an event subtask to execute the activities associated with the event (sending a subtask request to the System Kernal).

The Event Manager Task then the task reads (812) the next event/activity from the event file.

If the event time for the next event/activity is greater than or equal to the current time (814), the Event Manager Task spawns (816) an Event Subtask to execute the event/activity.

FIG. 11B is a program flow diagram for the event subtask. At the appropriate event time, the Event Manager Task spawns the event subtask, which receives (822) the current event record from the Event Table. The current event record includes a current event time and an activity pointer to each of up to 10 associated activities identified in the Activity Table. The event subtask sequentially executes each activity associated with the current event time.

Event subtask operation will be described in connection with executing at a remote system the activities associated with the global update function. Specifically, the event subtask will be described in connection with sequentially executing the following global update activities:

(a) Originate call;
(b) Send customer records (all selected statuses);
(c) Send negative status records (NEGATIVE and CASH ONLY);
(d) Receive customer records (all selected statuses); and
(e) Receive negative status records (NEGATIVE and CASH ONLY).

That is, each of the send/receive activities reads all selected statuses. When the remote event subtask receives the event record containing the event time pointers into the Activity Table, it sets (824) the event-active semaphore (810 in FIG. 11A), preventing the Event Manager Task from spawning another event subtask. The subtask then initiates an activity sequence (826, 828). Using the activity pointer in the Event Table, the subtask sequentially reads (826) activity codes from the Activity Table. The activity codes are read on a read-next basis, with each read operation being tested to determine when the last activity in the sequence is completed (828).

For each activity code read from the Activity Table, the event subtask dispatches (830) to a corresponding activity routine for execution.

Each activity routine includes an activity data control data block containing certain fixed and/or variable data used by the routine in executing the activity. Thus, for the global update event, the originate call routine includes in its activity control data block the phone number for the host (as well as other system numbers that may be called by the remote) and a corresponding log-in ID. The send/receive record routines include in their respective activity control data blocks the previous event time for the activity which defined the end of the previous event interval for that activity.

Thus, the current event interval for a global update (send/receive) activity is defined by the previous event time in the activity routine's control data block, and the current event record. After execution of the activity, the current event time is written into the activity routine's control data block to define the beginning of the next global update event interval. (A similar control data block operation is used for the backup activity.)

A global update event begins at a remote system with an originate call activity that directs the remote Modem Manager Task (MMT) to establish a communications link to the host. This activity is dispatched to an originate call routine (840) for execution.

The originate call routine begins by building and sending to the remote MMT a request (842) to dial the host—the MT request includes a dial function code and the request data location into which the originate call routine writes the host telephone number, together with a specified semaphore flag. The originate call routine waits on a response from the MMT (843), periodically testing the stop semaphore flag. When the specified semaphore flag is set by the MMT, indicating that the host has been dialed and is in an off-hook condition opening a communications line, the originate call routine builds and sends to the remote MMT a request (844) to send a log-in ID to the host MMT, writing the log-in ID into a specified request data location. The originate call routine then waits on the specified stop semaphore flag being set (845). When the specified semaphore flag is set, indicating that the remote MMT has completed log-in to the host system and established an active communications link, the originate call routine terminates by setting (846) a modem flag to indicate that a communications link is active, and then returns (826) to the event subtask for execution of the next activity.

The event subtask reads (826) the code for the next activity in the global update activity sequence—the send customer record activity.

The event subtask dispatches (830) to the corresponding send customer record routine (850). The routine first reads (852) the previous ending event time from its control data block to provide an initial customer record retrieval key to be used by the remote Data Manager Task (DMT) to retrieve a customer record from the customer record file. The retrieval key includes two fields [check ID/transfer date/time]—each is used by the Data Manager Task to sequence through the customer record file (incrementing check ID first and then transfer date/time). The send customer record routine builds and sends to the DMT a request (854) to retrieve by the retrieval key the first customer record meeting the criteria for transfer to the host during the current activity—any customer record that was accessed (updated) during the current event interval at any time after the time specified in the retrieval key (initially, the ending time for the immediately preceding event interval during which customer records were transferred to the host). The routine writes the initial retrieval key (with check ID set to zero) into the specified request data location to provide the DMT with the initial customer record retrieval key for the current event interval. The send customer record routine then waits (855) on the specified stop semaphore flag being set by the DMT.

The DMT receives the initial customer record retrieval request, and dispatches it to a corresponding customer record retrieval routine. This routine reads the initial record retrieval key (including the ending time for the previous event interval which is the beginning time for the current event interval) from the specified request data location, and using this initial key and the index [status/transfer date/check ID], retrieves the first customer record with an access date/time equal to or greater than the beginning event time (if more than one customer record has the same access date/time, then the customer record with the lowest check ID is retrieved). When the DMT retrieval routine has retrieved this first customer record in the current event interval, it provides an appropriate response to the send customer record routine, writing the retrieved customer record into the specified response data location and sending a stop request to the System Kernal.

When the stop semaphore is set (855), the send customer record routine reads the retrieved customer record from the specified response data location, and determines (858) that the DMT has returned a customer record. The routine then extracts (859) the transfer date/time and check ID from the retrieved customer record, and determines (860) that the current event time, which defines the end of the current global update event interval, is greater than the transfer date/time for the retrieved customer record, thereby confirming that the retrieved customer record was accessed during the current event interval.

The send customer record routine then sends a global update service request to the host DMT, along with the just-retrieved remote customer record, through the remote MMT (862). The routine then waits (863) on the specified stop request being sent, along with a response (acknowledgement), by the host DMT through the host MMT and the remote MMT to, respectively, the remote System Kernal and the specified response data location in the data area for the remote event subtask.

The above remote/host intertask communication operation is described in greater detail in Section 3.6 (Modem Manager Task). Essentially, the Modem Manager Task is designed so that remote/host intertask communications is essentially transparent to the requesting and responding tasks. That is, the remote/host requesting task sends a service request with request data and a stop semaphore to its System Kernal addressed to the host/remote responding task. The remote/host MMTs provide an essentially transparent communications link between the remote/host System Kernals to effect the return of the stop semaphore and response data from the host/remote responding task to the remote/host requesting task.

When the send customer record routine detects (863) the specified stop semaphore flag being set, it requests (854) the DMT to retrieve the next customer record in the current global update event interval, writing the transfer date/time and check ID extracted (859) from the just-sent customer record into a request data location to provide a new retrieval key for the DMT.

As with the first customer record retrieved in the current event interval, the DMT dispatches this request to a customer record retrieval routine that reads the new retrieval key from the specified request data location, and using the index [status/transfer date/check ID], searches the customer file by incrementing first check ID and then transfer date/time until the next record is retrieved. The DMT retrieval routine then responds to the customer record retrieval request, writing the retrieved customer record into the specified response data location for the send customer record routine.

This procedure—requesting a customer record using the transfer date/time and check ID for the previous record as the retrieval key, retrieving that customer record by reading the customer file using the retrieval key, sending the retrieved customer record to the host, and requesting the next customer record—continues until either (a) the remote DMT responds to a retrieve customer record request from the send customer record routine by indicating that the customer file contains no other customer records accessed after the just-sent customer record (as detected in step 858), or (b) the send customer record routine determines that the customer record retrieved by the DMT has a transfer date/time after the current event time (which defines the end of the current global update event interval as determined in steps 859, 860). In either case, the send customer routine returns to the event subtask (826), which reads the next activity from the activity table.

After the activity for sending customer records (by selected status) has executed, the next activity specified in the Event Table is for sending negative status records (both NEGATIVE and CASH ONLY status). The corresponding routine in the event subtask for executing the send negative status record activity operates identically to the send customer record routine (850) in retrieving negative status records accessed during the current global update event interval from the negative status file and sending those records to the host.

After negative status records have been sent, the receive customer records and negative status records activities are executed. Because of the essential transparency of the remote/host communications operation using the host/remote MMTs, the receive activity is analogous to the send activity. The remote receive record activity routine requests records from the host DMT. The host DMT responds with globally updated records that are sent by the remote routine to the remote DMT for remote global update.

When the last send/receive activity for the global update function at the current event time has been completed (i.e., the last receive negative status record routine has completed transferring negative status records from the host DMT to the remote DMT for global update), that routine returns to the event subtask, which determines that the current event time contains no more activities to be executed (826) so that the activity sequence is complete (828). The event subtask then checks the modem flag (870) to determine whether any communications link is active. In the present description of an exemplary operation of the event subtask to execute a global update function, the originate call routine (840) connects to the host and sets the event subtask modem flag (846).

Accordingly, at the completion of the activity sequence for the global update function, the event subtask detects that the modem flag is set (870) and requests the MMT (872) to disconnect from the host. The event subtask monitors its semaphore flag (873) until notified by the remote MMT that the communications link to the host has been terminated. When the semaphore flag is set, the event subtask clears (874) the modem flag, and then clears (876) the event active semaphore in the Event Manager Task. Finally, the event subtask (a) calculates the new event time for the event record based on the event interval and writes it into the event record, and (b) writes the current event time into its control data block for access during the next event/activity execution.

If the event subtask had been executing an event time and associated activity sequence in which communications was not necessary, such as backup or purge, the event subtask detects that the modem flag is clear (870). In that case, the event subtask would immediately clear the event active semaphore (876) and terminate (878).

3.6 Modem Manager Task

The Modem Manager Task manages modem communications, primarily to support host/remote file transfer for global update, but also for remote diagnostic purposes. Operation for host/remote file transfer depends in part upon whether the modem manager task is running in the host or remote check transaction processing system—all host/remote file transfers are initiated and controlled by the remote system.

Modem communications through the Modem Manager Task are essentially transparent to the other tasks, functionally operating as an extension of the normal intertask communications using intertask service requests. Thus, the remote Event Manager Task sends service requests to the host Data Manager Task through: the remote System Kernal, the remote Modem Manager Task, the host Modem Management Task and finally the host System Kernal. Similarly, the host Data Manager Task responds with a reply, including response data and a stop request, over the same host/remote communications path.

For remote-to-host file transfers, the remote Event Manager Task first issues a dial host request to the remote Modem Manager Task, which the Modem Manager Task executes by dialing the host Modem Manager Task and detecting an off-hook condition at the host. When the remote Event Manager Task is notified by a stop semaphore that a connection has been made, it requests the MMT to send a Log-In ID to establish an active communications link. The remote Event Manager Task then issues a service request to the host Data Manager Task, which is directed by the remote System Kernal into the Modem Manager Task queue. The Modem Manager Task reads the request and sends it to the host system, where the host Modem Manager Task transfers the request to the host Data Manager Task through the host System Kernal. The host data manager task responds with a reply that includes a stop request—this response is communicated through the host/remote Modem Manager Task link to the remote Event Manager Task.

At system initialization, the Modem Manager Task opens its communications port, and conducts modem start-up diagnostic tests.

Figure 12:
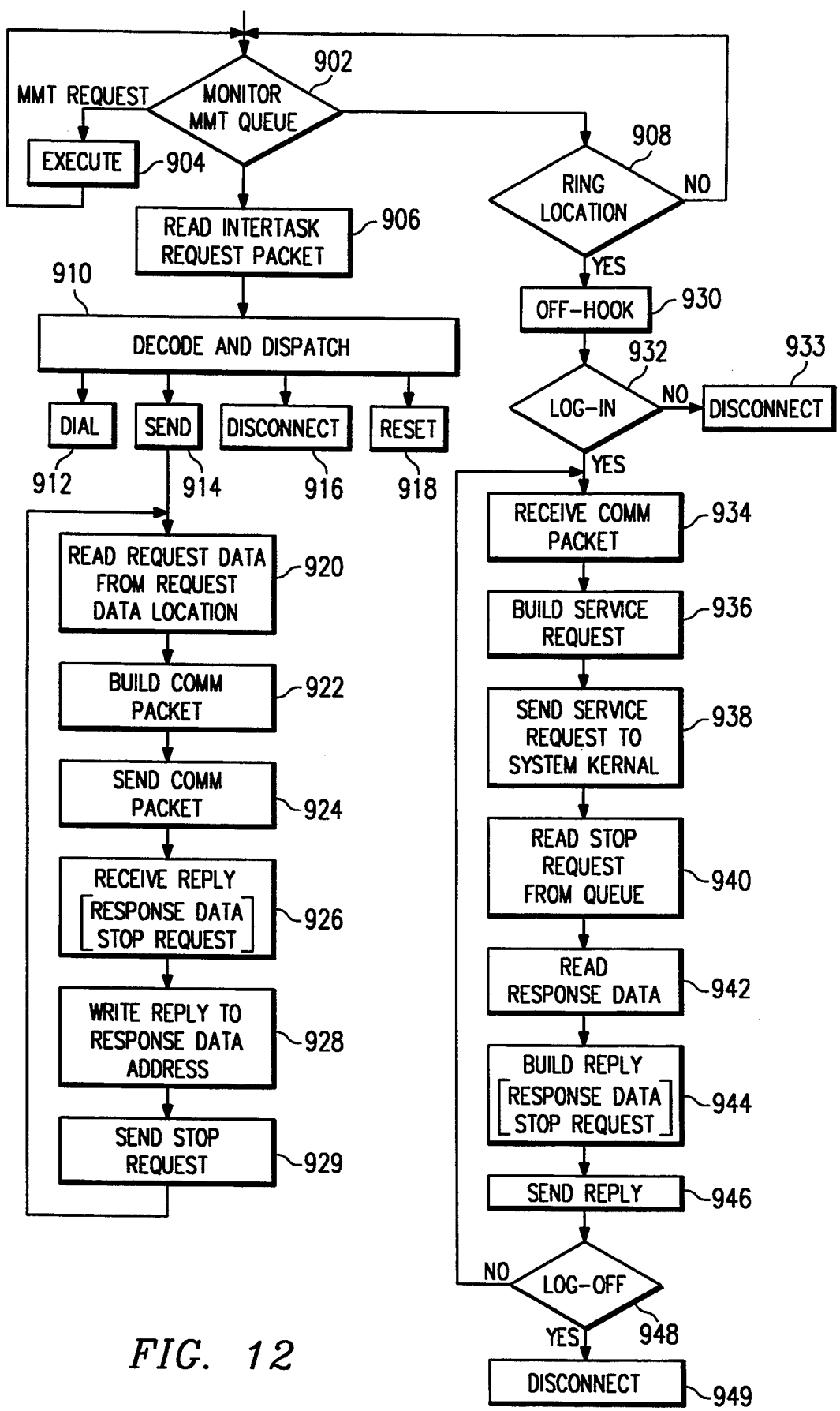
FIG. 12 is a program flow diagram of the Modem Manager Task.

FIG. 12 is a program flow diagram for the Modem Manager Task. The task continually monitor (902) its task queue to detect either (a) intertask request packets written into the queue by the System Kernal, or (b) a ring indication. When an intertask request packet is written into the Modem Manager Task queue, the Task reads (904) the packet, and decodes the function code and dispatches (906) the request to an appropriate modem control routine: Dial, Send, Disconnect and Reset. A communications session will always be initiated with a Connect request directed to the Modem Manager Task, which executes the request by dialing the number specified by the request data (typically the host), and in conjunction with the host Modem Manager Task, establishing a line connection between the two systems.

Typically, when the remote Event Manager Task is advised (with a stop semaphore) by the Modem Manager Task that the host answered the call and a line connection is made, the Event Manager Task sends, via the Modem Manager Task a Log-In ID that establishes an active communications link between the two systems. Once an active communications link is established, the remote/host file transfer procedure for communicating negative status and customer records is as follows.

The remote Event Manager Task sends a request for global update of a record to the host Data Manager Task, writing the record into a specified request data location. The remote System Kernal builds an intertask request packet and routes it to the remote Modem Manager Task. The Modem Manager Task reads (920) the request data from the location specified in the intertask request packet, and builds (922) a corresponding communications packet, including both the request and the request data. The communications packet is sent (924) to the host Modem Manager Task, and the remote Modem Manager Task waits for a reply.

When the Modem Manager Task receives (926) a reply from the host, which includes both response data (such as an acknowledgement) and a stop request, the response data is written (920) to the specified location for response data, and the stop request is sent (929) to the System Kernal, which sets the appropriate semaphore flag.

This communication procedure is continued so long as requests are sent to the Modem Manager Task (920). A remote/host file transfer session is terminated by the remote Event Manager Task sending to the remote Modem Manager Task a disconnect request (916).

The host and remote Modem Manager Tasks cooperate to establish a communications link as follows. A communications session is initiated by a dial request from the remote Event Manager Task is directed to the remote Modem Manager Task, which responds by dialing the host.

A ring indication at the host modem is detected (908) by the host Modem Manager Task, which directs the modem into an off-hook condition (930), establishing a remote/host connection.

The remote Event Manager Task then sends an appropriate log-in identification (932).

File transfer communications are commenced when the host Modem Manager Task receives (934) a communications packet from the remote Modem Manager Task. The host Modem Manager Task builds (936) a corresponding service request that is sent (938) to the host System Kernal.

The service request is directed to the designated responding task, such as the host Data Manager Task, which executes the request and provides both response data and a stop request. The host Modem Manager Task reads (940) the stop request from its queue, and reads (942) the response data from the specified location.

The host Modem Manager Task then builds (944) an appropriate reply packet (including the response data and the "stop" request), and sends (946) the reply to the host Modem Manager Task. The next communication to the host Modem Manager Task will either be a Disconnect instruction (948) or another communications packet.

The Modem Manager Task implements remote/host communications functions in a manner that is essentially transparent to the other tasks and the System Kernal. That is, intertask communications between a remote task and a host task are accomplished in a manner identical to intertask communications between tasks running in the same check transaction processing system, except that both the remote and the host System Kernal are involved in the intertask communication, as are the remote and host Modem Manager Tasks. However, the communications function provided by the remote and host Modem Manager Tasks is essentially transparent to the other tasks running in either the remote or the host. For example, the remote event subtask sends requests in the form of service requests to the host Data Manager Task just as it would send requests to the remote Data Manager Task. Specifically, the remote event subtask builds a request to the host DMT, and sends the service request to the remote System Kernal. The remote System Kernal builds a inner task request packet and places it in the remote MMT task queue. The remote MMT task reads the intertask request packet and builds a communications packet for the request to the host DMT (including function code, request data and stop semaphore flag). The remote MMT transmits the communications packet to the host MMT, which builds a corresponding service request for the host System Kernal. The host System Kernal builds an intertask request packet that is placed in the host DMT task queue. The host DMT retrieves the intertask request packet, which constitutes a request from the remote event subtask, and executes it in the same manner that it would a request from the host event subtask, writing response data into the specified response data location and sending a stop request to the host System Kernal. The host System Kernal, recognizing the stop request as being directed to the remote event subtask, builds an intertask packet with both the response data and the stop request and writes into the remote MMT task queue.

The remote MMT reads the intertask request packet, builds a communications packet and sends it to the remote MMT. The remote MMT writes the response data into a specified location in the data area for the Event Manager Task, and sends the stop request to the remote System Kernal. The remote System Kernal sets the specified stop semaphore, notifying the remote event subtask that response data from the host DMT is available, completing the request/response cycle.

4.0 ALTERNATIVE EMBODIMENTS

While the check transaction processing system has been described in connection with a preferred embodiment, other embodiments within the spirit and scope of the invention as defined by the following claims will be apparent to those skilled in the art.

For example, in the case of multiple-store systems, the preferred embodiment includes separate, essentially autonomous check transaction processing systems at each store site, thereby permitting each store to establish and maintain an essentially local customer database, and limiting off-site data communications activities to remote/host file transfers for global update. However, the local customer database (and associated disk system) need not be located at the store site, but may be remote from the stores' transaction terminal network (such as by locating it in a central office) so long as: (a) transaction terminal response time is not adversely affected and, (b) the essentially local character of the customer database for each is maintained.

The preferred embodiment's implementation of a multitasking system using a System Kernal for task-switching and intertask communications, can be readily adapted to operate under a commercial, multi-tasking operating system. These operating systems provide the task switching and intertask message communications functions performed by the System Kernal. Adapting the CTPS multi-tasking program to a commercially available multi-tasking operating system is well within the programming capabilities of those skilled in the art. Each program task would be modified in a conventional manner to accommodate the specific message communication function implemented by the multi-tasking operating system.

5.0. TARGETED MARKETING FUNCTIONS

5.1. Automatic Building of a Database for a Retail Store Marketing Program

Copending patent application Ser. No. 07/826,255 discloses manually inputting customer information, such as a customer's checking account number, into a database for various purposes. However, previous techniques of building a database from checks required a store employee to physically review the name and address preprinted on each check and type in certain parts of that name and address to try to determine if the name matched a name and address previously stored in the database. For example, after typing in the last name Jones, it would be discovered that there are multiplicity of Jones previously stored in the database. The name Jones would then have to be refined by typing in the names or initials which again might produce a multiplicity of matches. The information could then be further refined by imputing the street address to match along with the full name and initials.

If a grocery store for example, has a volume of several thousand check customers per day, this manual database building technique would mean a substantial amount of labor and time required to manually key in the name and address information to find out if, in fact, that record was already in the database and was complete. If the database was incomplete, the new information would have to be manually loaded into the database.

The present invention provides a method which may be accomplished utilizing the automatic check reader 119 in order to automatically build a database for use in a retail store marketing program. With use with the system, a customer's check is quickly scanned by the check reader 119 of the invention at the point of sale, or at another suitable location within the store. Due to the unique nature of the reader 119, all checks from all banks can be read and the customer identification number can be detected in any MICR location. Moreover, changes in bank transit codes and other identification changes can be automatically detected by the system so that the customer may be tracked, as previously described. The detected unique customer identification code is then transmitted to the host computer 110 which stores a previously stored database of unique customer identification codes. The detected unique customer identification code is then compared against the stored database. The system detects the occurrence of a match between information in the stored database and the detected unique customer identification code. When a match occurs, a determination is made if all necessary predetermined identification criteria related to the detected unique customer identification is in the stored database. Specifically, a determination is made if the full address and the telephone number of the detected identification code was previously stored in the database.

If the predetermined customer identification data is found in the stored database, a signal is transmitted from the host processor 110 to the POS terminal 120 to provide a display that the customer record is complete and that no further data is required, or in the alternative a signal may be transmitted in only those instances when additional information is required to complete the database criteria. If an indication is provided that the predetermined identification criteria is not contained in the database, such as lack of address information or the like, a signal is generated to the POS terminal 120 to indicate that insufficient identification criteria exists. The store personnel may then input the required additional identification criteria into the database. The additional identification criteria is then entered into the database of the host processor 110 for storage in conjunction with the unique customer identification code. This entering of additional identification criteria will normally be done "after hours" by setting aside the check in question and entering the data in a "back room" in the store. The system also generates information about the date and amount of the transaction, which is also stored in the database.

Thus, the present system may continuously build an up-to-date database which contains relevant information about the frequency of the customer's transactions, the amount of the transaction, along with the current address and information. As will be subsequently described, this database may be used for various types of targeted marketing in order to enhance the retail store's marketing.

Figure 13A:
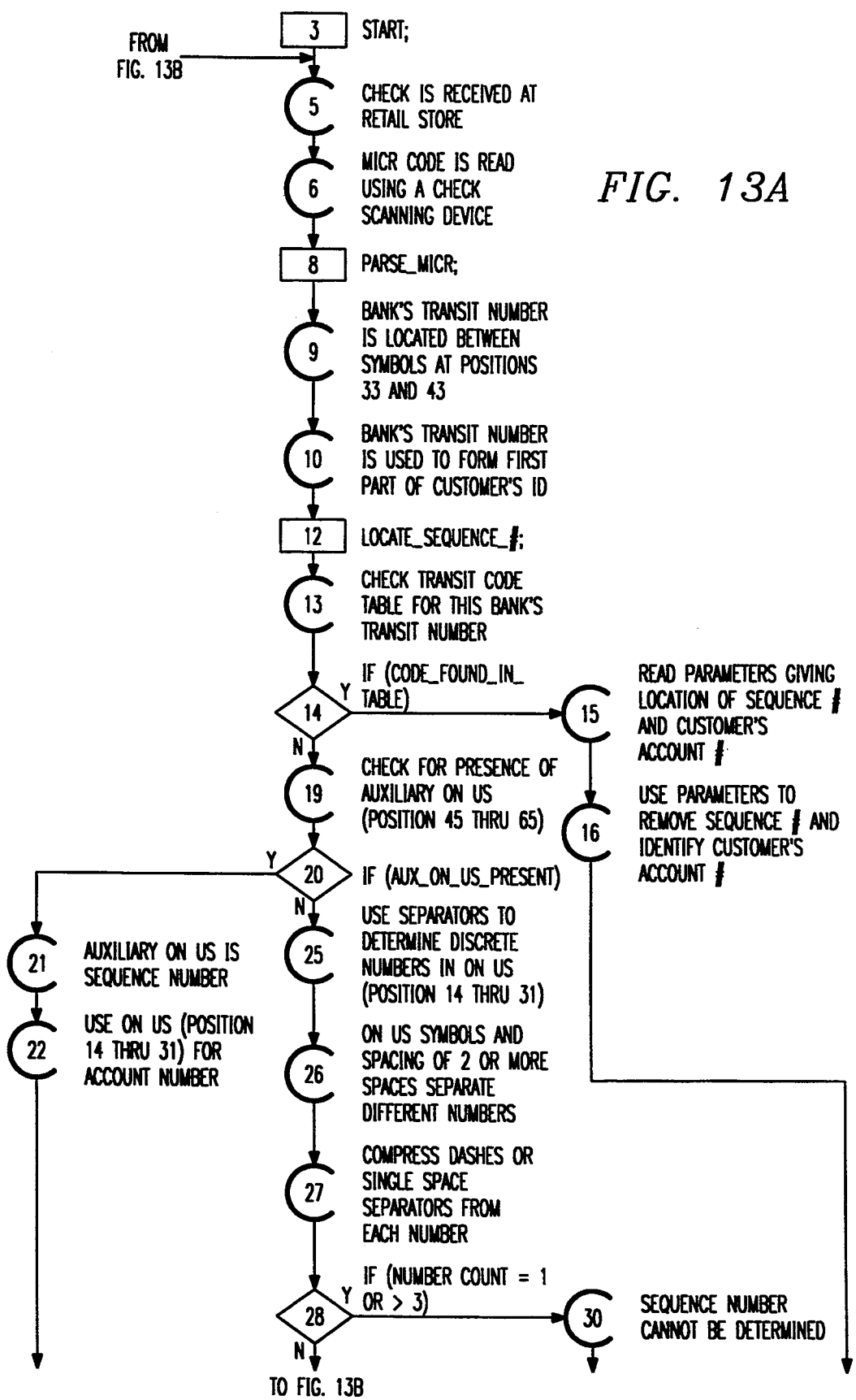
FIGS. 13A and B are program flow diagrams of the Build-Check-Database subroutine used to build a database.
Figure 13B:
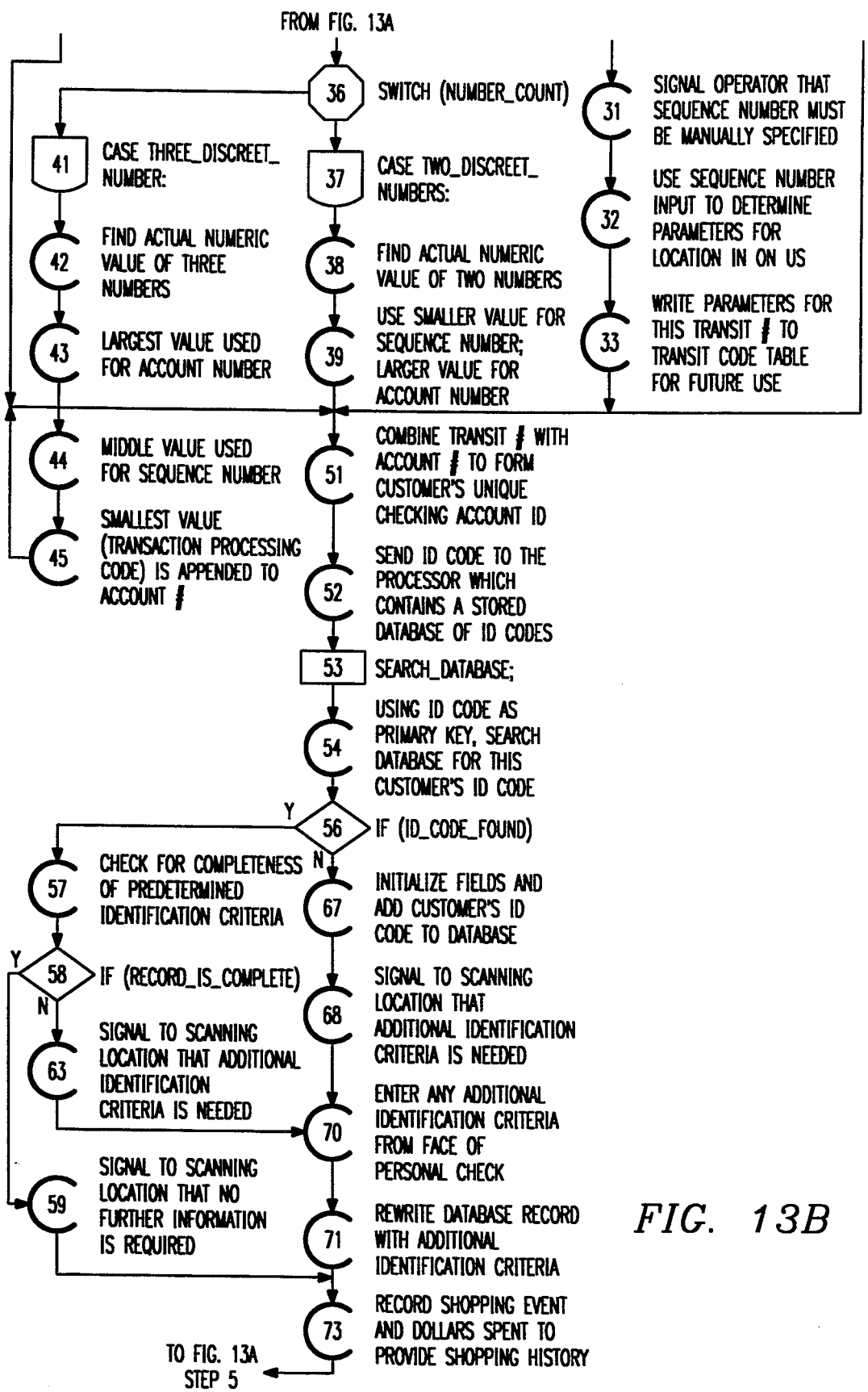

FIGS. 13A and B describe this aspect of the present invention, which is accomplished in conjunction with the present check reader 119 which can detect a customer account number in the MICR check code, regardless of location therein, as previously noted. An explanation of the features of FIGS. 13A and B is as follows:

| Step | Description |
|---|---|
| 3 | Beginning a process being flowed. |
| 5 | Check is taken for tendering purchase at retail store. |
| 6 | Scanning device is used to read the MICR code from the bottom of the check. |
| 8 | MICR code must now be parsed for meaningful data. ANSI standards specify the following field locations within MICR band:<br>Amount field 1–12<br>On Us 14–31<br>Transit 33–43<br>Auxiliary On Us 45–64 |
| 9–10 | Use transit field for the first part of the customer's ID number. |
| 12 | The check's sequence number (which matches the number on the top right hand corner of the check) must be located in order to determine the customer's bank checking account number. |
| 13–16 | A variable length, dynamic TRANSIT CODE TABLE is maintained on disk for checks that cannot be successfully parsed. The index key for this table is the bank's transit number. Included for each table entry are the beginning and ending positions of the sequence number within the MICR band. The system will prompt the operator for the sequence number if it cannot determine its location within the On Us field, and then add the entry to the TRANSIT CODE TABLE. The modifications to the TRANSIT CODE TABLE and/or the TABLE may be maintained and downloaded from another computer. |
| 20–22 | Data in the Auxiliary On Us field, otherwise indicated in the TRANSIT CODE TABLE, is the check sequence number. This would indicate that all data in the On Us field make up the customer's bank account number. |
| 25–27 | Parse On Us field. Use any data within positions 13 through 32 as the On Us field. Discrete numbers are usually divided with 2 or more spaces or the ANSI On Us character. Embedded single spaces and the ANSI MICR dash are removed from within said discrete numbers. |
| 28 | Test for number of discrete numbers parsed from the On Us field . . . |
| 30–33 | If one or more than three discrete numbers are located in the On Us field, the sequence number is either not present or is embedded in such a way that its location cannot be determined. The operator enters the sequence number including any leading zeros. The system can then determine the relative position of the sequence number in the On Us field and stores this as an additional entry to the TRANSIT CODE TABLE. |
| 37–39 | If two discrete numbers are located in the On Us field, unless otherwise indicated in the TRANSIT CODE TABLE, the number with the lesser value is the check sequence number, and the number with the greater value is the customer's checking account number. |
| 41–45 | If three discrete numbers are located in the On Us field, unless otherwise indicated in the TRANSIT CODE TABLE, the number with the greatest value is the customer's checking account number. The smallest value in the Transaction Processing Code and is appended to the end of the checking account number. The middle value is the check sequence number. |
| 51 | Once the bank's transit number and customer's checking account number are parsed from the MICR band, they are extracted and combined (transit number followed by account number) to form the customer's unique checking account ID. |
| 52–54 | This ID is used as the primary key for a customer database on disk indexed by checking account ID. In this database building process, the key is passed to the processor and the database is searched by checking account ID key. |
| 57–63 | If a record exists in the database for the customer with this checking account ID, the completeness of predetermined identification criteria is checked and the result is signaled back to the operator. |
| 67–68 | If no record exists, one is created for this checking account ID and the operator is signaled the record is incomplete of predetermined identification criteria. |
| 70–71 | If signaled to do so, operator enters additional information from off of the face of the check. The updated record is rewritten in the database. |
| 73 | Shopping event and dollars spent is recorded in order to build a shopping history for each customer's record. |

5.2. Targeted Marketing Program

It has been previously known to utilize marketing programs wherein users of a retail store's services are targeted to attempt to induce the customers to make additional purchases from the retail store. What has not before been possible, however, is to allow a retail store owner to target only non-customers. If such were possible, store owners would not waste mailing and marketing expenses on people in their targeted geographic area who had been previous customers. In other words, the retailer would be able to use his marketing dollars to attempt to entice non-customers or infrequent customers to visit the store.

Figure 14A:
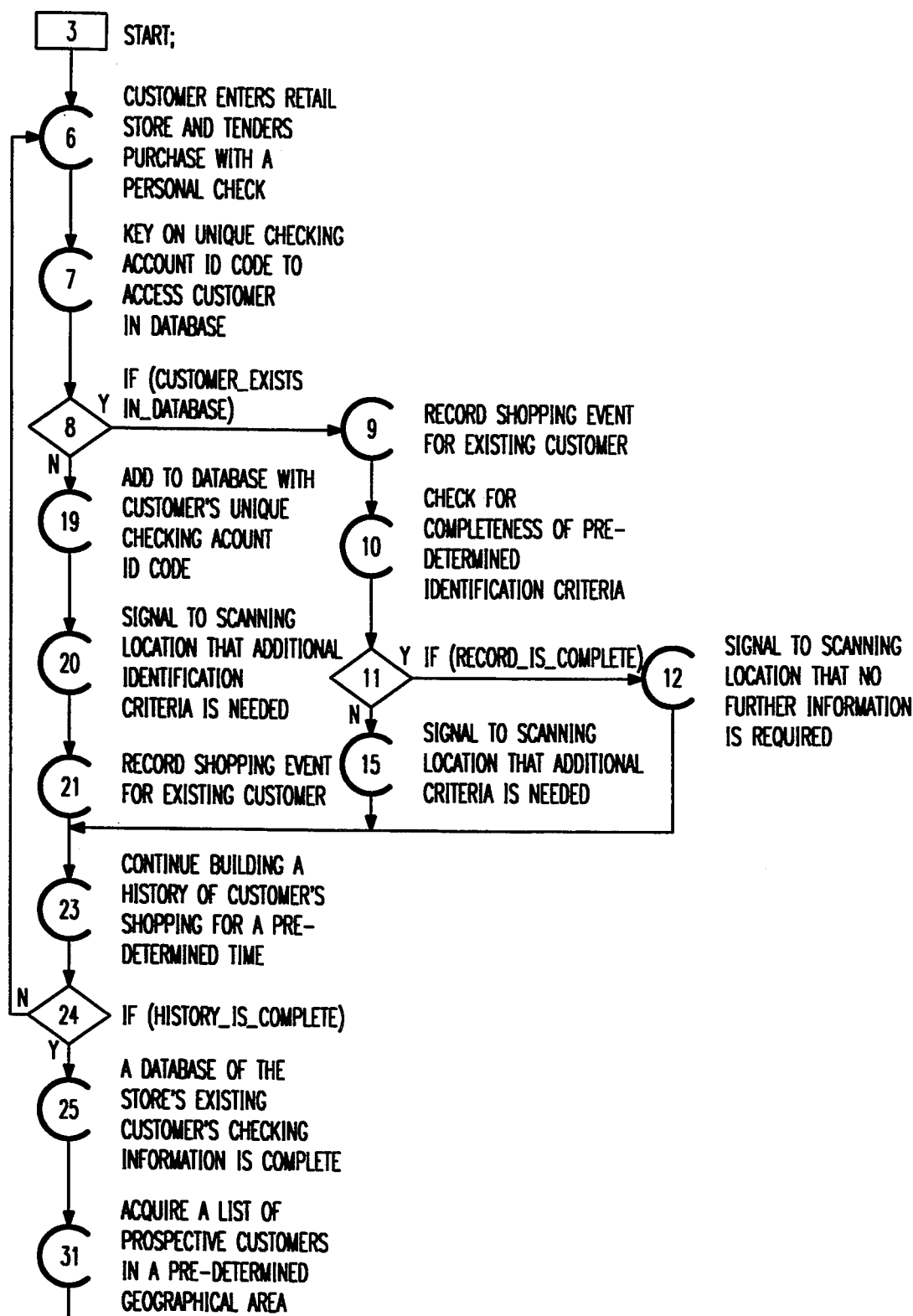
FIGS. 14A and B are program flow diagrams of a non-customer database building technique.
Figure 14B:
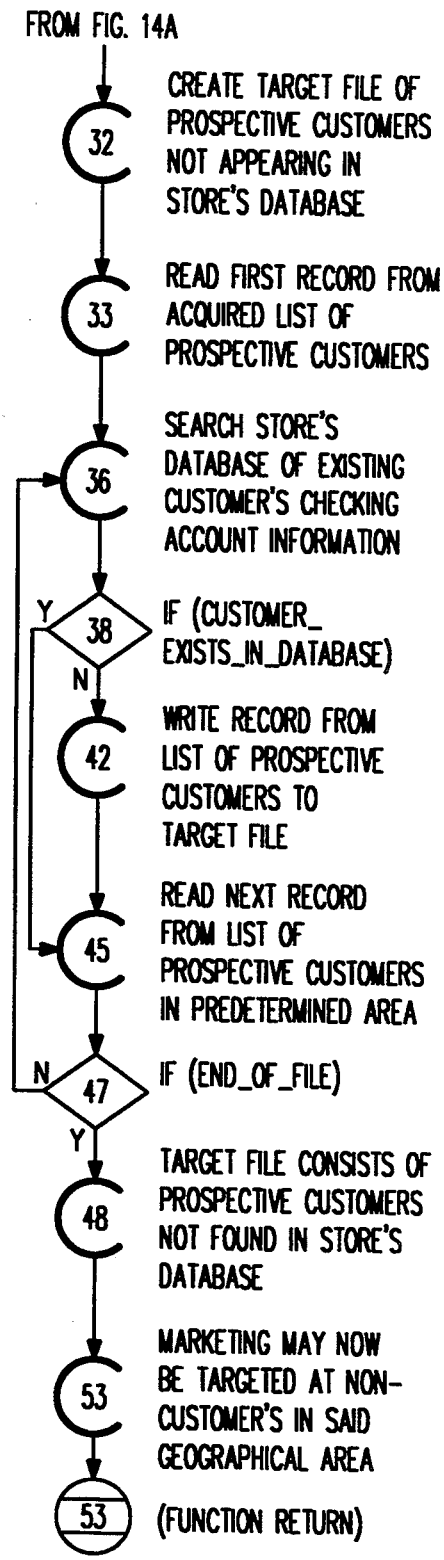

FIGS. 14A and B illustrate a software program subroutine operable to be performed in the host processor 110 in order to purge existing customers from a database. In operation, the system of the present invention is utilized so such that the check reader 119 automatically scans a customer's check and inputs the customer's unique identification number based upon the customer's checking account number into the system. The specific steps of the routine of FIGS. 14A and B are described in detail as follows:

| Step | Description |
| --- | --- |
| 3 | Beginning of process being flowed. |
| 6 | Check is taken for tendering purchase at retail store. |
| 7 | Once the bank's transit number and customer's checking account number are parsed and extracted from the MICR band, they are combined (transit number followed by account number) to form the customer's unique checking account ID. This ID is used as the primary key for a customer database on disk indexed by checking account ID. |
| 8–15 | If a record exists in the database for the customer with this checking account ID, the completeness of predetermined identification criteria is checked and the result is signaled back to the operator. Shopping event and dollars spent are recorded in order to build a shopping history for each customer's record. |
| 19–20 | If no record exists, one is created for this checking account ID and the operator is signaled the record is incomplete of predetermined identification criteria. |
| 23–25 | Shopping event and dollars spent are recorded over a period of time sufficient in length to get a good representation of the store's customer base. |
| 31 | A file containing a complete list of residents in a predetermined geographic area is obtained from a third party. |
| 32 | Create an empty TARGET FILE for writing records of prospective customers not appearing in store's database. |
| 33 | Read FIRST record from the file containing a complete list of residents in a predetermined geographic area. |
| 36 | Search in the store's database for to determine if this household is present in the store's database. |
| 38–42 | if this household is not contained in the store's database, write this record said TARGET FILE of prospective customers not appearing in the store's database. |
| 45–47 | Read the NEXT record from said list of prospective customers in a predetermined geographic area. If END OF FILE marker is found then proceed to step 48, otherwise LOOP back up to step 36. |
| 48 | Said TARGET FILE now contains a list of prospective customers from a predetermined geographic area that were NOT contained in the store's active list of customers. |
| 53 | Marketing may now be targeted toward this list of non-customers, such as mailing of inducement coupons or advertising. |

In summary, it may be seen that the technique of FIGS. 14A and B provides a method for retail store marketing which begins with the stored database of existing customers of the retail store which has been accumulated in the manner previously described. The database includes each customer's checking account identification number for use as a unique customer identification code, along with additional customer identification data such as home address, telephone number and the like. Each time a retail customer enters the retail store and makes a purchase, the unique customer identification code of the customer is detected by the present system. Comparison is made of each entered unique customer identification code with the stored database. A list of prospective customers of the retail store in a predetermined geographical area is obtained through conventional sources and is stored in the host processor 110. Comparison is made of the stored database with the list of prospective customers. All data is eliminated from the list of prospective customers which relates to information contained in the stored database, such that a non-customer database is produced which contains data relating only to prospective customers who do not appear on the stored database.

The present system generates a non-customer database which would allow the mailing of advertising material in a geographic area to customers who have not previously shopped, or who have infrequently shopped at the retail store.

5.3. Infrequent Shopper Database and Marketing Technique

Competition among retail stores has dramatically increased such that targeted marketing is becoming increasingly important. Historically, such retail stores such as grocery stores have relied upon a loyal base of shoppers who have shopped at that particular establishment over a long period of time. However, with increased competition, it has now been determined that many shoppers frequent many different stores, particularly grocery stores, based upon coupons or price differentials at the time.

For example, Table 5 attached hereto illustrates customer shopping frequency data which was accumulated by the present system at an actual grocery store over an eight week period in 1991. Surprisingly, it was found in this particular store that 55% of the store's customers during this period only visited the grocery store one time. Only a few percentage points of the customers visited the store over seven times during that period.

Specifically, for a total number of almost 30,000 customers over the eight week period, 8,794 customers only visited the store one time, while 2,776 customers visited the store only twice. Over 20% of the store's revenue during the period was based upon a single visit by 8,794 customers.

Table 6 illustrates an infrequent customer analysis of a different grocery store over an eight week period. This table illustrates that 24.3% of the total customer base, or 5,581 customers, averaged visiting the grocery store only 1.08 times during the eight week period.

This shopping data, which was developed using the present invention, has come as a surprise to grocery store owners. Many owners did not previously understand the large percentage of their business which was coming from infrequent shoppers. A need has thus arisen for a marketing technique to target these infrequent shoppers to encourage them to visit the grocery store more often. It will be understood that many families visit a grocery store approximately one time per week, and thus a visit of only once every eight weeks means that the store is being visited by many infrequent shoppers who are shopping at different stores. It could substantially enhance the store's revenues if these infrequent shoppers could be induced to shop more often at a particular store.

Figure 15A:
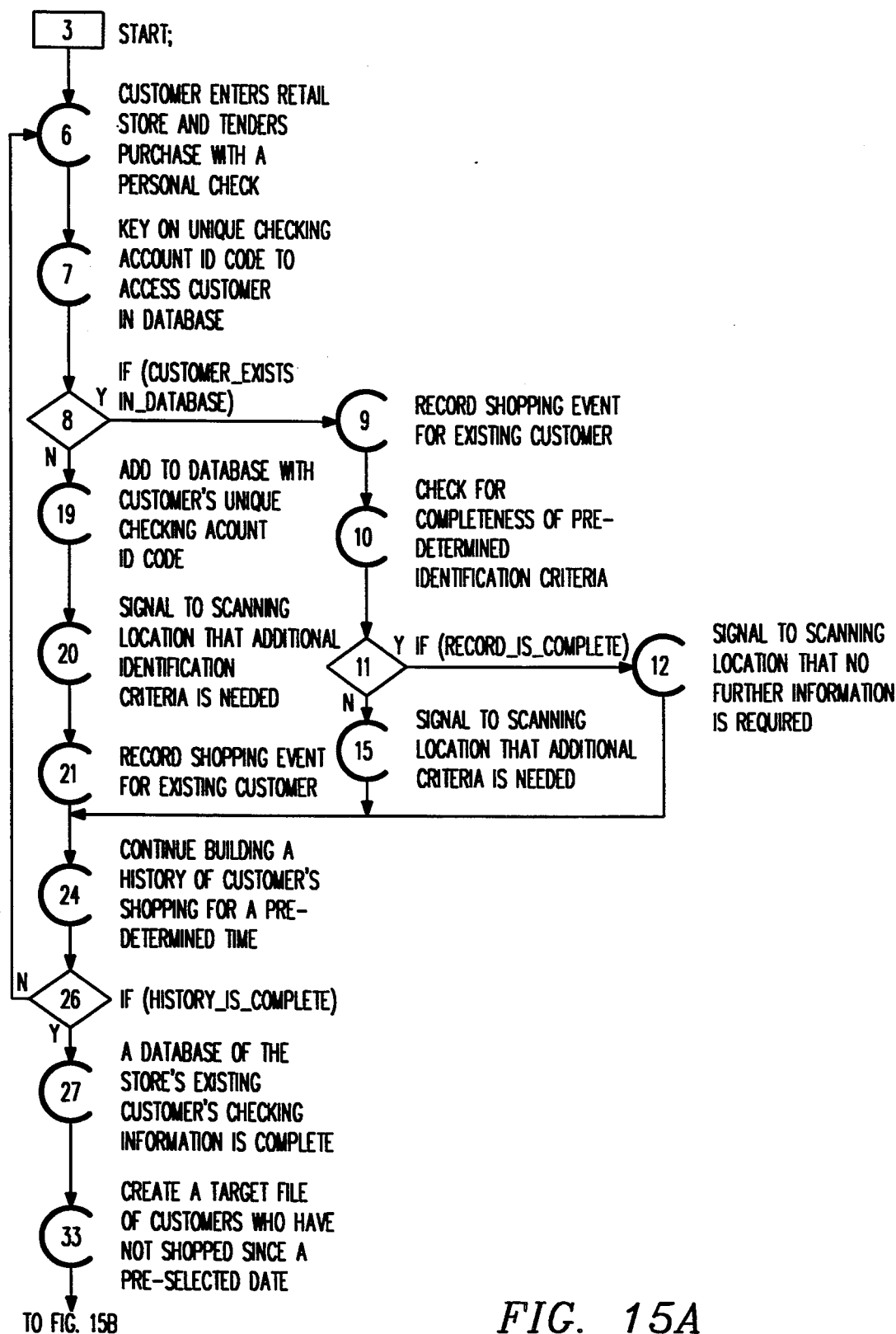
FIGS. 15A and B are program flow diagrams of a last shopping date database building technique.
Figure 15B:
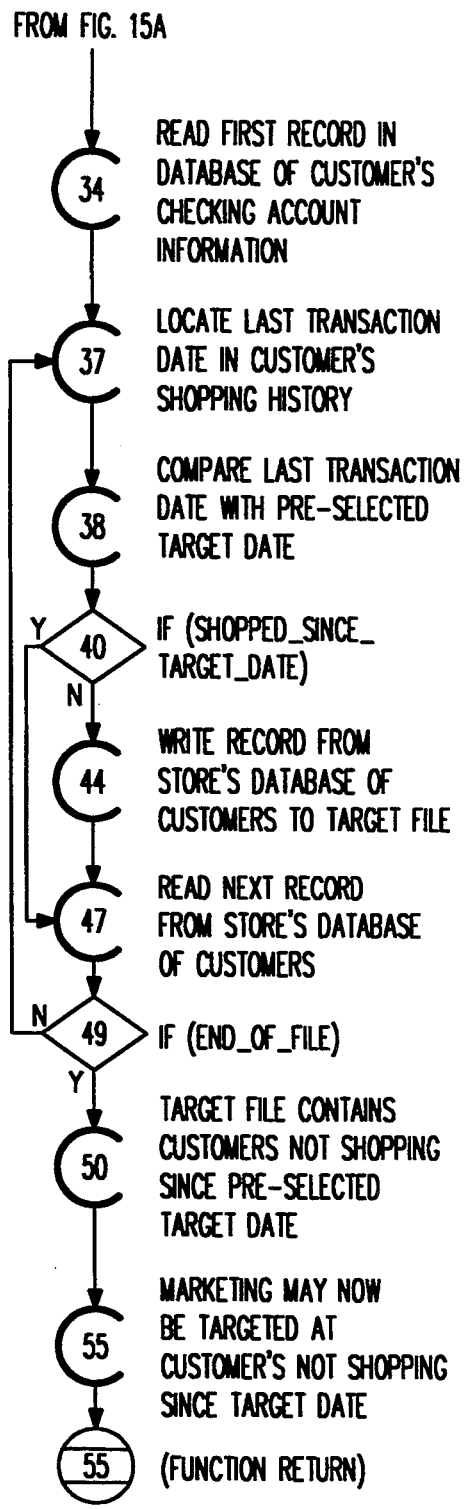

FIGS. 15A and B illustrate a marketing program which uses the system of the present invention to detect infrequent customers such that marketing may be directed at those infrequent customers. Specifically, the techniques shown in FIGS. 15A and B identify customers who have not shopped since a predefined target date, such as thirty days. After developing this list of infrequent shoppers, the store can then mail out direct mail enticements to the customer, such as providing them with coupons and the like if they shop at that particular store.

A description of the routine as shown in FIGS. 15A and B is described in more detail as follows:

| Step | Description |
| --- | --- |
| 3 | Beginning of process being flowed. |
| 6 | Check is taken for tendering purchase at retail store. |
| 7 | Once the bank's transit number and customer's checking account number are parsed from the MICR band, they are combined (transit number followed by account number) to form the customer's unique checking account ID. This ID is used as the primary key for a customer database on disk indexed by checking account ID. |
| 8–15 | If a record exists in the database for the customer with this checking account ID, the completeness of predetermined identification criteria is checked out and the result is signaled back to the operator. Shopping event and dollars spent are recorded in order to build a shopping history for each customer's record. |
| 19–20 | If no record exists, one is created for this checking account ID and the operator is signaled the record is incomplete of predetermined identification criteria. |
| 21–27 | Shopping event and dollars spent are recorded over a period of time sufficient in length to get a good representation of the store's customer base. |
| 33 | Create an empty TARGET FILE for writing records of customer's who have not shopped this store since a preselected shopping date. |
| 34 | Read FIRST record from the store's database of customer's check information and related shopping history. |
| 37–38 | Locate customer's LAST SHOPPING DATE from customer's shopping history and compare with said preselected shopping date. |
| 40–44 | If this customer's LAST SHOPPING DATE is prior to said preselected shopping date, write this record to said TARGET FILE of customer's who have not shopped this store since a preselected shopping date. |
| 47–49 | Read the NEXT record from said store's database of customer's check information and related shopping history. If END OF FILE marker is found then proceed to step 50, otherwise LOOP back up to step 37. |
| 50 | Said TARGET FILE now contains a list of the store's customers who have not shopped this store since a preselected shopping date, and may be used for targeted marketing such as mailings. |

It may thus be seen that the program of FIGS. 15A and B provides an efficient technique of building a customer database and mailing list using checks from a variety of different banks. In operation, a customer's checking account identification number is detected by the check reader 119 for use as a unique customer identification code. As previously disclosed, a unique aspect of this invention is that the present check reader can determine checking account identification numbers even if the proper spacing and symbology is not utilized. The system can also detect changes in bank transit numbers. The checking account identification number is entered into processor 110 which contain a database that maintains customer records including the customer's name and address, the checking account identification number, and customer shopping habits and transactional data over a preselected time interval. The checking account identification number is compared with the database. A response is generated by the processor 110 to signal the presence of the customer's checking account identification number or the failure to locate the customer's checking account identification number. A new record is then created in the database for that customer's checking account identification number in response to a processor 110 response indicating the failure to locate, so that the customer's name and address is entered into the record along with a shopping incidence and shopping data being recorded in the database concurrently. A list of customers is then generated in the database whose last transaction date is prior to a preselected interval of inactivity so that grouping or subgrouping of customers is available for marketing efforts.

Alternatively, the system may use dollar amounts to determine an "infrequent shopper". If the system determines that the cumulative dollars spent at the store by a specified customer is equal to or less than a predetermined dollar level within a predetermined time interval, the specified customer is designated as an "infrequent shopper".

As another alternative, the database is maintained with the shopping history for each unique check identification. Each time the system detects a check with a unique check identification number, it is checked against the database. If the last date shopped is prior to a preselected date, a signal is generated and transmitted to the POS. The check is then marked or set aside to be used to create a mailing list. Alternatively, the signal may be used to prompt the store clerk to disburse incentive coupons at the POS.

5.4. Marketing Based on Range of Last Shopping Dates

Figure 16A:
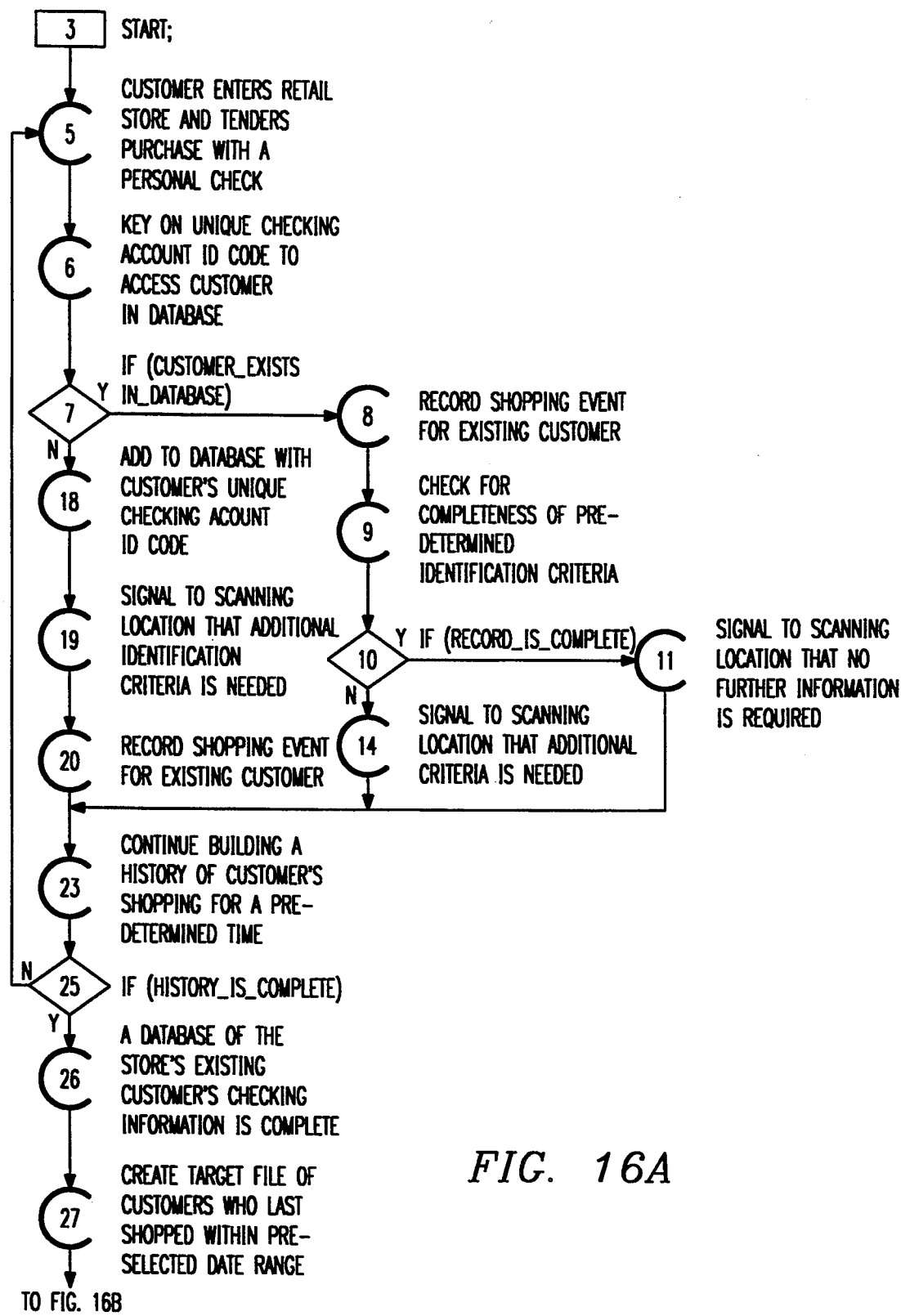
FIGS. 16A and B are program flow diagrams of a range of last shopping date database building technique.
Figure 16B:
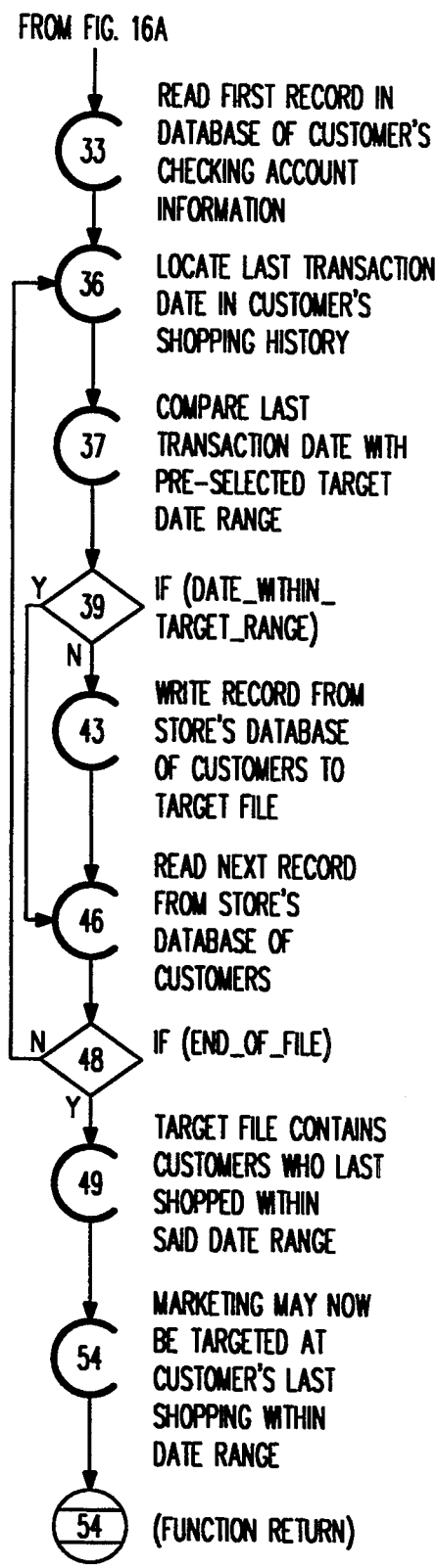

As noted above, it would be advantageous to be able to selectively market to infrequent shoppers. FIGS. 15A and B illustrated a database building technique to obtain a list of infrequent shoppers based upon their last shopping date. FIGS. 16A and B illustrate a database building technique to provide a list of a store's customers whose last shopping date falls within a preselected shopping date range. For example, it would be possible using the techniques shown in FIGS. 16A and B to provide a list of customers whose last shopping date falls within a period of 30 to 60 days prior.

In accordance with the techniques shown in FIGS. 16A and B, a customer's checking account identification number is entered as a unique customer identification code by the check reader 119. Host processor 110 is programmed to store a database which includes a plurality of unique customer identification codes and check cashing history of prior customers of the retail establishment, including date of check transactions. The processor then compares each newly entered unique customer identification code against the stored database. A signal is generated to indicate the presence of a complete customer information record or of an incomplete customer information record as a result of the comparison. A second database is then generated which lists customers whose last unique customer identification code entry date falls within a preselected date range. A promotion may then be selectively offered by the retail establishment to customers within the second database. For example, coupons or other enticements may be mailed directly to the customers on the second database, or distributed at the POS.

FIGS. 16A and B are described in detail as follows:

| Step | Description |
|---|---|
| 3 | Beginning of process being flowed. |
| 5 | Check is taken for tendering purchase at retail store. |
| 6 | Once the bank's transit number and customer's checking account number are parsed from the MICR band, they are combined (transit number followed by account number) to form the customer's unique checking account ID. This ID is used as the primary key for a customer database on disk indexed by checking account ID. |
| 7-14 | If a record exists in the database for the customer with this checking account ID, the completeness of predetermined identification criteria is checked and the result is signaled back to the operator. Shopping event and dollars spent are recorded in order to build a shopping history for each customer's record. |
| 18-19 | If no record exists, one is created for this checking account ID and the operator is signaled the record is incomplete of predetermined identification criteria. |
| 23-26 | Shopping event and dollars spent are recorded over a period of time sufficient in length to get a good representation of the store's customer base. |
| 27 | Create an empty TARGET FILE for writing records of customer's who last shopped this store within a preselected shopping date range. |
| 33 | Read FIRST record from the store's database of customer's check information and related shopping history. |
| 36-37 | Locate customer's LAST SHOPPING DATE from customer's shopping history and compare with said preselected shopping date range. |
| 39-43 | If this customer's LAST SHOPPING DATE falls within the range of said preselected shopping date range, write this record to said TARGET FILE of customer's who have last shopped this store within a preselected shopping date range. |
| 46-48 | Read the NEXT record from said store's database of customer's check information and related shopping history. If END OF FILE marker is found then proceed to step 49, otherwise LOOP back up to step 36. |
| 49 | Said TARGET FILE now contains a list of the store's customers whose LAST SHOPPING DATE falls with a preselected shopping date range. |

In addition to the above, the selection criteria for an "infrequent shopper" may also include a required minimum dollar amount in a preselected time range.

5.5. Dissemination of Point-of-Sale Coupons and Direct Mail Coupons Based Upon Shopping History FIGS. 17A and B illustrate a program flow chart of a marketing technique utilizing the present invention, wherein coupons may be distributed to customers based upon the frequency of shopping, dollar volume or other criteria based upon the shopping habits of the customer. As previously noted, retail establishments such as grocery stores, using the present invention, can now determine the importance of inducing infrequent shoppers to shop and also the maintenance of existing customers. The technique shown in FIGS. 17A and B enables the stores to issue coupons and other inducements to customers based upon the shopping habits of the customer. For example, the technique shown in FIGS. 17A and B enables the store to reward a high volume shopper in order to hold on to especially good shoppers. Alternatively, the store can award a lesser incentive package to good shoppers in order to maintain a consistency such that each shopper receives a coupon package. Importantly, the technique enables a high incentive coupon pack to be delivered to a customer who is a secondary shopper or who is an infrequent shopper, in order to make them a primary shopper.

Figure 17A:
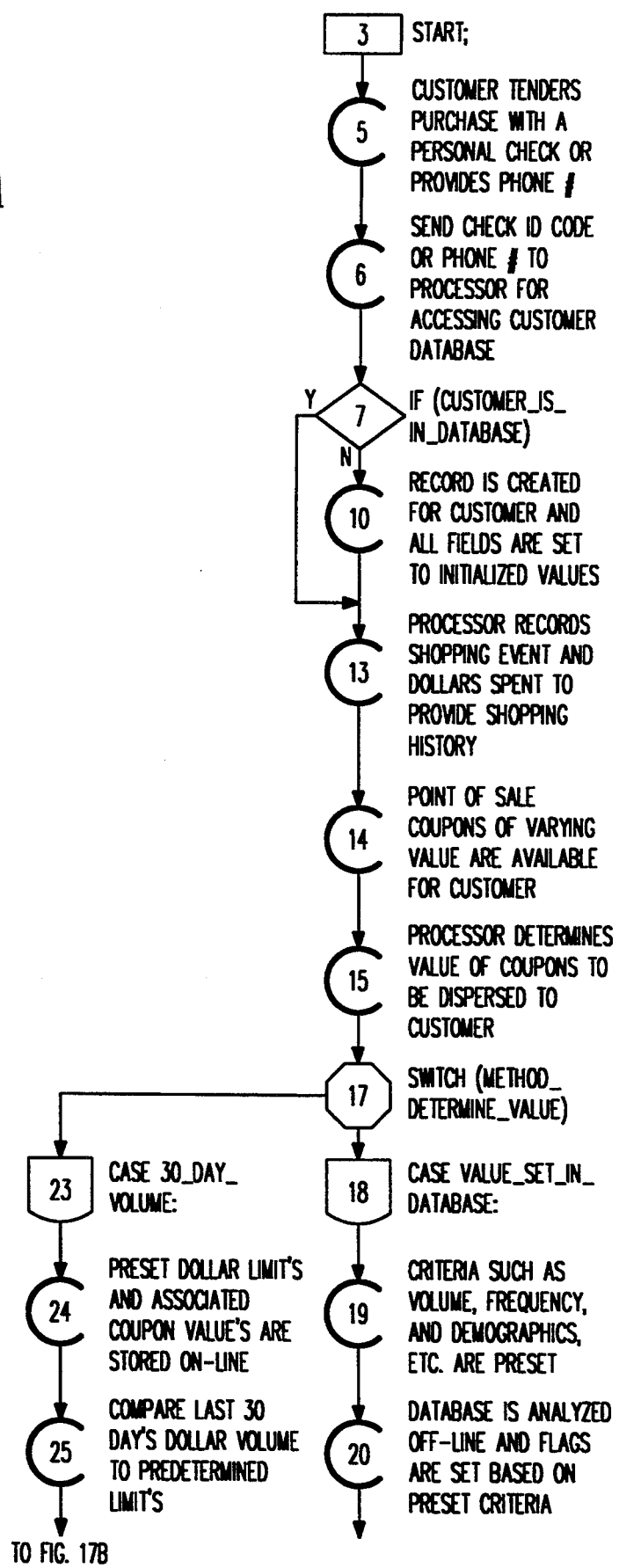
FIGS. 17A and B are program flow diagrams of a technique for distributing point-of-sale coupons based upon predetermined shopper criteria.
Figure 17B:
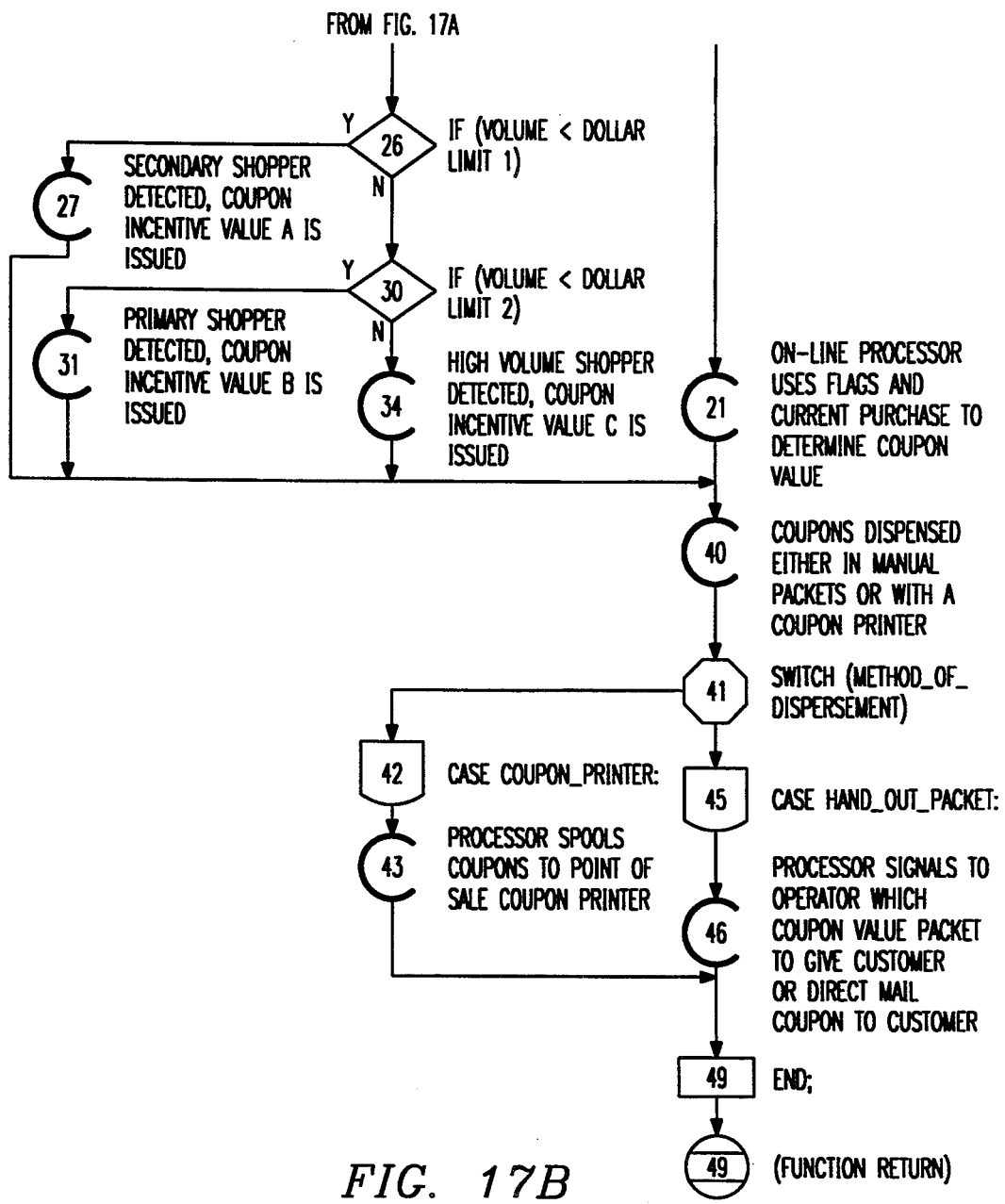

A detailed description of the operation of the technique illustrated by FIGS. 17A and B utilizing the present invention is as follows:

| Step | Description |
|---|---|
| 3 | Beginning of process being flowed. |
| 5 | Check is taken for tendering purchase at retail store. |
| 6 | Once the bank's transit number and customer's checking account number are parsed from the MICR band, they are combined (transit number followed by account number) to form the customer's unique checking account ID. This ID is used as a primary key for a customer database on disk indexed by checking account ID. |
| 10 | If no records exists, one is created for this checking account ID and the operator is signaled the record is incomplete of predetermined identification criteria. |
| 13 | If a record exists in the database for the customer with this checking account ID, the completeness of predetermined identification criteria is checked and the result is signaled back to the operator. Shopping event and dollars spent are recorded in order to build a shopping history for each customer's record. |
| 14–15 | The store has on hand coupons to be handed out at the point of sale. These coupons may be arranged into varying value packages. We will assume 3 different coupon packs for point-of-sale dispersement: Coupon VALUE A: For customer who has been determined to be a SECONDARY shopper. This would be incentive to make them become a PRIMARY shopper. Coupon VALUE B: For customer who has been determined to be a PRIMARY shopper. This would be a lessor incentive package to primarily maintain a consistency whereby everyone receives a package. Coupon VALUE C: For customer who has been determined to be a HIGH VOLUME shopper. This incentive would be used as a means to hold on to especially good shoppers. |
| 17 | There are two methods for determining the coupon package to be dispersed at the point of sale. Steps 18–21 deal with preselected criteria analyzed OFF-LINE and downloaded to the front end computer. Steps 23–34 deal with ON-LINE determination based on prior 30 days shopping VS two preselected dollar LIMITS (LIMIT 1 and LIMIT 2). |
| 18 | OFF-LINE ANALYSIS: |
| 19 | Preselected criteria such as shopping volume, frequency, demographics, etc. along with how they relate to the Coupon offerings are set for OFF-LINE analysis. |
| 20 | Each record is analyzed against said preselected criteria and corresponding Coupon VALUEs are selected and flagged. Said Coupon VALUE information is then downloaded to the ON-LINE processor. |
| 21 | On the customer's next visit, ON-LINE processor uses said downloaded Coupon VALUE information to flag to clerk which point-of-sale Coupon VALUE package to disperse to the customer. Proceed to step 40 for METHOD OF DISPERSEMENT. |
| 23 | ON LINE 30 DAY ANALYSIS: |
| 24 | Two dollar limits are preselected, ie: LIMIT 1 = 100.00 LIMIT 2 = 350.00 |
| 25 | Prior dollars spent for the previous 30 days are calculated and compared with said preselected dollar limits. |
| 26–27 | If prior dollars spent for previous 30 days is LESS THAN LIMIT 1, customer is considered a SECONDARY shopper; Coupon VALUE A is dispersed to customer. Proceed to step 40 for METHOD OF DISPERSEMENT. |
| 30–31 | If prior dollars spent for previous 30 days is GREATER THAN LIMIT 1, but LESS THAN LIMIT 2, customer is considered a PRIMARY shopper; Coupon VALUE B is dispersed to customer. Proceed to step 40 for METHOD OF DISPERSEMENT. |
| 34 | If prior dollars spent for previous 30 days is GREATER THAN LIMIT 2, customer is considered a HIGH VOLUME shopper; Coupon VALUE C is dispersed to customer. |
| 40–46 | Coupons are dispersed either with clerk manually handing indicated packet to customer or by ON-LINE processor spooling selected Coupon VALUE to a point-of-sale coupon printer, or by having the clerk mark the check with a code so that coupons may be subsequently distributed to the customer by direct mail. |

Many of the prior art marketing techniques require the mailing of coupons to customers after the targeted database has been developed. With the techniques shown in FIGS. 17A and B, coupon rewards and other incentives may be made at the time of the point of sale. The invention contemplates at least three different ways of accomplishing a coupon reward at the point of sale. One is to utilize display 124 (FIG. 2A) which displays information to the store employee to indicate what type of coupon or other incentive reward is to be dispensed, and the employee hands the coupons to the customer, or in the alternative the clerk/operator may mark or set aside the check for use as a source of a mailing list for distribution of incentives. As an example, as previously noted, let us assume that three coupon packs A, B and C have been developed, based upon the desire to provide different incentive rewards for a secondary shopper, a primary shopper and high volume shopper. Three stacks of these coupon packs are placed readily available to the store employee. When a shopper comes in and presents a check, the check is scanned through the check reader 119 and the host processor 110 utilizes the techniques of FIGS. 16A and B to generate an indication of whether or not the shopper is a secondary, primary or high volume shopper. The display 124 then generates a display that says "This shopper is a primary shopper. Please give this shopper coupon pack B." The store employee would then hand the customer a coupon pack B. As other customers come through that are different types of shoppers, different coupons are provided to them. In this way, the present invention enables the store to discriminate between various types of customers in order to induce the infrequent shopper to come back, while maintaining the goodwill of good shoppers A third technique of distributing coupons utilizes a system to actually print, at the point of sale, coupons bearing the desired information based upon selected criteria. Commercially available printers may be used for generating coupons at a point of sale, such as disclosed in U.S. Pat. No. 4,723,212 issued on Feb. 2, 1988 and entitled Method and Apparatus for Dispensing Discount Coupons or as further disclosed in U.S. Pat. No. 4,910,672 issued Mar. 20, 1990 and entitled Method and Apparatus for Dispensing Discount Coupons. As disclosed in the two aforesaid patents, systems may be provided to generate coupons at the point of sale based upon the type of product purchase. In the disclosures of the above-captioned two patents, a coupon relating to a particular type of a product is generated based upon a bar code reader determining that a triggering or competing product has just been purchased by the consumer. The same coupon dispensing apparatus described in the two aforesaid patents may be utilized to print the coupons as described in FIGS. 16A and B, but based upon the criteria and the operation of the present invention.

The present invention looks at the history of the shopper in question and induces the shopper to return based upon preselected criteria such as has the customer purchased above a certain amount of dollars, has the customer purchased between certain amounts of dollars or less than a certain amount of dollars, or has the customer purchased over a certain amount of merchandise over a period of time, or has the customer not been at the store to shop within a predetermined time interval. The present system provides a more efficient distribution of point-of-sale coupons, as an alternative to the circuitous and expensive route of mailing coupons.

5.6. Dissemination of Point-Of-Sale Coupons and Direct Mail Coupons Based Upon Scanned Data FIGS. 18A, B and C illustrate a technique for generating coupons based upon the particular transaction currently being accomplished by the customer. The technique of FIGS. 18A, B and C detects the particular store departments in which the products being purchased are located. This system requires the use of the bar code scanner to detect which products are being purchased, and which departments are being shopped by the customer. For example, the technique shown in FIGS. 18A, B and C detects whether or not items have been purchased from the meat department, dairy department or deli. Based upon data stored within the computer, the decision is then made as to whether to award a coupon and what type of coupon to award. For example, if the data illustrates that over a period of time a shopper shows a consistent failure to shop at the delicatessen, then when the customer's check identification is scanned into the check reader 119, the processor 110 pulls up the customer's history and generates a coupon to induce the customer to shop at the delicatessen the next time the customer shops. This inducing can be done by providing the customer with a very high value coupon used only for deli shopping.

Similarly, the stored data in processor 110 may contain information regarding particular product groups. If it is determined that the customer is a frequent shopper but does not purchase coffee, the data may determine that a coupon providing a large discount on coffee would be suitable to give to the customer. Alternatively, the system might determine that the customer had no history of buying a specific brand of coffee, and incentive coupons can be distributed for that brand of coffee. To provide this information, information regarding the particular product and the department of the product is generated by the bar code reader 123a, or through entry through the cash register, and transmitted to the host processor 110. The host processor 110 then identifies each particular product being purchased, compares it against the stored data tables and generates an indication of the type of coupon to be given to the customer. As previously noted, this indication from the host processor 110 may comprise a signal transmitted on the display 124 or the signal may be utilized to generate the actual printing of a coupon using the system similar to that shown in U.S. Pat. Nos. 4,723,212 and 4,910,672.

The present invention differs from the systems disclosed in the above-identified patents because, among other things, the present system generates coupons based upon the lack of purchase of a particular item by comparing against stored history for unique customer IDs, rather than because of the purchase of a particular item.

Figure 18A:
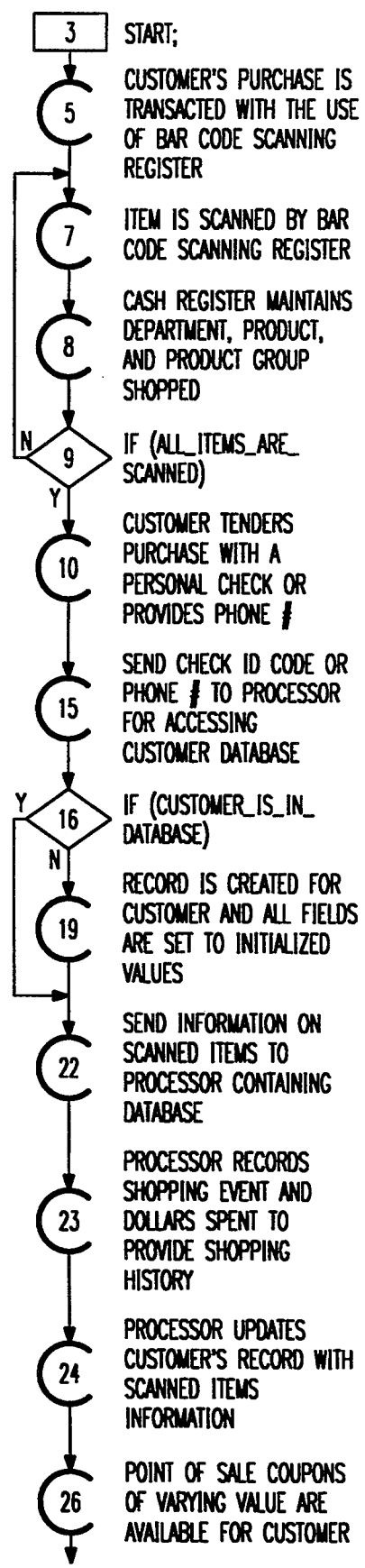
FIGS. 18A, B and C are program flow diagrams for distributing point-of-sale coupons based upon the shopping habits of the customer in various departments of the retail store.
Figure 18B:
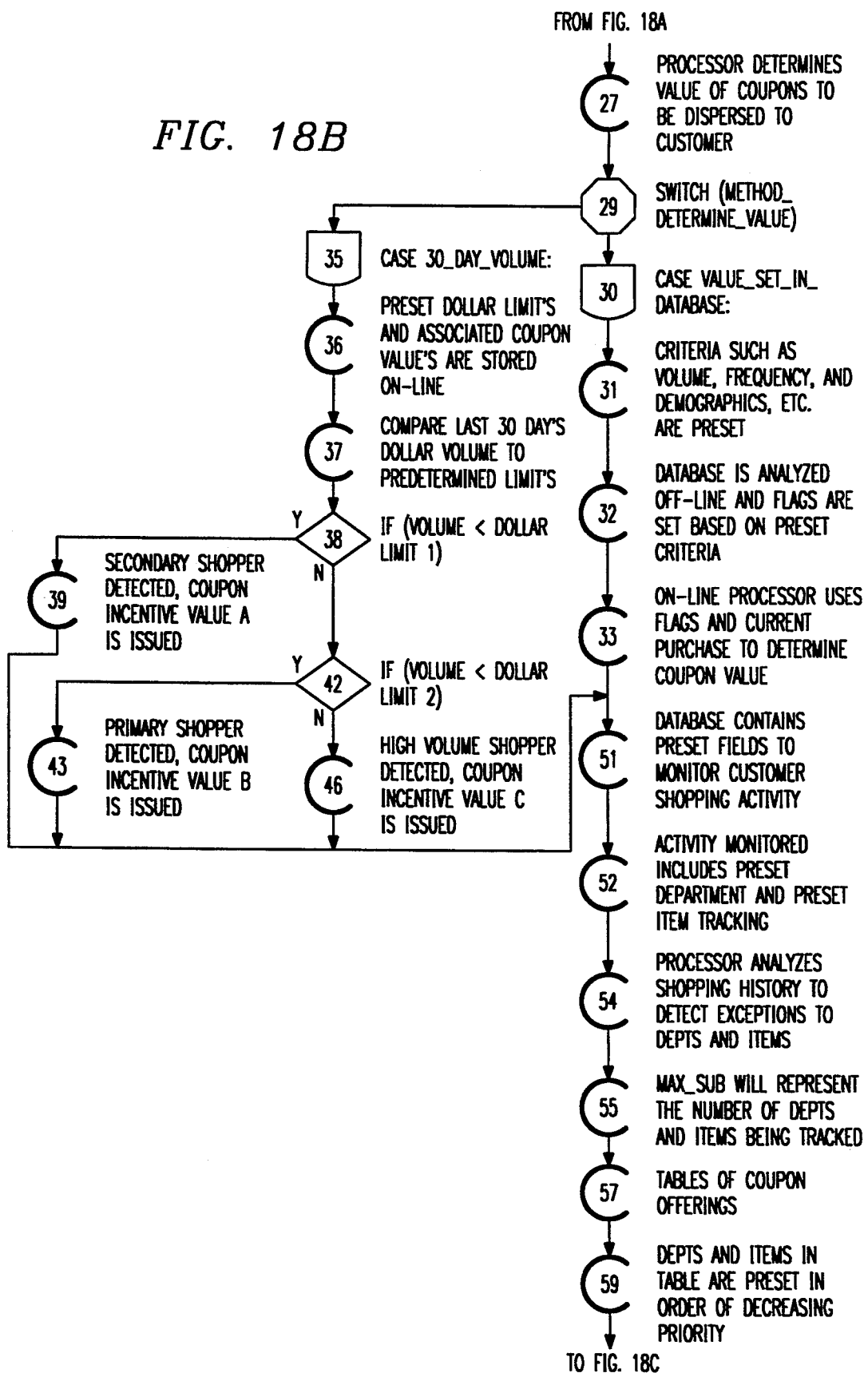
Figure 18C:
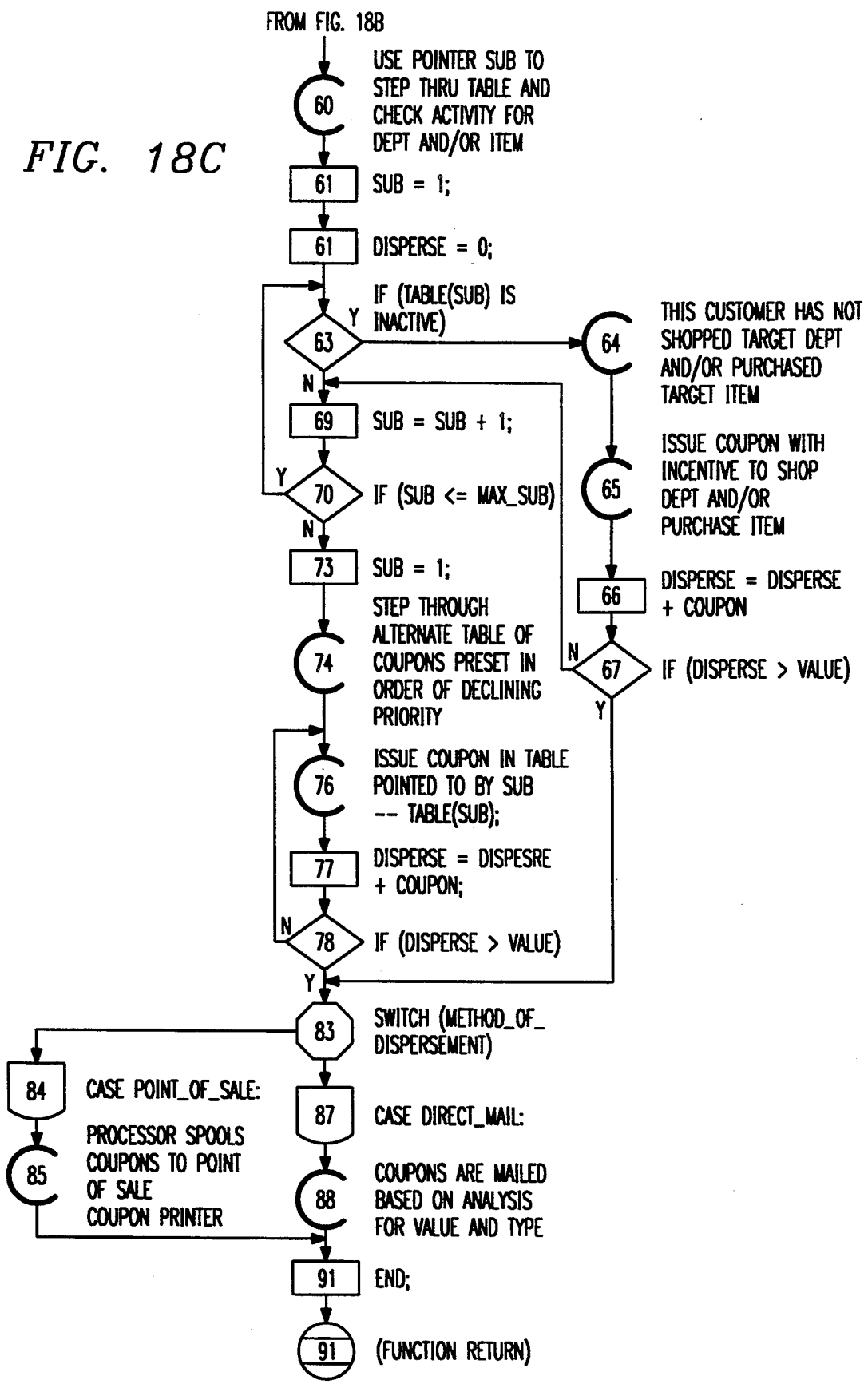

A more detailed description of the technique of FIGS. 18A, B and C is as follows:

| Step | Description |
| --- | --- |
| 3 | Beginning of process being flowed. |
| 5–9 | Customer's purchase is transacted using bar code scanning cash register. As each item is scanned, said cash register maintains a record of preselected criteria for each item such a product, product group, department, etc. for the customer's purchase. |
| 10 | Check is taken for tendering purchase at retail store. |
| 15–16 | Once the bank's transit number and customer's checking account number are parsed from the MICR band, they are combined (transit number followed by account number) to form the customer's unique checking account ID. This ID is used as the primary key for a customer database on disk indexed by checking account ID. |
| 19 | If no record exists, one is created for this checking account ID and the operator is signaled the record is incomplete and predetermined identification criteria. |
| 22 | Send scanned data of said preselected criteria to the ON-LINE front end processor. |
| 23 | If a record exists in the database for the customer with this checking account ID, the completeness of predetermined identification criteria is checked and the result is signaled back to the operator. Shopping event and dollars spent are recorded in order to build a shopping history for each customer's record. |
| 24 | Processor updates customer's record with the said scanned information of preselected criteria. |
| 26–27 | The store has on hand coupons to be handed out at the point of sale. These coupons may be arranged into varying packages. We will assume 3 different coupon packs for point-of-sale dispersement: Coupon VALUE A: For customer who has been determined to be a SECONDARY shopper. This would be incentive to make them become a PRIMARY shopper. Coupon VALUE B: For customer who has been determined to be a PRIMARY shopper. This would |

| Step | Description |
|---|---|
| | be a lessor incentive package to primarily maintain a consistency whereby everyone receives a package. Coupon VALUE C: For customer who has been determined to be a HIGH VOLUME shopper. This incentive would be used as a means to hold on to especially good shoppers. |
| 29 | There are two methods for determining the coupon package to be dispersed at the point of sale. Steps 30-33 deals with preselected criteria analyzed OFF-LINE and downloaded to the font end computer. Steps 35-46 deals with ON-LINE determination based on prior 30 days shopping VS two preselected dollar LIMITS (LIMIT 1 and LIMIT 2). |
| 30 | OFF-LINE ANALYSIS: |
| 31 | Preselected criteria such as shopping volume, frequency, demographics, etc. along with how they relate to the Coupon offerings are set for OFF-LINE analysis. |
| 32 | Each record is analyzed against said preselected criteria and corresponding Coupon VALUEs are selected and flagged. Said Coupon VALUE information is then downloaded to the ON-LINE processor. |
| 33 | On the customer's next visit, ON-LINE processor uses said downloaded Coupon VALUE information to flag to clerk which point-of-sale Coupon VALUE package to disperse to the customer. Proceed to step 40 for METHOD OF DISPERSEMENT. |
| 35 | ON-LINE 30 DAY ANALYSIS: |
| 36 | Two dollar limits are preselected, ie: LIMIT 1 = 100.00 LIMIT 2 = 350.00 |
| 37 | Prior dollars spent for the previous 30 days are calculated and compared with said preselected dollar limits. |
| 38-39 | If prior dollars spent for previous 30 days is LESS THAN LIMIT 1, customer is considered a SECONDARY shopper; Coupon VALUE A is dispersed to customer. Proceed to step 51 to determine WHICH coupons to disperse. |
| 42-43 | If prior dollars spent for previous 30 days is GREATER THAN LIMIT 1, but LESS THAN LIMIT 2, customer is considered a PRIMARY shopper; Coupon VALUE B is dispersed to customer. Proceed to step 51 to determine WHICH coupons to disperse. |
| 46 | If prior dollars spent for previous 30 days is GREATER THAN LIMIT 2, customer is considered a HIGH VOLUME shopper; Coupon VALUE C is dispersed to customer. |
| 51-52 | Customer's database record contains fields to monitor preselected shopping activities such as purchase of particular products, product groups, departments, etc. |
| 54 | Processor has determined what VALUE of coupons to be dispersed, now said database fields monitoring preselected shopping activities are used to determine which coupons in particular to disperse based upon exception to previous shopping activity. |
| 55 | MAX-SUB represents the number of said preselected items (products, product groups, departments, etc.) being maintained and monitored for shopping activity. |
| 56 | TABLES represent a table of coupons that represent incentives for each said preselected item (products, product groups, departments, etc.). TABLES are arranged in order of decreasing priority. |
| 61-70 | Step through each said-preselected item in decreasing priority and check for an exception in shopping activity. If the customer has not shopped this preselected item, this particular Coupon is chosen for dispersement. This process continues through said preselected items until the total value of Coupons chosen for dispersement meets or exceeds said VALUE as determined in steps 29-46. |
| 74-78 | If after stepping through said preselected items and the value of dispersement does not meet or exceed said VALUE as determined in steps 29-46, an alternate table of general incentive coupons in order of decreasing priority is stepped through until said VALUE is met or exceeded. |
| 83-88 | Coupons are dispersed either with ON-LINE processor spooling selected Coupons to a point-of-sale coupon printer or via Direct Mail. |

Although the present invention has been described in detail, it should be understood that various changes, substitutions and alterations can be made herein without departing from the spirit and scope of the invention which is solely defined by the appended claims.

TABLE 1
CUSTOMER RECORD DESCRIPTION

| Field Name | Description |
|---|---|
| char id | customer's bank id |
| char status | current status |
| char flags | id user flags [PREAPPROVE, MANAGER ONLY, ADDRESS COMPLETE FLAG, CHECK READER SOURCE, REMOTE TRANSFER SOURCE] |
| long lastdate | last access date (for transfer use) |
| long currdate | last access date (for rolling id) |
| long statdate | date status changed |
| int hitcnt | total hitcnt |
| char hitfreq | hitcnt frequency. prv 30 days |
| long amtfreq | amount frequency. prv 30 days |
| long amount | last dollar amount verified |
| long totamt | total dollar amount verified |
| long date | access date/time |
| char status | previous status before current |
| int hitcnt | previous local hitcnt |
| long totamt | previous local dollar amount |
| long statdate | previous status date |
| int hitcnt | total hits since last transfer |
| long totamt | total dollars since last transfer |
| char mask1 | Product Exception flags - set 1 |
| char mask2 | Product Exception flags - set 2 |

TABLE 2
NEGATIVE STATUS RECORD SPECIFICATION

| Field Name | Description |
|---|---|
| char id | customer's bank id |
| char COlocid | location showing CASH ONLY |
| char Nlocid | location showing negative |
| char Nstatus | current record status NEGATIVE |
| CHAR COstatus | current record status CASH ONLY |
| long currdate | current access date |
| long COstatdate | date became CASH ONLY |
| long Nstatdate | date became negative |

TABLE 2-continued
NEGATIVE STATUS RECORD SPECIFICATION

| Field Name | Description |
|---|---|
| int hitcnt | total bad checks against location |
| long totamt | total bad dollars against location |

TABLE 3
SYSTEM CONTROL FILE DESCRIPTION

| Field | Definition |
|---|---|
| char locid | system id |
| KpdPortDef keypad | keypad definition |
| int port | modem comm port value |
| int baud | max baud rate of installed modem |
| char tone | tone/pulse dial mode |
| long strttime | system start time (machine turned on) |
| long currtime | current system time |
| long timebomb | timebomb date/time |
| char errfile[FLNMSIZE] | error filename |
| char logfile[FLNMSIZE] | screen log filename |
| char password[LOCSIZE] | system access password |
| char privpass[LOCSIZE] | privileged password (for tech) |
| int timepass | factor to change time password |
| char flags | system control flags |
| char flags2 | 2nd set system control flags |
| char CMS_flags1 | future use CardLess flags |
| char CMS_flags2 | another set of CardLess flags |
| char dayflag | flag for day/second roll limits |
| long ctnroll | caution to positive limit |
| long ctnlim | caution purge limit |
| long neglim | negative purge limit |
| long poslim | positive purge limit |
| long colim | cash only purge limit |
| long sclim | stolen purge limit |
| VerifyLimit dmax | day maximum call manager limits |
| VerifyLimit wmax | week maximum call manager limits |
| VerifyLimit tmin | total minimum call manager limits |
| long break1 | break value 1 for POS coupons |
| long break2 | break value 2 for POS coupons |
| long break3 | break value 3 for POS coupons |
| int cms | latest CardLess version making contact |
| int collect | latest ColleCheck version making contact |
| int cvs | current CVS version |
| long set_date | date counters were set to zero |
| long to_date | ending date for this set of counters |
| long couponA | number qualifying for Coupon A |
| long amtA | dollars Coupon A spent |
| long couponB | number qualifying for Coupon B |
| long amtB | dollars Coupon B spent |
| long couponC | number qualifying for Coupon C |
| long amtC | dollars Coupon C spent |
| long caution | number of Cautions |
| long amt_caut | dollars Cautions spent |
| long positive | number of Positives |
| long amt_pos | dollars Positives spent |

TABLE 4
FUNCTION CODE SPECIFICATION

| | |
|---|---|
| Function: | F1 |
| Description: | Query ID, displaying current data |
| Keypad Input: | [id] F1 |
| Keypad Output: | Status Dhitcnt Whitcnt Thitcnt $totamt StatDate ID |
| Function: | F2 |
| Description: | List Negative Locations for entered ID |
| Keypad Input: | [id] F2 |
| Keypad Output: | NEG LOCATIONS LOC1 LOC2 LOC3 ... LOC10 |
| Function: | F3 |
| Description: | Query Negative location ID as found on F2 |
| Keypad Input: | [id] F3 $n |
| Keypad Output: | *n - LOCn as shown on F2 display Neg Inquiry LOCn Thitcnt $totamt negdate |
| Function: | F4 |
| Description: | Query Location ID |
| Keypad Input: | [id] F4 |
| Keypad Output: | LOC locid locname |
| Function: | F5 |
| Description: | Query ID Hitcounts and Dollar Amounts |
| Keypad Input: | [id] F5 |
| Keypad Output: | Status Dhitcnt; amount Whitcnt; amount Thitcnt; amount |
| Function: | F40 |
| Description: | Add Cash only ID |
| Keypad Input: | id F40 |
| Keypad Output: | CASH ONLY FILE id |
| Function: | F41 |
| Description: | Add Stolen ID |
| Keypad Input: | id F41 |
| Keypad Output: | STOLEN FILE id |
| Function: | F42 |
| Description: | Add Preapproved ID |
| Keypad Input: | id F42 |
| Keypad Output: | PREAPPROVED |
| Function: | F43 |
| Description: | Add Manager Only |
| Keypad Input: | id F43 |
| Keypad Output: | MANAGER ONLY id |
| Function: | F44 |
| Description: | Add Negative ID with location |
| Keypad Input: | id F44 |
| Keypad Output: | NEGATIVE FILE id |
| Function: | F55 |
| Description: | Verify ID. If F55 is not included, verify is assumed |
| Keypad Input: | id [F55] |
| Keypad Output: | *if any limits are exceeded: CALL MANAGER id *status is caution: CAUTION hitcnt id *status is negative: NEGATIVE id *status is positive: POS Dhitcnt Whitcnt Thitcnt id *status is cash only: CASH ONLY id *status is stolen: STOLEN id |
| Function: | F60 |
| Description: | Delete Cash only ID |
| Keypad Input: | id F160 |
| Keypad Output: | CHECKS ACCEPTED id |
| Function: | F61 |
| Description: | Delete Stolen ID |
| Keypad Input: | id F61 |
| Keypad Output: | CHECKS ACCEPTED id |
| Function: | F66 |
| Description: | Add Positive ID. Remove stolen list |
| Keypad Input: | id F66 |
| Keypad Output: | PAID OFF FILE id |
| Function: | F77 |
| Description: | Login to system to gain access to privileged commands |
| Keypad Input: | id F77 |
| Keypad Output: | Login Valid |

TABLE 4-continued
FUNCTION CODE SPECIFICATION

| | |
|---|---|
| Function: | Begin Session F62 |
| Description: | Delete Preapproved |
| Keypad Input: | id F62 |
| Keypad Output: | PREAPPROVED |
| Function: | F43 |
| Description: | Delete Manager Only |
| Keypad Input: | id F63 |
| Keypad Output: | MANAGER ONLY |
| Function: | F88 |
| Description: | Logout from system |
| Keypad Input: | F88 |
| Keypad Output: | End Session Bye! |
| Function: | F900 |
| Description: | Return System Author Information |
| Keypad Input: | F900 |
| Keypad Output: | CVS v4.20 (c) 1989 CVC, by Scott Wood, CCP |
| Function: | F901 |
| Description: | Return System Internal Date & Time |
| Keypad Input: | F901 |
| Keypad Output: | System Date |
| mm/dd/yy - hh: | mm:ss |
| Function: | F902 |
| Description: | Return System Memory Usage |
| Keypad Input: | F902 |
| Keypad Output: | System Memory b Bytes Free |
| Function: | F903 |
| Description: | Return Disk Usage |
| Keypad Input: | n F903 *n − 3 = Drive C *n − 4 = Drive D |
| Keypad Output: | Disk Usage (CID) |
| Bytes: | n Total, n Free |
| Function: | F904 |
| Description: | Return ID Database Size |
| Keypad Input: | F904 |
| Keypad Output: | ID Database n Records |
| Function: | F905 |
| Description: | Return Negative ID Database Size |
| Keypad Input: | F905 |
| Keypad Output: | Negative dbase n Records |
| Function: | F906 |
| Description: | Return System Information depending on n |
| Keypad Input: | n F906 |
| Keypad Output: | *n−0 - System ID Location ID locid *n=1 - Keypad Data Keypad Info Port:n, Poll:n, Recv:n *n=2 - Modem Data Modem Info Port 0:n, Port 1:n *n=3 - System Start Time Start Time mm/dd/yy - hh:mm:ss *n=4 - System Current Time Current Time mm/dd/yy - hh:mm:ss *n=5 - System Password Password passid *n=6 - System Flags Flags n *n-=7 - Caution Roll Period Caution Roll n seconds *n=8 - Caution Purge Limit Caution Limit n seconds *n=9 - Negative Purge Limit Negative Limit n seconds *n=10 - Positive Purge Limit Positive Limit n seconds *n=11 - Cash Only Purge Limit Cash Only Limit n seconds *n−12 - Stolen Purge Limit Stolen Limit *n=13 - Caution Call Manager Limits Caution Callmgr Dhitcnt,amount - Whitcnt,amount - Thitcnt,amount *n=14 - Negative Call Manager Limits Negative Callmgr Dhitcnt,amount - Whitcnt,amount - Thitcnt,amount *n=15 - Positive Call Manager Limits Positive Callmgr Dhitcnt,amount - Whitcnt,amount - Thitcnt,amount - *n=16 - Cash only Call Manager Limits Cash only Callmgr Dhitcnt,amount - Whitcnt,amount - Thitcnt,amount - *n=17 - Stolen Call Manager Limits Stolen Callmgr Dhitcnt,amount - Whitcnt,amount - Thitcnt,amount - |
| Function: | F940 |
| Description: | Toggle Screen Logging |
| Keypad Input: | n F940 *n=0:Off, 1:On |
| Keypad Output: | Screen Log (ON\|OFF) |
| Function: | F950 |
| Description: | Start Event Activity for event n |
| Keypad Input: | n F950 [mmddmmss] *n=event number |
| Keypad Output: | Event n Stopped |
| Function: | F951 |
| Description: | Stop Event Activity for event n |
| Keypad Input: | n F951 |
| Keypad Output: | Event n Stopped |
| Function: | F952 |
| Description: | Get Event Activity for event n |
| Keypad Input: | n F952 *n=event number |
| Keypad Output: | mm/dd/yy - hh:mm:ss act1 act2 act3 . . . act10 |
| Function: | F953 |
| Description: | Get Activity Status for activity n |
| Keypad Input: | n F953 *n=event number |
| Keypad Output: | activity description activity data |
| Function: | F960 |
| Description: | Toggle Keypad Debug Mode |
| Keypad Input: | n F960 *n=0:Off, 1:On |
| Keypad Output: | Keypad Debut (ON\|OFF) |
| Function: | F961 |
| Description: | Return Keypad number associated with current pad |
| Keypad Input: | F961 |
| Keypad Output: | Keypad Number n |
| Function: | F970 |

TABLE 4-continued
FUNCTION CODE SPECIFICATION

| | |
|---|---|
| Description: | |
| Keypad Input: | F970 |
| Keypad Output: | Modem Debug (ON\|OFF) |
| Function: | F971 |
| Description: | Reset Modem |
| Keypad Input: | F971 |
| Keypad Output: | Reset Modem |
| Function: | F980 |
| Description: | Toggle Data Manager Debug Mode |
| Keypad Input: | n F980 *n=0:Off, 1:On |
| Keypad Output: | DataBase Debug |
| Function: | F981 |
| Description: | Open database system if currently closed |
| Keypad Input: | F981 |
| Keypad Output: | Open dbase |
| Function: | F982 |
| Description: | Close database system if currently open |
| Keypad Input: | F982 |
| Keypad Output: | Close dbase |
| Function: | F983 |
| Description: | Return Internal Database Status |
| Keypad Input: | F983 |
| Keypad Output: | Database Status B:bsyflag, H:hltflag, C:clsflag, Dbg:Dbgflag, E:error, D:doserr |
| Function: | F990 |
| Description: | Toggle System Supervisor Debug Mode |
| Keypad Input: | n F990 *n=0:Off, 1:On |
| Keypad Output: | SysServe Debut |

TABLE 4-continued
FUNCTION CODE SPECIFICATION

| | |
|---|---|
| | (ON\|OFF) |
| Function: | F999 |
| Description: | Shut System Down |
| Keypad Input: | password F999 |
| Keypad Output: | System Halted |

TABLE 5
CUSTOMER SHOPPING FREQUENCY
Time Period: 8 Weeks, 4 Days [frequency > 20 omitted]

| Shopping Frequency per Customer | Total Customers | % Customers Shopping for Period | % Total Customer Base | Total $ Spent for Period | % Total $ Spent for Period | Average Check per Visit | Average $ Spent per Customer |
|---|---|---|---|---|---|---|---|
| 20 | 36 | 0.23 | 0.12 | 25600 | 1.27 | 35.56 | 711.11 |
| 19 | 28 | 0.18 | 0.09 | 22044 | 1.09 | 41.44 | 787.28 |
| 18 | 42 | 0.27 | 0.14 | 31751 | 1.57 | 42.00 | 755.98 |
| 17 | 51 | 0.32 | 0.17 | 32326 | 1.60 | 37.28 | 633.84 |
| 16 | 51 | 0.32 | 0.17 | 29088 | 1.44 | 35.65 | 570.35 |
| 15 | 52 | 0.33 | 0.17 | 34410 | 1.70 | 44.12 | 661.73 |
| 14 | 70 | 0.44 | 0.24 | 49382 | 2.44 | 50.39 | 705.46 |
| 13 | 64 | 0.40 | 0.21 | 37923 | 1.88 | 45.58 | 592.55 |
| 12 | 80 | 0.51 | 0.27 | 41916 | 2.07 | 43.66 | 523.95 |
| 11 | 92 | 0.58 | 0.31 | 46311 | 2.29 | 45.76 | 503.38 |
| 10 | 137 | 0.87 | 0.46 | 60992 | 3.02 | 44.52 | 445.20 |
| 9 | 155 | 0.98 | 0.52 | 73404 | 3.63 | 52.62 | 473.57 |
| 8 | 210 | 1.33 | 0.71 | 90403 | 4.47 | 53.81 | 430.49 |
| 7 | 261 | 1.65 | 0.88 | 93222 | 4.61 | 51.02 | 357.17 |
| 6 | 377 | 2.38 | 1.27 | 114366 | 5.66 | 50.56 | 303.36 |
| 5 | 406 | 2.56 | 1.36 | 122223 | 6.05 | 60.21 | 301.04 |
| 4 | 801 | 5.06 | 2.69 | 191331 | 9.46 | 59.72 | 238.87 |
| 3 | 1122 | 7.09 | 3.77 | 210922 | 10.43 | 62.66 | 187.99 |
| 2 | 2767 | 17.48 | 9.29 | 305223 | 15.10 | 55.15 | 110.31 |
| 1 | 8794 | 55.55 | 29.52 | 408702 | 20.22 | 46.48 | 46.48 |
| TOTALS | 15830 | 100.00 | 53.15 | 2021539 | 100.00 | 47.91 | 127.70 |

Date Range: from 10/01/91 to 12/01/91
Total Customer Base: 29,786

TABLE 6
Infrequent Customer Analysis
Time Period: 8 Weeks

| Total Customers | % Total Customer Base | Total $ Spent for Period | Average Check per Visit | Average $ Spent per Customer | Total Visits per Customer | Average Visits per Customer |
|---|---|---|---|---|---|---|
| 5581 | 24.30 | 305763 | 50.66 | 54.79 | 6036 | 1.08 |

Active: from 10/05/91 to 11/03/92
Inactive: from 11/03/91 to 12/01/91

What is claimed is:

1. A system for performing targeted marketing on customers in a retail establishment comprising:

apparatus for entering selected indicia from instruments presented by customers at a point-of-sale, in order to generate a unique identification code for each customer;

a bar code reader for detecting the universal product code on products purchased by said customers;

a terminal at the point-of-sale for entering data relating to the customer's shopping transactions;

a processor responsive to said apparatus, bar code reader, and terminal for creating a centralized database of the store's customers' transaction data during previous customer visits and data relating to universal product codes of products previously purchased by said customers, in association with said customers' unique identification code;

said processor generating a signal upon entry of unique identification codes of customers whose transactions prior to the current shopping visit at the store meet one of a plurality of predetermined purchasing history criteria; and circuitry responsive to said processor and said database for dispensing a sales promotion at the point-of-sale to said customers whose prior transactions meet one of said predetermined purchasing history criteria, wherein said sales promotion provides different incentives to customers having different prior purchasing histories, such that said customers are incented to return to the retail establishment to purchase products in a future transaction.

2. The system of claim 1 wherein said instruments comprise checks.

3. The system of claim 1 wherein said terminal is operable to enter data relating to the amount of the purchases by customers.

4. The system of claim 1 wherein said predetermined purchasing history comprises the number of prior visits by the customer to the retail establishment over a specified time interval.

5. The system of claim 4 wherein said signal is generated for customers who have not visited the retail establishment a predetermined number of times in a specified time interval.

6. The system of claim 1 wherein said sales promotion is directed to a product related to a product previously purchased by the customer and stored in said database.

7. A system for performing targeted marketing on customers in a retail establishment comprising:
   a bar code reader for detecting the universal product code on products purchased by said customers;
   a terminal for entering data relating to the identity of the customers;
   a processor responsive to said bar code reader and terminal for creating a database of products previously purchased by a plurality of said customers in prior shopping transactions and preselected promotions on preselected products;
   said processor generating a signal upon the detection of customers whose prior transactions at the store meet one of a plurality of predetermined product purchasing history criteria; and
   circuitry responsive to said signal for dispensing a coupon related to one of said preselected promotions at the point-of-sale to said customers whose prior transactions meet one of said predetermined product purchasing history criteria, wherein different sales promotions are dispensed to customers having different product purchasing histories, in order to incent said customers to return to the retail establishment to purchase at least one of said preselected products in a future shopping transaction.

8. The system of claim 7 wherein the product purchasing history criteria comprises the number of times an item is purchased during a selected prior time interval.

9. The system of claim 7 wherein the product purchasing history criteria comprises the dollar amount of the item previously purchased.

10. A system for performing targeted marketing on customers in a retail establishment comprising:
   apparatus for entering unique customer identification codes from customer identification presented at the point-of-sale in a retail transaction;
   a bar code reader for detecting the universal product code on products purchased by said customers;
   a processor responsive to said apparatus and bar code reader for creating a centralized database of the store's customers' identification codes and universal product code of products previously purchased by said customers in prior shopping transactions and a plurality of preselected promotion data on preselected products;
   said processor generating a signal upon entry of a unique identification code of customers whose transactions prior to the current shopping visit at the store meet predetermined product purchasing history criteria; and
   circuitry responsive to said signal for dispensing one of said preselected sales promotions at the point-of-sale to said customers whose prior transactions meet predetermined product purchasing history criteria, regardless of said customer's purchases during the current visit to the retail establishment, wherein different sales promotions are dispensed to customers having different prior product purchasing histories, in order to incent said customers to purchase said preselected products at the establishment in a future shopping transaction.

11. The system of claim 10 wherein the product purchasing history criteria comprises the number of times a product is purchased during a predetermined prior time interval.

12. A system for differentiated customer promotion in a retail establishment comprising:
   a terminal for entering customer transaction data at the point-of-sale;
   a bar code reader for detecting the universal product code on products purchased by said customers;
   a memory for storing a database of previously entered customer transaction data and representations of universal product codes, such that data regarding individual customers' shopping visit histories and product purchases are stored;
   said database storing at least first and second different predetermined customer shopping visit history criteria, wherein said customer shopping visit history criteria comprises customer shopping data over a preselected prior time interval prior to the current shopping transaction;
   said database also storing at least first and second different predetermined incentive values, said first incentive value having a relationship to said first customer shopping visit history criteria, said second incentive value having a relationship to said second customer shopping visit history criteria, wherein said first incentive value relationship is differentiated from said second incentive value relationship;
   said database also storing preselected promotions on preselected products;
   circuitry for generating a signal when a specific customer's prior shopping visit history meets one of said predetermined shopping visit history criteria; and
   a printer for printing coupons related to said preselected promotions on preselected products at the point-of-sale in response to said signal, said coupons related to the customer's prior product purchasing history and prior shopping visit history such that customers whose shopping visit history meets said first shopping visit criteria receive coupons comprising said first incentive value and customers whose shopping visit history meets said second shopping visit history criteria receive coupons comprising said second incentive value, said coupons redeemable at a future time in order to incent said customer to return to the retail store.

13. The system of claim 12 wherein said first and second customer shopping visit history criteria are related to the amount spent by a customer in a prior time interval.

14. The system of claim 12 wherein said incentive values are related to products previously purchased by the customer.

15. The system of claim 12 wherein customers with different previous shopping histories receive coupons of different values in order to provide different incentives to different customers.

16. The system of claim 10 wherein the product purchasing history criteria comprises the dollar amount of the item previously purchased.

* * * * *